United States Patent
Wang et al.

(10) Patent No.: US 10,334,587 B2
(45) Date of Patent: Jun. 25, 2019

(54) SIGNAL SCRAMBLING METHOD AND APPARATUS, AND SIGNAL DESCRAMBLING METHOD AND APPARATUS

(71) Applicant: HUAWEI TECHNOLOGIES CO.,LTD., Shenzhen, Guangdong (CN)

(72) Inventors: Ting Wang, Shanghai (CN); Yuanjie Li, Shanghai (CN); Hao Tang, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/176,433

(22) Filed: Oct. 31, 2018

(65) Prior Publication Data
US 2019/0069284 A1 Feb. 28, 2019

Related U.S. Application Data

(63) Continuation of application No. PCT/CN2018/089375, filed on May 31, 2018.

(30) Foreign Application Priority Data

Aug. 11, 2017 (CN) .......................... 2017 1 0687393

(51) Int. Cl.
*H04L 27/26* (2006.01)
*H04W 72/04* (2009.01)
*H04L 5/00* (2006.01)

(52) U.S. Cl.
CPC ......... *H04W 72/044* (2013.01); *H04L 5/0094* (2013.01); *H04L 27/2626* (2013.01)

(58) Field of Classification Search
CPC ....... H04B 1/707; H04L 5/0007; H04L 5/001; H04L 27/2601

(Continued)

(56) References Cited

U.S. PATENT DOCUMENTS

2016/0366717 A1* 12/2016 Yang .................... H04W 76/14
2017/0339684 A1    11/2017 McBeath et al.
(Continued)

FOREIGN PATENT DOCUMENTS

CN    101997568 A    3/2011
CN    102340382 A    2/2012
(Continued)

OTHER PUBLICATIONS

R1-161987 Ericsson,"NB-IoT—Remaining open issues for NPUSCH",3GPP TSG RAN WG1 NB-IoT Ad-Hoc Meeting, Sophia Antipolis, France, Mar. 22-24, 2016,total 9 pages.
R1-071114 ITRI, "Transmitting Diversity for MBMS", 3GPP TSG RAN WG1 Meeting #48,St. Louis, USA, Feb. 12-16, 2007, total 5 pages.

(Continued)

*Primary Examiner* — Kevin Kim
(74) *Attorney, Agent, or Firm* — David William Roe

(57) ABSTRACT

A signal scrambling method and apparatus, and a signal descrambling method and apparatus are disclosed. In the signal scrambling method, a communications apparatus scrambles a signal by using a scrambling sequence, and sends the scrambled signal. In the signal descrambling method, a communications apparatus receives a signal, and descrambles the signal by using a scrambling sequence. An initial value of the scrambling sequence is determined based on a time unit number corresponding to a frame structure parameter used for transmitting the signal, so that different scrambling sequences can be used to scramble signals that are transmitted by using different frame structure parameters. Therefore, interference randomization can be implemented for signal scrambling, and this can be applicable to various application scenarios in 5G NR to improve performance.

20 Claims, 7 Drawing Sheets

(58) Field of Classification Search
USPC .................................. 375/260, 140; 370/208
See application file for complete search history.

(56) References Cited

U.S. PATENT DOCUMENTS

| | | | | |
|---|---|---|---|---|
| 2017/0347270 | A1* | 11/2017 | Iouchi | .................. H04W 16/14 |
| 2018/0041857 | A1* | 2/2018 | Ouchi | .................. H04W 72/04 |
| 2018/0234988 | A1* | 8/2018 | Shimezawa | .......... H04W 16/14 |

FOREIGN PATENT DOCUMENTS

| | | |
|---|---|---|
| CN | 105577342 A | 5/2016 |
| CN | 105722240 A | 6/2016 |
| CN | 106411475 A | 2/2017 |
| EP | 3439405 A1 | 2/2019 |

OTHER PUBLICATIONS

3GPP TS 38.211 V0.1.0 (Jun. 2017), 3rd Generation Partnership Project;Technical Specification Group Radio Access Network;NR;Physical channels and modulation (Release 15),total 22 pages.

3GPP TS 38.212 3GPP TS 38.212 V0.0.0 (May 2017), 3rd Generation Partnership Project; Technical Specification Group Radio Access Network;NR;Multiplexing and channel coding(Release 15),total 10 pages.

3GPP TS 38.331 3GPP TS 38.331 V0.0.4 (Jun. 2017),3rd Generation Partnership Project;Technical Specification Group Radio Access Network;NR;Radio Resource Control (RRC); Protocol specification(Release 15 ),total 22 pages.

Ericsson,"Further details on scrambling",3GPP TSG-RAN WG1 NR Ad-Hoc#2 R1-1711389, Qingdao, China, Jun. 27-30, 2017, total 3 pages.

\* cited by examiner

SIGNAL SCRAMBLING METHOD AND APPARATUS, AND SIGNAL DESCRAMBLING METHOD AND APPARATUS

CROSS-REFERENCE TO RELATED APPLICATIONS

This application is a continuation of International Application No. PCT/CN2018/089375, filed on May 31, 2018, which claims priority to Chinese Patent Application No. 201710687393.1, filed on Aug. 11, 2017. The disclosures of the aforementioned applications are hereby incorporated by reference in their entireties.

TECHNICAL FIELD

This application relates to the field of communications technologies, and in particular, to a signal scrambling method and apparatus, and a signal descrambling method and apparatus.

BACKGROUND

To ensure communication reliability, scrambling signals transmitted in a communication process is an important step. In a Long Term Evolution (LTE) communications system, signal scrambling is generally performed according to parameters such as a signal type, a cell identity (ID), a terminal identity, and a slot number. The LTE communications system has a fixed frame structure parameter. A subcarrier spacing, a cyclic prefix (CP) length, a symbol quantity, and a slot quantity corresponding to the frame structure parameter are all fixed. However, in a 5th Generation (5G) new radio (NR) communications system, given different subcarrier spacings, a system bandwidth may be divided into one or more bandwidth parts (BWP). In addition, to support different services, different BWPs may use different frame structure parameters. Therefore, the foregoing signal scrambling mode in the LTE communications system is not applicable to the 5G NR any longer.

SUMMARY

Embodiments of this application provide a signal scrambling method and apparatus, and a signal descrambling method and apparatus to implement interference randomization for signal scrambling and improve performance for various service scenarios in 5G NR.

According to a first aspect, this application provides a signal scrambling method, where the scrambling method may be applied to a communications apparatus. In this method, the communications apparatus scrambles a signal by using a scrambling sequence, and sends the scrambled signal, where the communications apparatus generates the scrambling sequence by generating an initial value of the scrambling sequence based on a time unit number corresponding to a frame structure parameter used for transmitting the signal, and generating the scrambling sequence based on the initial value of the scrambling sequence.

According to a second aspect, this application provides a signal scrambling apparatus, applied to a communications apparatus, and including units or means for performing the steps in the first aspect.

According to a third aspect, this application provides a signal scrambling apparatus, applied to a communications apparatus, and including at least one processing element and at least one storage element, where the at least one storage element is configured to store a program and data, and the at least one processing element is configured to perform the method provided in the first aspect of this application.

According to a fourth aspect, this application provides a signal scrambling apparatus, applied to a communications apparatus, and including at least one processing element (or chip) configured to perform the method in the first aspect.

According to a fifth aspect, this application provides a signal scrambling program, where the program, when being executed by a processor, is configured to perform the method in the first aspect.

According to a sixth aspect, a program product is provided, for example, a computer readable storage medium, including the program in the fifth aspect.

According to a seventh aspect, a signal descrambling method is provided, where the descrambling method may be applied to a communications apparatus, and the communications apparatus receives a signal, and descrambles the received signal by using a scrambling sequence, where the communications apparatus generates the scrambling sequence in the following manner: generating an initial value of the scrambling sequence based on a time unit number corresponding to a frame structure parameter used for transmitting the signal, and generating the scrambling sequence based on the initial value of the scrambling sequence.

According to an eighth aspect, this application provides a signal descrambling apparatus, applied to a communications apparatus, and including units or a means for performing steps in the seventh aspect.

According to a ninth aspect, this application provides a signal descrambling apparatus, applied to a communications apparatus, and including at least one processing element and at least one storage element, where the at least one storage element is configured to store a program and data, and the at least one processing element is configured to perform the method provided in the seventh aspect of this application.

According to a tenth aspect, this application provides a signal descrambling apparatus, applied to a communications apparatus, and including at least one processing element (or chip) configured to perform the method in the seventh aspect.

According to an eleventh aspect, this application provides a signal descrambling program, where the program, when being executed by a processor, is configured to perform the method in the seventh aspect.

According to a twelfth aspect, a program product is provided, for example, a computer readable storage medium, including the program in the eleventh aspect.

In the foregoing aspects, the communications apparatus determines the initial value of the scrambling sequence based on the time unit number corresponding to the frame structure parameter used for transmitting the signal, and generates the scrambling sequence based on the initial value of the scrambling sequence. Because time unit numbers corresponding to different frame structure parameters in 5G NR may be different, different scrambling sequences can be used to scramble signals that are transmitted by using different frame structure parameters. Therefore, interference randomization can be implemented for signal scrambling, and this can be applicable to various application scenarios in the 5G NR to improve performance.

In the foregoing aspects, the communications apparatus may be a network device or a terminal, where if the communications apparatus to which the scrambling method is applied is a network device, the communications apparatus to which the descrambling method is applied may be a terminal; or if the communications apparatus to which the scrambling method is applied is a terminal, the communications apparatus to which the descrambling method is applied may be a network device.

In the foregoing aspects, the frame structure parameter includes at least one of a subcarrier spacing configuration parameter, a slot configuration parameter, and a CP structure parameter. The time unit number includes at least one of a slot number in a radio frame, a subframe number in a radio frame, a slot number in a subframe, and an OFDM symbol number in a slot.

In a possible example, the communications apparatus may determine the initial value of the scrambling sequence based on the slot number in the radio frame. Because slot numbers in the radio frame do not overlap each other, occurrence of same scrambling sequences is avoided to some extent by determining the initial value of the scrambling sequence based on the slot number in the radio frame, and further occurrence of an interference overlapping problem may be avoided to some extent. Interference between different transmission frame structure parameters can be randomized, interference between different slots in a subframe can also be randomized, and therefore, interference randomization is implemented.

In another possible example, the communications apparatus may determine the initial value of the scrambling sequence based on the slot number in the subframe or the subframe number in the radio frame, to reflect scrambling randomization of different subframes and different slots in the subframe, and improve performance of interference randomization.

In still another possible example, the communications apparatus may further determine the initial value of the scrambling sequence based on the subframe number in the radio frame.

In a possible design, the communications apparatus may determine the initial value of the scrambling sequence based on a scrambling identity.

The scrambling identity may include at least one of a terminal identity, a cell identity, a code block group configuration parameter, a frame structure parameter, a bandwidth part configuration parameter, a QCL configuration parameter, a control channel resource configuration parameter, and a codeword configuration parameter.

The communications apparatus may determine the initial value of the scrambling sequence based on the scrambling identity and the time unit number corresponding to the frame structure parameter used for transmitting the signal.

Specifically, the communications apparatus may determine, according to a type of a channel on which the signal is transmitted or a type of the signal, the scrambling identity used for generating the initial value of the scrambling sequence.

In a possible example, the communications apparatus may determine the initial value of the scrambling sequence based on the terminal identity and the time unit number corresponding to the frame structure parameter used for transmitting the signal. At least two terminal identities may be configured for the communications apparatus by using higher layer signaling, and the terminal identity used for scrambling is configured by using physical layer signaling.

In another possible example, the communications apparatus may determine the initial value of the scrambling sequence based on the code block group configuration parameter and the time unit number corresponding to the frame structure parameter used for transmitting the signal.

In still another possible example, the communications apparatus may determine the initial value of the scrambling sequence based on the QCL configuration parameter and the time unit number corresponding to the frame structure parameter used for transmitting the signal.

In still another possible example, the communications apparatus may determine the initial value of the scrambling sequence based on the bandwidth part configuration parameter and the time unit number corresponding to the frame structure parameter used for transmitting the signal.

In still another possible example, the communications apparatus may determine the initial value of the scrambling sequence based on the control channel resource configuration parameter and the time unit number corresponding to the frame structure parameter used for transmitting the signal.

In still another possible example, the communications apparatus may determine the initial value of the scrambling sequence based on the codeword configuration parameter and the time unit number corresponding to the frame structure parameter used for transmitting the signal.

In still another possible example, the communications apparatus may determine the initial value of the scrambling sequence based on the frame structure parameter or a subcarrier spacing, to improve interference randomization in different frame structure parameter configurations or subcarrier spacing configurations.

In still another possible design, a coefficient parameter of a previous term in an initialization formula used by the communications apparatus for determining the initial value of the scrambling sequence may be determined according to value ranges of variables and values of coefficient parameters of several subsequent terms.

The communications apparatus may determine, in one or a combination of the following manners, a value of a coefficient parameter in the initialization formula used for determining the initial value of the scrambling sequence: determining according to a subcarrier spacing parameter $\mu$ and a slot format; determining according to a subcarrier spacing parameter $\mu$; and determining according to a maximum quantity of slots.

Different slot formats of each subcarrier spacing parameter $\mu$ correspond to different coefficient parameters, and the coefficient parameter is determined according to the subcarrier spacing parameter $\mu$ and the slot format. Therefore, different scrambling sequences can be generated according to different slot formats, and scrambling randomization is implemented maximally.

The coefficient parameter is determined according to the subcarrier spacing parameter $\mu$, so that each subcarrier spacing parameter $\mu$ corresponds to a different coefficient parameter.

The coefficient parameter is determined according to the maximum quantity of slots, so that coefficient parameters corresponding to all frame structures are the same.

In still another possible design, in an implementation process of determining the initial value of the scrambling sequence based on the slot number in the radio frame, the initial value of the scrambling sequence may be determined according to the slot format indicated by the slot configuration parameter. For example, the initial value of the scrambling sequence may be determined according to a numeric value corresponding to the slot number in the radio frame, or the initial value of the scrambling sequence is determined according to a numeric value obtained by rounding down a half of a numeric value corresponding to the slot number in the radio frame, so that initial values of scrambling sequences corresponding to different frame structure parameters are the same, and that computational complexity is reduced to some extent.

For example, when the slot format indicated by the slot configuration parameter is that a slot includes seven or six OFDM symbols, the initial value of the scrambling sequence may be determined according to the numeric value obtained by rounding down a half of the numeric value corresponding to the slot number in the radio frame; or when the slot format indicated by the slot configuration parameter is that a slot includes 14 or 12 OFDM symbols, the initial value of the scrambling sequence may be determined according to the numeric value corresponding to the slot number in the radio frame.

DESCRIPTION OF EMBODIMENTS

Figure 1:
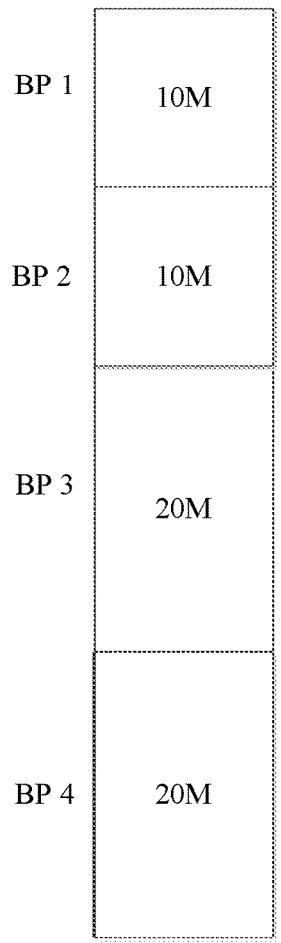
FIG. 1 is a schematic diagram of BWPs obtained by dividing a system bandwidth.

The following describes technical solutions in embodiments of this application with reference to accompanying drawings.

First, some terms in this application are explained and described for ease of understanding by a person skilled in the art.

(1) A communications apparatus may be a terminal or a network device. The terminal is also referred to as user equipment (UE), a mobile station (MS), a mobile terminal (MT), or the like, and is a device providing voice and/or data connectivity for a user, for example, a handheld device having a wireless connection function, a vehicular device having a wireless connection function, or another similar device. Currently, some examples of terminals are: a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. The network device is a device in a wireless network, for example, a radio access network (RAN) node (or device) that enables a terminal to access the wireless network, and may also be referred to as a base station. Currently, some examples of RAN nodes are: a further evolved NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a Wireless Fidelity (Wi-Fi) access point (AP), or the like. In addition, in a network structure, an RAN may include a centralized unit (CU) node and a distributed unit (DU) node. In this structure, protocol layers of an eNB in a Long Term Evolution (LTE) system are split, where functions of some protocol layers are controlled by the CU in a centralized manner, functions of part or all of remaining protocol layers are distributed in the DU, and the CU controls DUs in a centralized manner.

(2) "A plurality of" indicates at least two or more, and other measure words are similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(3) Interaction is a process of mutually transferring information by two interaction parties, where the transferred information may be the same or different. For example, when the two interaction parties are a base station 1 and a base station 2, the base station 1 may request information from the base station 2, and the base station 2 provides the information requested by the base station 1 to the base station 1. Certainly, the base station 1 and the base station 2 may request information from each other, and the requested information may be the same or different.

(4) The terms "network" and "system" are always used alternately, but a person skilled in the art can understand their meanings. The terms information, signal, message, and channel may be mixed sometimes. It should be pointed out that, meanings of the terms are consistent when differences between the terms are not stressed. "of", "corresponding or relevant", and "corresponding" may be mixed sometimes. It should be pointed out that, meanings of the terms are consistent when differences between the terms are not stressed.

(5) A frame structure parameter (numerology), also referred to as a transmission frame structure parameter, includes at least one of a subcarrier spacing configuration parameter, a cyclic prefix (CP) structure parameter, and a slot configuration parameter (Slot configuration). When the frame structure parameter includes the subcarrier spacing configuration parameter and the CP structure parameter, the frame structure parameter may be expressed in Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In Table 1, the subcarrier spacing configuration parameter is generally indicated by μ. In 5G NR, a value of μ may be 0, 1, 2, 3, 4, and 5. Different values of μ correspond to different subcarrier spacings. A subcarrier spacing is indicated by Δf. A correspondence between the subcarrier spacing Δf and the subcarrier spacing configuration parameter μ may satisfy a formula: $\Delta f = 2^\mu \cdot 15$ [kHz]. A CP structure may include an extended CP and a normal CP, and the CP structure parameter indicates whether a CP length is extended or normal. Alternatively, other CP lengths or types may be applicable, and are not specifically limited herein.

When the frame structure parameter includes the subcarrier spacing configuration parameter and the slot configuration parameter, for different CP structure parameters, different correspondences exist between the subcarrier spacing configuration parameter and the slot configuration parameter. For example, given a normal CP, the subcarrier spacing configuration parameter and the slot configuration parameter may be expressed in Table 2; or given an extended CP, the subcarrier spacing configuration parameter and the slot configuration parameter may be expressed in Table 3.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

In Table 2 and Table 3, the slot configuration parameter (Slot configuration) is used to indicate a slot format. The slot format may be used to distinguish different slots. For example, different slots may be distinguished according to quantities of symbols included in the slots. For example, the slot format may be: a slot includes seven or six orthogonal frequency division multiplexing (OFDM) symbols, or a slot includes 14 or 12 OFDM symbols. An OFDM symbol may also be referred to as a symbol for short sometimes. $N_{symb}^\mu$ indicates a quantity of OFDM symbols in each slot corresponding to a subcarrier spacing configuration parameter whose value is μ, $N_{frame}^{slots,\mu}$ indicates a quantity of slots in each radio frame corresponding to the subcarrier spacing configuration parameter whose value is μ, and $N_{subframe}^{slots,\mu}$ indicates a quantity of slots in each subframe corresponding to the subcarrier spacing configuration parameter whose value is μ. For example, in Table 2, when μ=0, that is, when the subcarrier spacing is 15 KHz, when the slot format is that a slot includes seven OFDM symbols, $N_{symb}^\mu=7$ indicates that a quantity of OFDM symbols included in each slot is 7, $N_{frame}^{slots,\mu}=20$ indicates that a quantity of slots in each radio frame is 20, and $N_{subframe}^{slots,\mu}=2$ indicates that a quantity of slots in each subframe is 2.

(6) A time unit number is a number of a time unit for transmitting a signal in a radio frame, and may also be referred to as a time unit index. The time unit for transmitting the signal in the radio frame may be a slot, or may be a subframe, or may be an OFDM symbol. The time unit number may be a slot number in the radio frame, a subframe number in the radio frame, a slot number in a subframe, or an OFDM symbol number in a slot, or may be an OFDM symbol number in the radio frame or an OFDM symbol number in a subframe. A correspondence exists between the time unit number and the frame structure parameter. The time unit number may be determined according to the frame structure parameter. For example, when the frame structure parameter includes the subcarrier spacing configuration parameter, whether the CP structure parameter corresponding to the subcarrier spacing parameter is an extended CP or a normal CP may be determined with reference to Table 1, and further, whether the time unit number is determined with reference to Table 2 or Table 3 may be determined. Assuming that the time unit number is determined with reference to Table 2, a quantity of time units corresponding to the subcarrier spacing configuration parameter may be determined, and further, the time unit number is determined. For example, when the subcarrier spacing configuration parameter μ=0, that is, when the subcarrier spacing is 15 KHz, the time unit is a slot in the radio frame. In this case, a quantity and numbers of slots in the radio frame corresponding to the subcarrier spacing configuration parameter μ=0 may be determined as follows: When the slot format is that a slot includes seven OFDM symbols, the quantity of slots in the radio frame is 20, and slot numbers in the radio frame are 0 to 19. When the slot format is that a slot includes 14 OFDM symbols, the quantity of slots in the radio frame is 10, and slot numbers in the radio frame are 0 to 9. Therefore, the correspondence between the time unit number and the frame structure parameter is as follows: Given the frame structure parameter in which the subcarrier spacing configuration parameter μ=0, the subcarrier spacing is 15 KHz, the CP is a normal CP, and the slot format is that a slot includes seven OFDM symbols, slot numbers in the corresponding radio frame are 0 to 19. Given the frame structure parameter in which the subcarrier spacing configuration parameter μ=0, the subcarrier spacing is 15 KHz, the CP is a normal CP, and the slot format is that a slot includes 14 OFDM symbols, slot numbers in the radio frame corresponding to are 0 to 9.

Slot quantities corresponding to different CP structure parameters are the same. Therefore, when a time unit number is to be determined, a corresponding time unit number may be determined by using the subcarrier spacing configuration parameter and the slot configuration parameter. In this case, the frame structure parameter may include the subcarrier spacing configuration parameter and the slot configuration parameter for determining the corresponding time unit number. If the slot format is a fixed format, the frame structure parameter may include the subcarrier spacing configuration parameter for determining the corresponding time unit number.

The slot number in the radio frame may be indicated by $n_{s,f}^\mu$, where $n_{s,f}^\mu \in \{0, \ldots, N_{frame}^{slots,\mu}-1\}$. For example, in Table 2, when μ=0, when the slot format is that a slot includes seven OFDM symbols, $N_{frame}^{slots,\mu}=20$, and $n_{s,f}^\mu$ has 20 values in total, where the values may be designed as follows: $n_{s,f}^\mu \{0, \ldots, 19\}$. Other methods for setting values are not limited.

The subframe number in the radio frame may be indicated by $n_{sf}$, where $$n_{sf} = \left\lfloor \frac{n_{s,f}^{\mu}}{N_{subframe}^{slots,\mu}} \right\rfloor.$$

For example, in Table 2, when $\mu=0$, when the slot format is that a subframe slot includes seven OFDM symbols, $n_{s,f}^{\mu}$ has 20 values in total, where the values may be designed as follows: $n_{s,f}^{\mu} \in \{0, \ldots, 19\}$. Other methods for setting values are not limited. If a value of $n_{s,f}^{\mu}$ is 19, $N_{subframe}^{slots,\mu}=2$, 19/2=9.5, a value after round-down is 9, and $n_{sf}$ is 9.

The slot number in the subframe may be indicated by $n_s^{\mu}$, where $n_s^{\mu} \in \{0, \ldots, N_{subframe}^{slots,\mu}-1\}$. For example, in Table 2, when $\mu=0$, when the slot format is that a slot includes seven OFDM symbols, $N_{subframe}^{slots,\mu}=2$, and $n_s^{\mu}$ has two values in total, where the values may be designed as follows: $n_s^{\mu} \in \{0,1\}$. Other methods for setting values are not limited.

The OFDM symbol number in the slot may be indicated by $n_{symbol}$, where $n_{symbol} \in \{0, \ldots, N_{symb}^{\mu}-1\}$. For example, in Table 2, when $\mu=0$, when the slot format is that a slot includes seven OFDM symbols, $N_{symb}^{\mu}=7$, and $N_{symb}^{\mu}$ has seven values in total, where the values are designed as follows: $n_{symbol} \in \{0, \ldots, 6\}$.

(7) A bandwidth part (BP or BWP) configuration parameter is used to indicate a parameter of a BP, and the BP is a part of a system bandwidth. The system bandwidth is divided into one or more parts. Each part obtained by division may be referred to as a BP. As shown in FIG. 1, a 60M system bandwidth is divided into four parts: 10M, 10M, 20M, and 20M, and four BPs including a BP 1, a BP 2, a BP 3, and a BP 4 may be obtained. A subset of a BP is each part obtained by further dividing the BP. For example, the BP 1 in FIG. 1 is further divided into a plurality of parts, where each part may be referred to as a subset of the BP 1. The BP may also indicate a segment of continuous frequency domain resources.

(8) A quasi-co-location (QCL) configuration parameter is used to indicate a QCL relationship between antenna ports. If antenna ports satisfy the QCL relationship, it represents that signals sent by the antenna ports are subject to same large-scale fading and have a same large-scale feature parameter. For example, when an antenna port A and an antenna port B satisfy the QCL relationship, a channel large-scale feature parameter obtained through estimation from a signal on the antenna port A is also applicable to a signal on the antenna port B. The large-scale feature parameter includes one or more of a delay spread, a Doppler spread, a Doppler frequency shift, an average channel gain and an average delay, an angle of arrival (AOA), an angle of arrival spread (AAS), an angle of departure (AOD), an angle of departure spread (ADS), and a spatial correlation.

(9) A codeword (CW) configuration parameter is used to indicate a configuration parameter of a codeword. The codeword may be understood as a composition unit of a transport block. Each transport block includes a specified quantity of codewords. For example, a transport block corresponds to a codeword. Generally, a CW indicator is used to indicate identity information of a CW transmitted in a current transport block.

(10) A code block group (CBG) configuration parameter is used to indicate a configuration parameter of a CBG The CBG may be a basic unit of data transmission. A transport block may include one or more CBGs. A codeword may include one or more CBGs.

(11) A control channel resource configuration parameter is used to indicate a configuration parameter of a control channel resource, and may include at least one of a frequency domain location, a time domain location, and a control channel resource set (CORESET) identity. The CORESET identity is used to indicate a time-frequency resource position occupied by a control channel.

(12) Cell identities are used to represent different cells or different transmission points.

(13) A terminal identity is an identity allocated by a network device and used to represent an identity of a user after the user accesses a cell.

(14) A scrambling identity is a parameter used for generating an initial value of a scrambling sequence. The scrambling identity may be at least one of the terminal identity, the cell identity, the CBG configuration parameter, the frame structure parameter, the BWP configuration parameter, the QCL configuration parameter, the control channel resource configuration parameter, the CW configuration parameter, and the like.

With development of communications technologies, a communications system has evolved to 5G NR. In the 5G NR, a signal scrambling mode needs to be provided to enhance flexibility of scheduling and reduce scheduled signaling overheads.

Scrambling signals of data and each correlated channel by a communications apparatus (network device or terminal) is generally scrambling a signal of the communications apparatus (network device or terminal) by multiplying the signal by a pseudo random sequence. When the communications apparatus (network device or terminal) performs signal scrambling, scrambling initialization needs to be performed first. A scrambling initialization process may be understood as a process of generating an initial value of a scrambling sequence, and then scrambling the signals of data and each correlated channel by using the scrambling sequence generated based on the initial value of the scrambling sequence.

In a signal scrambling method provided by an embodiment of this application, a communications apparatus may determine an initial value of a scrambling sequence based on a time unit number corresponding to a frame structure parameter used for transmitting a signal, or a communications apparatus may determine an initial value of a scrambling sequence based on a scrambling identity, or a communications apparatus may determine an initial value of a scrambling sequence based on a scrambling identity and a time unit number corresponding to a frame structure parameter used for transmitting a signal. The scrambling identity includes at least one of a terminal identity, a cell identity, a CBG configuration parameter, a frame structure parameter, a BWP configuration parameter, a QCL configuration parameter, a control channel resource configuration parameter, a CW configuration parameter, and the like. After determining the initial value of the scrambling sequence, the communications apparatus may obtain the scrambling sequence based on the initial value of the scrambling sequence, and scramble the signal by using the obtained scrambling sequence. Therefore, for various scenarios in 5G NR, for example, different slot structures, different CBGs, no cell ID, and different frame structures, interference randomization is implemented for signal scrambling, and performance is improved.

A signal scrambling method and apparatus, and a signal descrambling method and apparatus provided by embodiments of this application may be applied to a wireless communications network, and are mainly described by using a scenario in a 5G NR network in the wireless communications network as an example. It should be pointed out that, the solutions in the embodiments of this application may be further applied to other wireless communications networks, and corresponding names may also be replaced with names of corresponding functions in other wireless communications networks.

Figure 2:
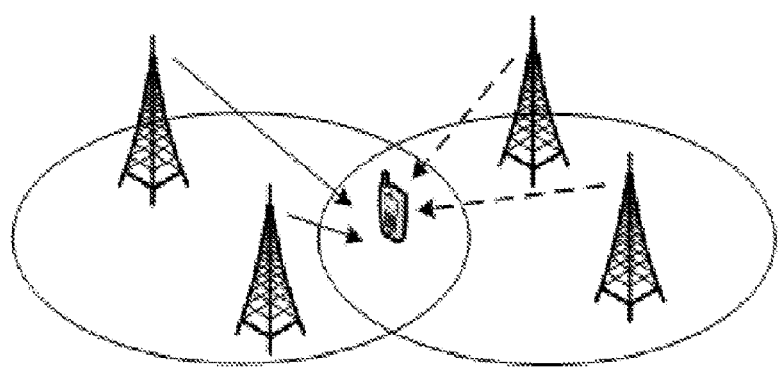
FIG. 2 is a schematic diagram of a scenario of multi-antenna site coordinated transmission or single-cell transmission.

In a main application scenario, using conventional coordinated multi-point transmission (CoMP) as a background, a multiple input multiple output (MIMO) technology including a plurality of technologies such as a diversity technology for improving transmission reliability and a multi-stream technology for improving a transmission data rate is combined with CoMP to form a distributed multi-antenna system to better serve users. In the embodiments of this application, single-cell transmission is mainly used as an example for description. In single-cell transmission, at a same scheduling time, only one cell or transmission point transmits data for a terminal. FIG. 2 is a schematic diagram of a scenario of multi-antenna site coordinated transmission or single-cell transmission.

It should be pointed out that, the signal scrambling method and apparatus provided by the embodiments of this application are applicable to both a homogeneous network scenario and a heterogeneous network scenario, and are applicable to both a frequency division duplex (FDD) system and a time division duplex (TDD) system or a flexible duplex system, and are not only applicable to a low-frequency scenario (for example, sub 6G) but also applicable to a high-frequency scenario (for example, 6G or higher). In the embodiments of this application, the transmission points are not limited either, and the transmission may be coordinated multi-point transmission between macro base stations, or coordinated multi-point transmission between micro base stations, or coordinated multi-point transmission between a macro base station and a micro base station, or coordinated multi-point transmission between different transmission points, or coordinated multi-point transmission between different panels of a same transmission point, or may be coordinated multi-point transmission between terminals. This application is also applicable to communication between terminals. In the following embodiments of this application, communication between a network device and a terminal is used as an example for description.

In the embodiments of this application, a communications apparatus scrambling a signal may be a network device or a terminal, and a communications apparatus descrambling a signal may be a network device or a terminal. If the communications apparatus to which the scrambling method is applied is a network device, the communications apparatus to which the descrambling method is applied may be a terminal; or if the communications apparatus to which the scrambling method is applied is a terminal, the communications apparatus to which the descrambling method is applied may be a network device.

The following embodiment of this application is described by using an example in which a communications apparatus scrambling a signal is a network device and a communications apparatus descrambling a signal is a terminal.

Figure 3A:
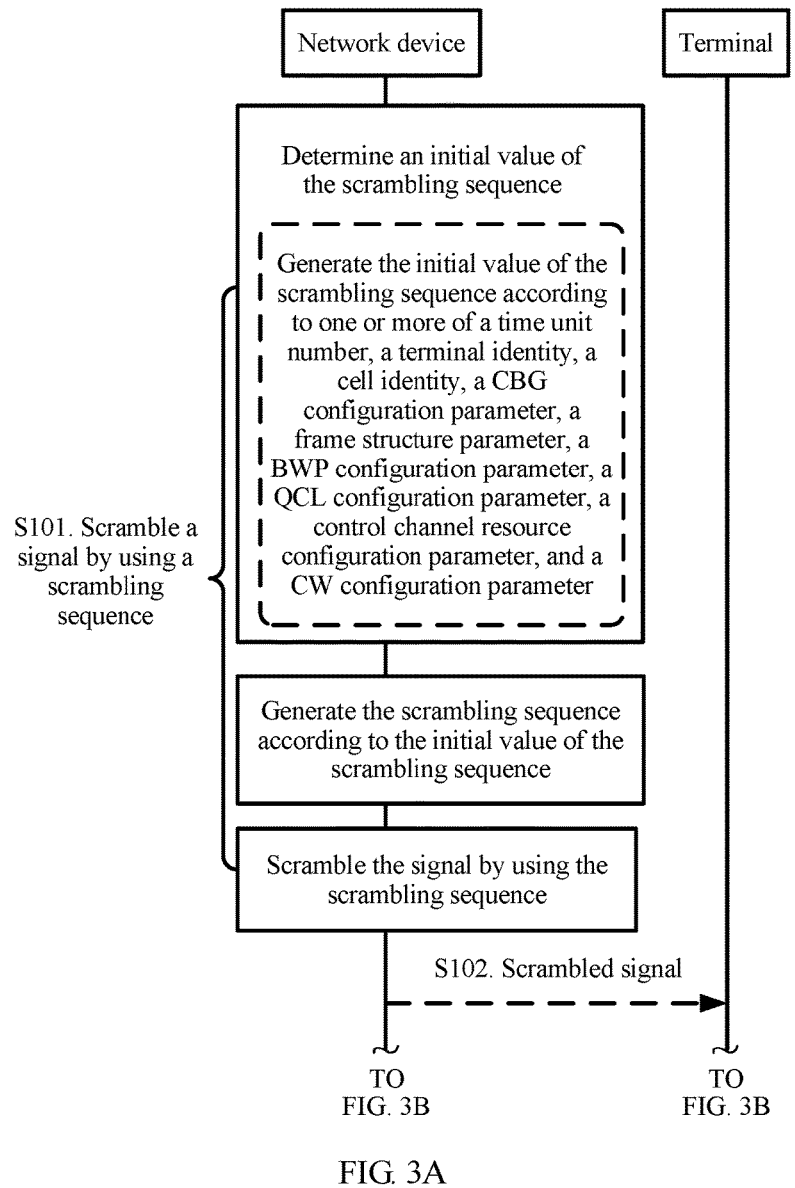
FIG. 3A and FIG. 3B are an implementation flowchart of a method for signal scrambling and descrambling according to an embodiment of this application.
Figure 3B:
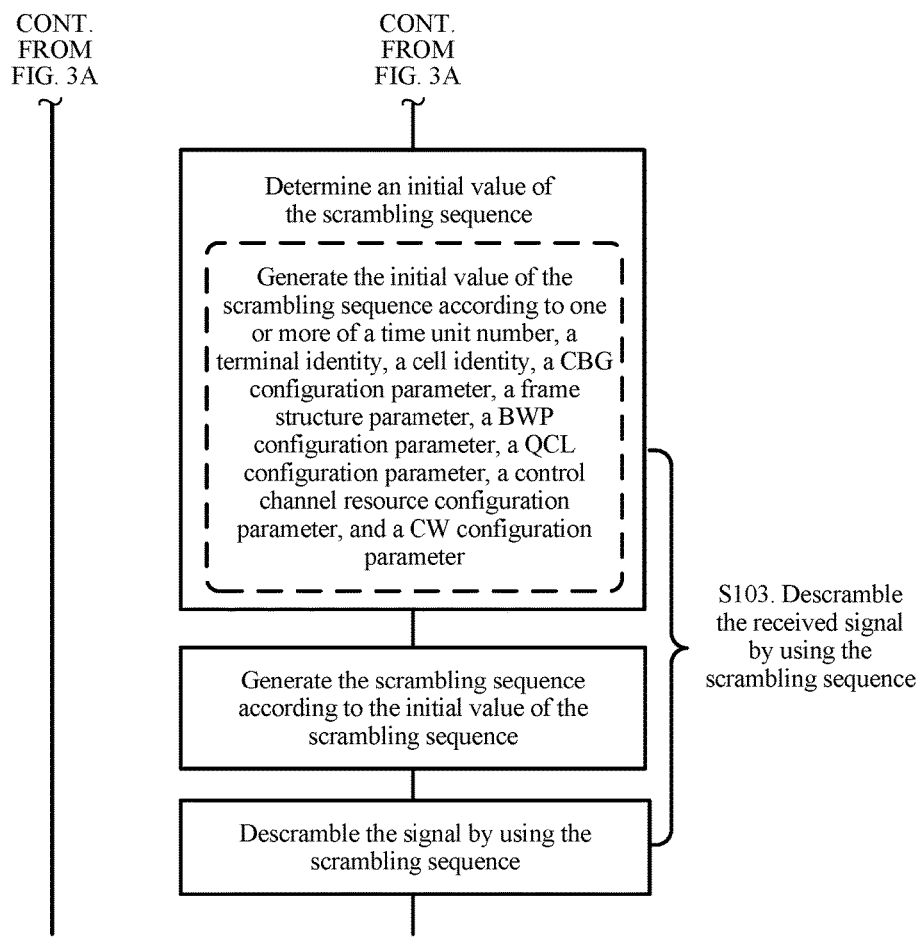

FIG. 3A and FIG. 3B are an implementation flowchart of a method for signal scrambling and descrambling according to an embodiment of this application. Referring to FIG. 3A and FIG. 3B, the method includes the following steps.

S101. A network device scrambles a signal by using a scrambling sequence.

In the embodiment of this application, the network device may generate an initial value of the scrambling sequence based on one or more of a time unit number corresponding to a frame structure parameter used for transmitting the signal, a terminal identity, a cell identity, a CBG configuration parameter, a frame structure parameter, a BWP configuration parameter, a QCL configuration parameter, a control channel resource configuration parameter, and a CW configuration parameter, generate the scrambling sequence based on the initial value of the scrambling sequence, and then scramble the signal by using the obtained scrambling sequence.

S102. The network device sends the scrambled signal, and the terminal receives the signal sent by the network device.

S103. The terminal descrambles the received signal by using the scrambling sequence.

In the embodiment of this application, after receiving the signal sent by the network device, the terminal may descramble the received signal based on the scrambling sequence same as the scrambling sequence used for scrambling the signal by the network device, where a manner of generating the scrambling sequence used by the terminal and the network device may be determined in a predefined manner.

The embodiment of this application is described above by using an example in which a communications apparatus scrambling a signal is a network device and a communications apparatus descrambling a signal is a terminal. An implementation process in which a communications apparatus scrambling a signal is a terminal and a communications apparatus descrambling a signal is a network device is similar to this, and a difference lies only in that the terminal scrambles the signal by using a scrambling sequence and the network device descrambles the signal by using the scrambling sequence. Other similarities are not further described herein.

With reference to specific embodiments of this application, the following describes an implementation process of generating an initial value of a scrambling sequence in the foregoing embodiment. For other steps performed in an implementation process of scrambling a signal in the foregoing embodiment, refer to existing solutions.

Embodiment 1

Figure 4:
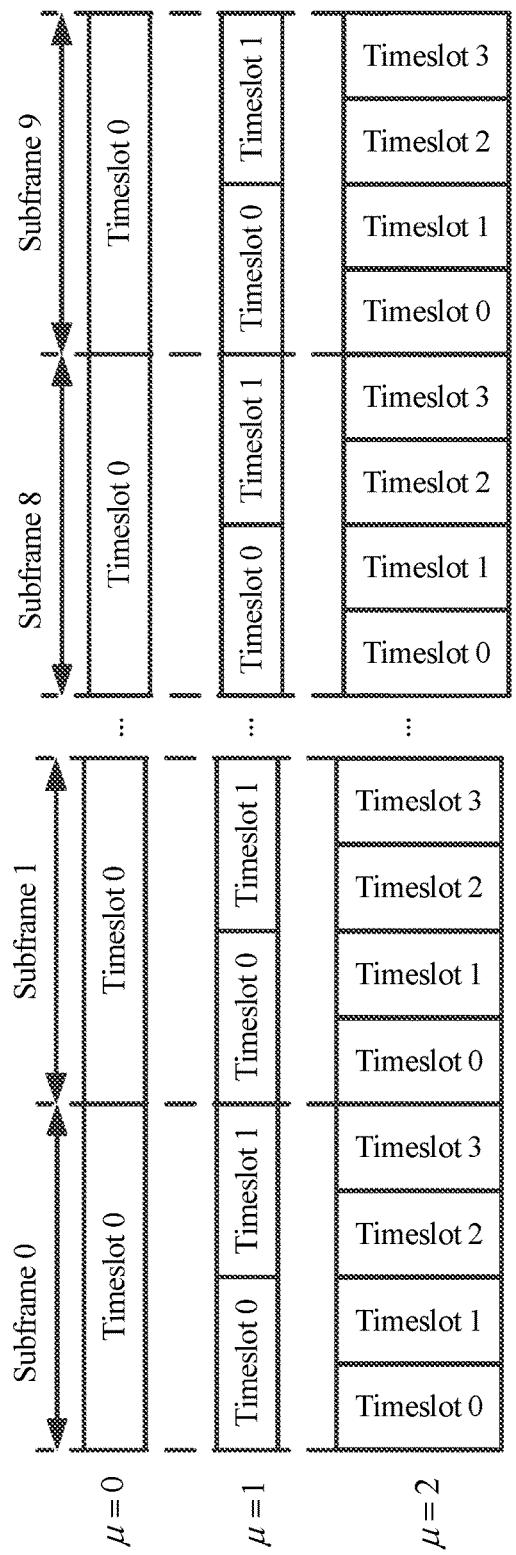
FIG. 4 is a schematic diagram of time unit numbers according to an embodiment of this application.
Figure 5:
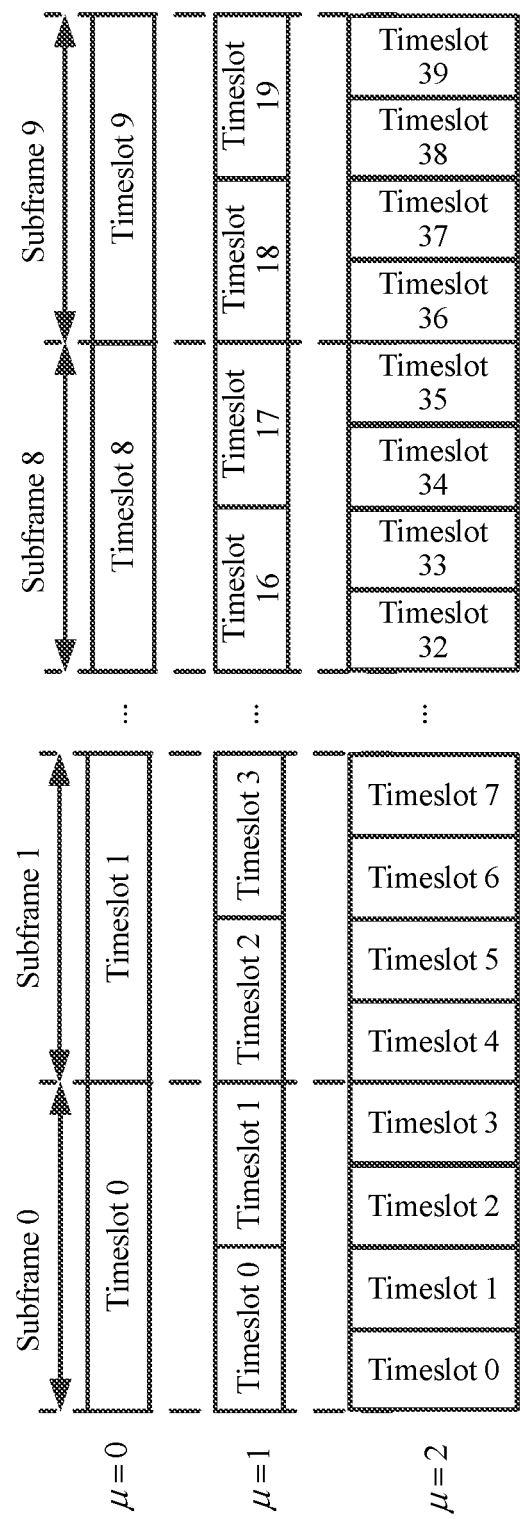
FIG. 5 is another schematic diagram of time unit numbers according to an embodiment of this application.

Determine an initial value of a scrambling sequence based on a time unit number for transmitting a signal In 5G NR, a plurality of frame structure parameters are supported, and if signals transmitted by different network devices use different frame structure parameters, time unit numbers (for example, slot numbers) corresponding to the frame structure parameters used for transmitting the signals may be different. For example, assuming that time unit numbers are slot numbers in a subframe, in FIG. 4, in a frame structure parameter in which a subcarrier spacing configuration parameter $\mu$ is 0, a slot number in a subframe is 0; in a frame structure parameter in which a subcarrier spacing configuration parameter $\mu$ is 1, slot numbers in a subframe are 0 and 1; or in a frame structure parameter in which a subcarrier spacing configuration parameter $\mu$ is 2, slot numbers in a subframe are 0 to 3. As can be learned from the example shown in FIG. 4, for a slot number in a subframe, slot numbers in subframes are repeated in a radio frame, and for different frame structure parameters, first slots in subframes have a same slot number in the subframes. Still using slot numbers in a radio frame as an example for description, in FIG. 5, in a frame structure parameter in which a subcarrier spacing configuration parameter $\mu$ is 0, slot numbers in a radio frame are 0 to 9; in a frame structure parameter in which a subcarrier spacing configuration parameter μ is 1, slot numbers in a radio frame are 0 to 19; or in a frame structure parameter in which a subcarrier spacing configuration parameter μ is 2, slot numbers in a radio frame are 0 to 39. As can be learned from the example shown in FIG. 5, for slot numbers in a radio frame, and for different frame structure parameters, first slots in radio frames have a same slot number. Besides, slots in each radio frame have different slot numbers in the frame.

In the embodiment of this application, a network device may determine an initial value of a scrambling sequence based on a time unit number for transmitting a signal, then generate the scrambling sequence by using the initial value of the scrambling sequence, and scramble the signal by using the scrambling sequence, to implement randomization for signal scrambling.

Specifically, optionally, when the network device determines the time unit number for transmitting the signal, the network device may first determine a frame structure parameter used for transmitting the signal, that is, determine at least one of a subcarrier spacing configuration parameter, a slot configuration parameter, and a CP structure parameter that are used for transmitting the signal, and then determine, by using the correspondences shown in Table 2 and Table 3, the time unit number for transmitting the signal. For example, by determining the CP structure parameter used for transmitting the signal, the network device may determine the time unit number for transmitting the signal by using Table 2 or Table 3. For example, when determining that the CP structure parameter used for transmitting the signal is a normal CP, the network device may determine the time unit number for transmitting the signal by using Table 2. The network device then determines the subcarrier spacing configuration parameter and a slot format corresponding to the slot configuration parameter that are used for transmitting the signal, and may determine a quantity of time units according to the correspondence between the subcarrier spacing configuration parameter and the slot format corresponding to the slot configuration parameter in Table 2, and may further determine that numbers of the time units are 0 to (the quantity of time units minus 1). For example, the slot format corresponding to the slot configuration parameter used for transmitting the signal is 0, the subcarrier spacing parameter μ is 2, and the time unit is a slot in a radio frame. In this case, the network device may determine that the slot format is 0 and that a quantity of slots in a radio frame corresponding to the subcarrier spacing parameter μ=2 is 40, ($N_{frame}^{slots,\mu}$=40), and may further determine that the frame structure parameter is a normal CP, and that the slot format is 0, and that the time unit number (a slot number in the radio frame) corresponding to the subcarrier spacing parameter μ=2 is one or more of 0 to 39.

The time unit for transmitting the signal in the radio frame may be a slot, or may be a subframe, or may be an OFDM symbol. The time unit number may be a slot number in the radio frame, a subframe number in the radio frame, a slot number in a subframe, or an OFDM symbol number in a slot. The time unit number is related to the frame structure parameter. A correspondence between the time unit number and the frame structure parameter may be determined with reference to Table 2 and Table 3 and by referring to the foregoing explanation and description about the time unit number. For a specific process of determining the time unit number, refer to the foregoing descriptions. Details are not further described exhaustively herein.

In the embodiment of this application, the foregoing process of determining the initial value of the scrambling sequence based on the time unit number and a scrambling identity is hereinafter described with reference to specific examples.

Example 1

Determine the initial value of the scrambling sequence based on a slot number ($n_{s,f}^\mu$) in a radio frame.

A scrambling sequence used for scrambling a signal is generally related to a type of a channel on which the signal is transmitted or a type of the signal. For example, a physical downlink data channel (PDSCH) is related to a terminal identity, a slot number, a cell identity, and a quantity of codewords transmitted in a single subframe. Scrambling of a physical multicast channel (PMCH) and a multimedia broadcast multicast service single frequency network (MBSFN) reference signal (RS) is related to a slot number and an MBSFN identity ($N_{ID}^{MBSFN}$). Scrambling of a physical downlink control channel (PDCCH), a physical control format indicator channel (PCFICH), and a hybrid automatic repeat request (HARQ) indicator channel (PHICH) is related to a slot number and a cell identity. Scrambling of a physical broadcast channel (PBCH), a physical uplink control channel (PUCCH) cyclic shift, a mirroring function, and group hopping is related to a cell identity. Scrambling of a PUCCH format 2/2a/2b, a physical uplink data channel (PUSCH), a terminal-specific reference signal (UE Specific RS), and the like is related to a terminal identity, a slot number, a cell identity, and the like. Scrambling of a cell-specific reference signal (Cell Specific RS) is related to a terminal identity, a slot number, a cell identity, and a cyclic prefix length ($N_{CP}$). Scrambling of a sequence number is related to a cell identity. Scrambling of a sounding reference signal (SRS) is related to a reference signal identity and a sequence shift $\Delta_{ss}\in\{0, 1, \ldots, 29\}$ configured by a higher layer. Scrambling of a channel state information reference signal (CSI-RS) is related to a CSI identity and a cyclic prefix length.

The foregoing example is merely a signal scrambling mode. Signals of the foregoing types may be scrambled by using other parameters; or optionally, signals of other types may be scrambled by using the foregoing parameters or other parameters. This is not specifically limited herein. The other types of signals or channels may be, for example, a tracking reference signal (TRS) that is used for performing time domain or frequency domain tracking or synchronization, and for performing time-frequency correction. The other types of signals or channels may be, for another example, a phase tracking reference signal (PTRS) that is used for performing phase tracking or synchronization, and for performing phase correction.

Therefore, in the embodiment of this application, to implement scrambling randomization of different signals, the scrambling identity used for generating the initial value of the scrambling sequence may be determined according to the type of the channel on which the signal is transmitted or the type of the signal.

In an embodiment of this application, the initial value of the scrambling sequence for the signal or channel may be determined according to the slot number in the radio frame. Further, optionally, the initial value of the scrambling sequence may also be determined with reference to another variable. This is not specifically limited herein.

Specifically, for example, in the embodiment of this application, the initial value for generating the scrambling sequence may be further determined according to the scrambling identity in addition to the time unit number corresponding to the frame structure parameter used for transmitting the signal. The scrambling identity is determined according to the channel on which the signal is transmitted or the type of the signal. For example, if the channel on which the signal is transmitted is a PUSCH, the scrambling identity may be a terminal identity, a cell identity, or the like. If the transmitted signal is a CSI-RS, the scrambling identity may be a CSI identity and a cyclic prefix length.

In the embodiment of this application, a process of generating an initial value used for generating a scrambling sequence used for scrambling a PUSCH data channel is used for description.

In the embodiment of this application, the network device may scramble the PUSCH data channel according to a terminal identity, a codeword number, a slot number in a radio frame, and a cell identity. The initial value of the scrambling sequence for scrambling the PUSCH data channel may satisfy the following formula:

$$c_{init} = n_{RNTI} \cdot 2^t + q \cdot 2^x + n_{s,f}^\mu \cdot 2^y + N_{ID}^{cell},$$

where $n_{RNTI}$ may be used to identify a terminal, that is, may be understood as a terminal identity, q represents a codeword number, $n_{s,f}^\mu$ represents a slot number in a radio frame and may be understood as a sequence number of a slot for transmitting a signal in the radio frame, $N_{ID}^{cell}$ represents a cell identity, $C_{init}$ represents the initial value of the scrambling sequence, t, x, and y are coefficient parameters in an initialization formula for determining the initial value of the scrambling sequence, and t, x, and y are positive integers.

Optionally, a coefficient parameter of a previous term in the initialization formula may be determined according to value ranges of variables and values of coefficient parameters of several subsequent terms. For example, a value of Y may be determined according to $N_{ID}^{cell}$. Because a quantity of cell identities in the 5G NR is 1008, if interference randomization is performed to distinguish different cells, 10 binary bits are required for quantization. Therefore, the value of y may be 10. A value of x may be determined according to $n_{s,f}^\mu$, $2^y$, and $N_{ID}^{cell}$ jointly. For example, when $n_{s,f}^\mu$ has 20 values, y=10, and $N_{ID}^{cell}$ has 1008 values, five binary bits are required for indicating the 20 values of $n_{s,f}^\mu$, and 10 binary bits are required for indicating the 1008 values of $N_{ID}^{cell}$. Therefore, x=5+10=15, which represents that interference randomization is performed by using 15 binary bits, and the value of x may be 15. A value of t may be determined according to $n_{s,f}^\mu$, $2^y$, $N_{ID}^{cell}$, and q. q represents a quantity of codewords transmitted in a single subframe. When a quantity of codewords transmitted in a subframe is 0 or 1, that is, q has two values, one binary bit is required for indicating the two values of q. For example, when q has two values, $n_{s,f}^\mu$ has 20 values, and $N_{ID}^{cell}$ has 1008 values, one binary bit is required for indicating the two values of q, and five binary bits are required for indicating the 20 values of $n_{s,f}^\mu$, and 10 binary bits are required for indicating the 1008 values of $N_{ID}^{cell}$. Therefore, t=1+5+10=16, and the value of t may be set to 16.

In a possible example of the embodiment of this application, a value of a coefficient parameter in the formula for determining the initial value of the scrambling sequence may be determined according to the subcarrier spacing parameter μ and the slot format, and different slot formats of each subcarrier spacing parameter μ correspond to different coefficient parameters. Therefore, different scrambling sequences are generated according to different slot formats, and scrambling randomization is implemented maximally. For example, the value of the coefficient parameter may be determined according to a corresponding maximum quantity of slots in each slot format of each subcarrier spacing parameter μ. For example, determining the value of the coefficient parameter x is used as an example for description:

Referring to Table 2 and Table 3, when the subcarrier spacing configuration parameter μ=0, and the slot format is that a slot includes seven or six OFDM symbols, $N_{frame}^{slots,\mu}=20$, a radio frame includes 20 slots, $n_{s,f}^\mu \in \{0, \ldots, 19\}$, $n_{s,f}^\mu$ has 20 values in total, to be indicated by using five binary bits, and 10 binary bits are required for indicating 1008 cell identities in the 5G NR. Therefore, the value of x is 10+5=15. When μ=0, and the slot format is that a slot includes 14 or 12 OFDM symbols, $N_{frame}^{slots,\mu}=10$, a radio frame includes 10 slots, $n_{s,f}^\mu \in \{0, \ldots, 9\}$, $n_{s,f}^\mu$ has 10 values in total, to be indicated by using four binary bits, and 10 binary bits are required for indicating 1008 cell identities in the 5G NR. Therefore, the value of x is 10+4=14.

Referring to Table 2 and Table 3, when the subcarrier spacing configuration parameter μ=1, and the slot format is that a slot includes seven or six OFDM symbols, $N_{frame}^{slots,\mu}=40$, a radio frame includes 40 slots, $n_{s,f}^\mu \in \{0, \ldots, 39\}$, $n_{s,f}^\mu$ has 40 values in total, to be indicated by using six binary bits, and 10 binary bits are required for indicating 1008 cell identities in the 5G NR. Therefore, the value of x is 10+6=16. When μ=1, and the slot format is that a slot includes 14 or 12 OFDM symbols, $N_{frame}^{slots,\mu}=20$, a radio frame includes 20 slots, $n_{s,f}^\mu \in \{0, \ldots, 19\}$, $n_{s,f}^\mu$ has 20 values in total, to be indicated by using five binary bits, and 10 binary bits are required for indicating 1008 cell identities in the 5G NR. Therefore, the value of x is 10+5=15.

Values of x corresponding to the remaining subcarrier spacing parameters μ and the slot formats shown in Table 2 and Table 3 may be obtained in a similar manner. Therefore, for a normal CP and an extended CP, a correspondence between the subcarrier spacing parameter μ, the slot format, and the value of x may be shown in the following Table 4 and Table 5 respectively.

TABLE 4

Correspondence between the subcarrier spacing parameter μ, the slot format, and the value of x for the normal CP

| | Slot configuration | | | | | | | |
| --- | --- | --- | --- | --- | --- | --- | --- | --- |
| | 0 | | | | 1 | | | |
| μ | $N_{symb}^\mu$ | $N_{frame}^{slots,\mu}$ | $N_{subframe}^{slots,\mu}$ | x | $N_{symb}^\mu$ | $N_{frame}^{slots,\mu}$ | $N_{subframe}^{slots,\mu}$ | x |
| 0 | 14 | 10 | 1 | 14 | 7 | 20 | 2 | 15 |
| 1 | 14 | 20 | 2 | 15 | 7 | 40 | 4 | 16 |
| 2 | 14 | 40 | 4 | 16 | 7 | 80 | 8 | 17 |
| 3 | 14 | 80 | 8 | 17 | — | — | — | — |

TABLE 4-continued

Correspondence between the subcarrier spacing parameter μ, the slot format, and the value of x for the normal CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 4 | 14 | 160 | 16 | 18 | — | — | — | — |
| 5 | 14 | 320 | 32 | 19 | — | — | — | — |

TABLE 5

Correspondence between the subcarrier spacing parameter μ, the slot format, and the value of x for the extended CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 0 | 12 | 10 | 1 | 14 | 6 | 20 | 2 | 15 |
| 1 | 12 | 20 | 2 | 15 | 6 | 40 | 4 | 16 |
| 2 | 12 | 40 | 4 | 16 | 6 | 80 | 8 | 17 |
| 3 | 12 | 80 | 8 | 17 | — | — | — | — |
| 4 | 12 | 160 | 16 | 18 | — | — | — | — |
| 5 | 12 | 320 | 32 | 19 | — | — | — | — |

In the embodiment of this application, the correspondence between the subcarrier spacing parameter μ, the slot format, and the value of x may be further shown in Table 6.

TABLE 6

Correspondence between the subcarrier spacing parameter μ, the slot format, and the value of x

| | Slot configuration | |
|---|---|---|
| | 0 | 1 |
| μ | x | x |
| 0 | 14 | 15 |
| 1 | 15 | 16 |
| 2 | 16 | 17 |
| 3 | 17 | |
| 4 | 18 | |
| 5 | 19 | |

In another possible example of the embodiment of this application, a value of a coefficient parameter in the formula for determining the initial value of the scrambling sequence may be determined according to the subcarrier spacing parameter μ, and each subcarrier spacing parameter μ corresponds to a different coefficient parameter. For example, a maximum quantity of slots in the subcarrier spacing parameter μ may be considered. For example, determining the value of the coefficient parameter x is used as an example for description:

Referring to Table 2 and Table 3, when the subcarrier spacing parameter μ=0, and the slot format is that a slot includes seven or six OFDM symbols, $N_{frame}^{slots,\mu}$=20, a radio frame includes 20 slots, $n_{s,f}^{\mu} \in \{0, \ldots, 19\}$, and $n_{s,f}^{\mu}$ has 20 values in total. However, when μ=0, and the slot format is that a slot includes 14 or 12 OFDM symbols, $N_{frame}^{slots,\mu}$=10, a radio frame includes 10 slots, $n_{s,f}^{\mu} \in \{0, \ldots, 9\}$, and $n_{s,f}^{\mu}$ has 10 values in total. Considering that five binary bits are required for indicating a maximum quantity of slots, that is, 20 values, and that 10 binary bits are required for indicating 1008 cell identities in the 5G NR, the value of x is 10+5=15.

Referring to Table 2 and Table 3, when the subcarrier spacing parameter μ=1, and the slot format is that a slot includes seven or six OFDM symbols, $N_{frame}^{slots,\mu}$=40, a radio frame includes 40 slots, $n_{s,f}^{\mu} \in \{0, \ldots, 39\}$, and $n_{s,f}^{\mu}$ has 40 values in total. However, when μ=1, and the slot format is that a slot includes 14 or 12 OFDM symbols, $N_{frame}^{slots,\mu}$=20, a radio frame includes 20 slots, $n_{s,f}^{\mu} \in \{0, \ldots, 19\}$, and $n_{s,f}^{\mu}$ has 20 values in total. Considering that six binary bits are required for indicating a maximum quantity of slots, that is, 40 values, and that 10 binary bits are required for indicating 1008 cell identities in the 5G NR, the value of x is 10+6=16.

Values of x corresponding to the remaining subcarrier spacing parameters μ shown in Table 2 and Table 3 may be obtained in a similar manner. Therefore, a correspondence between the subcarrier spacing parameter μ and the value of x may be shown in Table 7.

TABLE 7

| μ | x |
|---|---|
| 0 | 15 |
| 1 | 16 |
| 2 | 17 |
| 3 | 17 |
| 4 | 18 |
| 5 | 19 |

In still another possible example of the embodiment of this application, coefficient parameters corresponding to all frame structures may be the same. For example, the value of x may be determined according to a maximum quantity of slots included in a radio frame. For example, the maximum quantity of slots included in the radio frame is 320, that is, nine bits are required for quantization, and the value of x may be set to 19.

In the embodiment of this application, initial values of scrambling sequences for other channels or signals may be determined in a similar manner, and a difference lies only in that used scrambling identities need to be determined according to types of the channels or types of the signals. The following Table 8 lists several possible correspondences between initial values of scrambling sequences for channels or signals, slot numbers in a radio frame, and scrambling identities.

TABLE 8

| | |
|---|---|
| PDSCH | $c_{init} = n_{RNTI} 2^t + q2^x + n_{s,f}^{\mu} 2^y + N_{ID}^{cell}$ |
| PMCH | $c_{init} = n_{s,f}^{\mu} 2^y + N_{ID}^{MBSFN}$ |
| PDCCH | $c_{init} = n_{s,f}^{\mu} 2^y + N_{ID}^{cell}$ |
| PCFICH | $c_{init} = (n_{s,f}^{\mu} + 1)(2N_{ID}^{cell} + 1)2^y + N_{ID}^{cell}$ |
| PHICH | $c_{init} = (n_{s,f}^{\mu} + 1)(2N_{ID}^{cell} + 1)2^y + N_{ID}^{cell}$ |
| PUCCH format 2/2a/2b | $c_{init} = (n_{s,f}^{\mu} + 1)(2N_{ID}^{cell} + 1)2^y + n_{RNTI}$ |
| PUSCH | $c_{init} = n_{RNTI} \cdot 2^t + q \cdot 2^x + n_{s,f}^{\mu} \cdot 2^y + N_{ID}^{cell}$ |
| Cell specific RS | $c_{init} = 2^y \cdot (7 \cdot (n_{s,f}^{\mu} + 1) + l + 1) \cdot (2 \cdot N_{ID}^{cell} + 1) + 2 \cdot N_{ID}^{cell} + N_{CP}$ |
| MBSFN RS | $c_{init} = 2^y \cdot (7 \cdot (n_{s,f}^{\mu} + 1) + l + 1) \cdot (2 \cdot N_{ID}^{MBSFN} + 1) + N_{ID}^{MBSFN}$ |
| UE specific RS | $c_{init} = (n_{s,f}^{\mu} + 1)(2N_{ID}^{cell} + 1)2^y + n_{RNTI}$ |
| CSI-RS | $c_{init} = 2^y \cdot (7 \cdot (n_{s,f}^{\mu} + 1) + l + 1) \cdot (2 \cdot N_{ID}^{cell} + 1) + 2 \cdot N_{ID}^{cell} + N_{CP}$ or $c_{init} = 2^y \cdot (7 \cdot (n_{s,f}^{\mu} + 1) + l + 1) \cdot (N_{ID}^{cell} + 1) + N_{ID}^{cell}$ |

For explanations about parameters used in each formula in the table that are the same as those used in the foregoing embodiment, refer to explanations about the parameters used in the foregoing embodiment. The following explains only parameters that are not used in the descriptions in the foregoing embodiment. l represents an OFDM symbol number in a slot.

In the embodiment of this application, the initial value of the scrambling sequence is determined in the foregoing manner, and the signal is scrambled by using the scrambling sequence generated by using the initial value of the scrambling sequence. Scrambling signals in different slot formats in different frame structure parameters is supported, and slot numbers in a radio frame do not overlap each other. This avoids occurrence of same scrambling sequences to some extent, and can further avoid occurrence of an interference overlapping problem to some extent. Interference between different transmission frame structure parameters can be randomized, interference between different slots in a subframe can also be randomized, and therefore, interference randomization is implemented.

Further, in the foregoing embodiment, the coefficient parameter in the initialization formula used in the process of determining the initial value of the scrambling sequence is determined according to a quantity of cell identities. Therefore, cell identities of different cells in the 5G NR can be distinguished. This avoids occurrence of same scrambling sequences to some extent, and can further avoid occurrence of an interference overlapping problem to some extent. Therefore, interference randomization is implemented to some extent.

In the embodiment of this application, for an application scenario in which there is no cell identity in the 5G NR, the network device may scramble the PUSCH data channel according to a terminal identity, a codeword number, and a slot number in a radio frame. The initial value of the scrambling sequence for scrambling the PUSCH data channel may satisfy the following formula:

$$c_{init} = n_{RNTI} 2^t + q \cdot 2^x + n_{s,f}^{\mu},$$

where $n_{RNTI}$ may be used to identify a terminal, that is, may be understood as a terminal identity, q represents a codeword number, $n_{s,f}^{\mu}$ represents a slot number in a radio frame and may be understood as a sequence number of a slot for transmitting a signal in the radio frame, $C_{init}$ represents the initial value of the scrambling sequence, t and x are coefficient parameters in an initialization formula for determining the initial value of the scrambling sequence, and t and x are positive integers.

Likewise, a coefficient parameter of a previous term in the initialization formula may be determined according to value ranges of variables and values of coefficient parameters of several subsequent terms. A specific determining manner is similar to the foregoing process of determining a coefficient parameter when there is a cell identity, and a difference lies only in that a quantity of cell identities in the 5G NR may not be considered when there is no cell identity. Similarities are not further described herein.

t=1+5=6 may be obtained in a manner same as the foregoing manner of determining a coefficient parameter. A value range of x is x∈{4, 5, 6, 7, 8, 9}.

In the embodiment of this application, a value of a coefficient parameter in the formula for determining the initial value of the scrambling sequence may be determined according to the subcarrier spacing parameter and the slot format, for example, may be determined according to a corresponding maximum quantity of slots in each slot format of each subcarrier spacing parameter. For a normal CP and an extended CP, a correspondence between the subcarrier spacing parameter μ, the slot format, and the value of x may be shown in the following Table 9 and Table 10 respectively.

TABLE 9

Correspondence between the subcarrier spacing parameter μ, the slot format, and the value of x for the normal CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 0 | 14 | 10 | 1 | 4 | 7 | 20 | 2 | 5 |
| 1 | 14 | 20 | 2 | 5 | 7 | 40 | 4 | 6 |
| 2 | 14 | 40 | 4 | 6 | 7 | 80 | 8 | 7 |
| 3 | 14 | 80 | 8 | 7 | — | — | — | — |
| 4 | 14 | 160 | 16 | 8 | — | — | — | — |
| 5 | 14 | 320 | 32 | 9 | — | — | — | — |

TABLE 10

Correspondence between the subcarrier spacing parameter μ, the slot format, and the value of x for the extended CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 0 | 12 | 10 | 1 | 4 | 6 | 20 | 2 | 5 |
| 1 | 12 | 20 | 2 | 5 | 6 | 40 | 4 | 6 |
| 2 | 12 | 40 | 4 | 6 | 6 | 80 | 8 | 7 |
| 3 | 12 | 80 | 8 | 7 | — | — | — | |
| 4 | 12 | 160 | 16 | 8 | — | — | — | |
| 5 | 12 | 320 | 32 | 9 | — | — | — | |

In the embodiment of this application, the correspondence between the subcarrier spacing parameter μ, the slot format, and the value of x may be further shown in Table 11.

TABLE 11

Correspondence between the subcarrier spacing parameter μ, the slot format, and the value of x

| | Slot configuration | |
|---|---|---|
| | 0 | 1 |
| μ | x | x |
| 0 | 4 | 5 |
| 1 | 5 | 6 |
| 2 | 6 | 7 |
| 3 | 7 | |
| 4 | 8 | |
| 5 | 9 | |

In the embodiment of this application, when the value of the coefficient parameter in the formula for determining the initial value of the scrambling sequence may be determined according to the subcarrier spacing parameter μ, for example, may be determined according to a corresponding maximum quantity of slots in each subcarrier spacing parameter μ, a correspondence between the subcarrier spacing parameter μ and the value of x may be shown in Table 12.

TABLE 12

| μ | x |
|---|---|
| 0 | 5 |
| 1 | 6 |
| 2 | 7 |
| 3 | 7 |
| 4 | 8 |
| 5 | 9 |

In another possible example of the embodiment of this application, coefficient parameters corresponding to all frame structures may be the same. For example, the value of x may be determined according to a maximum quantity of slots included in a radio frame. For example, the maximum quantity of slots included in the radio frame is 320, that is, nine bits are required for quantization, and the value of x may be set to 9.

In the embodiment of this application, for an application scenario in which there is no cell identity, initial values of scrambling sequences for other channels or signals may be determined in a similar manner, and a difference lies only in that used scrambling identities need to be determined according to types of the channels or types of the signals. The following Table 13 lists several possible correspondences between initial values of scrambling sequences for channels or signals, slot numbers in a radio frame, and scrambling identities.

TABLE 13

| PDSCH | $c_{init} = n_{RNTI} \cdot 2^r + q 2^x + n_{s,f}^{\mu}$ |
|---|---|
| PMCH | $c_{init} = n_{s,f}^{\mu}$ |
| PDCCH | $c_{init} = n_{s,f}^{\mu}$ |
| PCFICH | $c_{init} = n_{s,f}^{\mu} + 1$ |
| PHICH | $c_{init} = n_{s,f}^{\mu} + 1$ |
| PUCCH format 2/2a/2b | $c_{init} = (n_{s,f}^{\mu} + 1) 2^y + n_{RNTI}$ |
| PUSCH | $c_{init} = n_{RNTI} \cdot 2^r + q \cdot 2^x + n_{s,f}^{\mu}$ |
| Cell specific RS | $c_{init} = 2^y \cdot (7 \cdot (n_{s,f}^{\mu} + 1) + l + 1) + N_{CP}$ or $c_{init} = 7 \cdot (n_{s,f}^{\mu} + 1) + l + 1$ |
| MBSFN RS | $c_{init} = 7 \cdot (n_{s,f}^{\mu} + 1) + l + 1$ |
| UE specific RS | $c_{init} = (n_{s,f}^{\mu} + 1) 2^y + n_{RNTI}$ |
| CSI-RS | $c_{init} = 2^y \cdot (7 \cdot (n_{s,f}^{\mu} + 1) + l + 1) + N_{CP}$ or $c_{init} = 7 \cdot (n_{s,f}^{\mu} + 1) + l + 1$ |

In an implementation of determining an initial value of a scrambling sequence according to the embodiment of this application, different scrambling sequences may be generated for different slot formats, but computational complexity is relatively high. In another possible example of the embodiment of this application, a corresponding coefficient parameter may be determined for each frame structure parameter, and this ensures scrambling randomization to some extent and can also reduce computational complexity.

In a possible example of this application, in the process of determining the initial value of the scrambling sequence based on the slot number ($n_{s,f}^{\mu}$) in the radio frame, the initial value of the scrambling sequence may be determined according to the slot format indicated by the slot configuration parameter. For example, formulas for scrambling initialization may be different. Specifically, for example, the initial value of the scrambling sequence may be determined according to a numeric value corresponding to the slot number in the radio frame, or the initial value of the scrambling sequence is determined according to a numeric value obtained by rounding down a half of a numeric value corresponding to the slot number in the radio frame. Generally, when the slot format indicated by the slot configuration parameter is that a slot includes seven or six OFDM symbols, the initial value of the scrambling sequence may be determined according to the numeric value obtained by rounding down a half of the numeric value corresponding to the slot number in the radio frame; or when the slot format indicated by the slot configuration parameter is that a slot includes 14 or 12 OFDM symbols, the initial value of the scrambling sequence may be determined according to the numeric value corresponding to the slot number in the radio frame.

For example, when the slot format indicated by the slot configuration parameter is that a slot includes seven or six OFDM symbols, and the network device scrambles the PUSCH data channel according to a terminal identity, a codeword number, a slot number in a radio frame, and a cell identity, the terminal identity, the codeword number, the slot number in the radio frame, and the cell identity may satisfy the following formula:

$$C_{init} = n_{RNTI} \cdot 2^t + q \cdot 2^x + \lfloor n_{s,f}^{\mu}/2 \rfloor \cdot 2^y + N_{ID}^{cell}.$$

When the slot format indicated by the slot configuration parameter is that a slot includes 14 or 12 OFDM symbols, and the network device scrambles the PUSCH data channel according to a terminal identity, a codeword number, a slot number in a radio frame, and a cell identity, the terminal identity, the codeword number, the slot number in the radio frame, and the cell identity may satisfy the following formula:

$$C_{init} = n_{RNTI} \cdot 2^t + q \cdot 2^x + n_{s,f}^{\mu} \cdot 2^y + N_{ID}^{cell},$$

where $n_{RNTI}$ may be used to identify a terminal, that is, may be understood as a terminal identity, q represents a codeword number, $n_{s,f}^{\mu}$ represents a slot number in a radio frame and may be understood as a sequence number of a slot for transmitting a signal in the radio frame, $N_{ID}^{cell}$ represents a cell identity, $C_{init}$ represents the initial value of the scrambling sequence, t, x, and y are coefficient parameters in an initialization formula for determining the initial value of the scrambling sequence, and t, x, and y are positive integers.

A specific manner of determining values of coefficient parameters t, x, and y in the embodiment of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter µ and the slot format; the value of the coefficient parameter in the formula for determining the initial value of the scrambling sequence may be determined according to the subcarrier spacing parameter; and the value of the coefficient parameter in the formula for determining the initial value of the scrambling sequence may be determined according to a maximum quantity of time units.

A difference lies only in that when the slot format indicated by the slot configuration parameter is that a slot includes seven or six OFDM symbols, when the value of x is to be determined, the value needs to be determined according to the value of $\lfloor n_{s,f}^{\mu}/2 \rfloor$. For example, when $n_{s,f}^{\mu}$ has 20 values, y=10, and $N_{ID}^{cell}$ has 1008 values, a numeric value corresponding to $\lfloor n_{s,f}^{\mu}/2 \rfloor$ is 10, and four binary bits are required for indicating 10 values of $\lfloor n_{s,f}^{\mu}/2 \rfloor$. Therefore, x=4+10=14, which represents that 14 binary bits are used to perform interference randomization. Similarly, t=1+4+10=15 is determined.

A manner similar to the manner of determining the coefficient parameter x in the foregoing embodiment is used in the embodiment of this application. For a normal CP and an extended CP, a determined value range of the coefficient parameter x is $x \in \{14,15,16,17,18,19\}$. A correspondence between the determined value of the coefficient parameter x, the subcarrier spacing parameter µ, and the slot format may be shown in Table 14 and Table 15.

TABLE 14

Correspondence between the subcarrier spacing parameter µ and the value of x for the normal CP

| | | Slot configuration | | | | | |
|---|---|---|---|---|---|---|---|
| | | 0 | | | 1 | | |
| µ | x | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 14 | 10 | 1 | 7 | 20 | 2 |
| 1 | 15 | 14 | 20 | 2 | 7 | 40 | 4 |
| 2 | 16 | 14 | 40 | 4 | 7 | 80 | 8 |
| 3 | 17 | 14 | 80 | 8 | — | — | — |
| 4 | 18 | 14 | 160 | 16 | — | — | — |
| 5 | 19 | 14 | 320 | 32 | — | — | — |

TABLE 15

Correspondence between the subcarrier spacing parameter µ and the value of x for the extended CP

| | | Slot configuration | | | | | |
|---|---|---|---|---|---|---|---|
| | | 0 | | | 1 | | |
| µ | x | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 12 | 10 | 1 | 6 | 20 | 2 |
| 1 | 15 | 12 | 20 | 2 | 6 | 40 | 4 |
| 2 | 16 | 12 | 40 | 4 | 6 | 80 | 8 |
| 3 | 17 | 12 | 80 | 8 | — | — | — |
| 4 | 18 | 12 | 160 | 16 | — | — | — |
| 5 | 19 | 12 | 320 | 32 | — | — | — |

In the embodiment of this application, the correspondence between the subcarrier spacing parameter μ and the value of x may be further shown in Table 16.

TABLE 16

| μ | x |
|---|---|
| 0 | 14 |
| 1 | 15 |
| 2 | 16 |
| 3 | 17 |
| 4 | 18 |
| 5 | 19 |

In another possible example of the embodiment of this application, coefficient parameters corresponding to all frame structures may be the same. For example, the value of x may be determined according to a maximum quantity of slots included in a radio frame. For example, the maximum quantity of slots included in the radio frame is 320, and nine bits are required for quantization. For example, the value of x may be set to 19.

Similarly, for an application scenario in which there is no cell identity in the 5G NR, a manner same as the foregoing manner of determining a coefficient parameter may be used to obtain a value range of x, and the value range is x∈{4, 5, 6, 7, 8, 9}. For a normal CP and an extended CP, a correspondence between the subcarrier spacing parameter μ, the slot format, and the value of x may be shown in the following Table 17 and Table 18 respectively.

In the embodiment of this application, the correspondence between the subcarrier spacing parameter μ and the value of x may be further shown in Table 19.

TABLE 19

| μ | x |
|---|---|
| 0 | 4 |
| 1 | 5 |
| 2 | 6 |
| 3 | 7 |
| 4 | 8 |
| 5 | 9 |

In another possible example of the embodiment of this application, coefficient parameters corresponding to all frame structures may be the same. For example, the value of x may be determined according to a maximum quantity of slots included in a radio frame. For example, the maximum quantity of slots included in the radio frame is 320, and nine bits are required for quantization. For example, the value of x may be set to 9.

In the embodiment of this application, when there is a cell identity, initial values of scrambling sequences for other channels or signals may be determined in a similar manner, and a difference lies only in that used scrambling identities need to be determined according to types of the channels or types of the signals. The following Table 20 lists several possible correspondences between initial values of scrambling sequences for channels or signals, slot numbers in a

TABLE 17

Correspondence the subcarrier spacing parameter μ and the value of x for the normal CP

| | | Slot configuration | | | | | |
|---|---|---|---|---|---|---|---|
| | | 0 | | | 1 | | |
| μ | x | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 4 | 14 | 10 | 1 | 7 | 20 | 2 |
| 1 | 5 | 14 | 20 | 2 | 7 | 40 | 4 |
| 2 | 6 | 14 | 40 | 4 | 7 | 80 | 8 |
| 3 | 7 | 14 | 80 | 8 | — | — | — |
| 4 | 8 | 14 | 160 | 16 | — | — | — |
| 5 | 9 | 14 | 320 | 32 | — | — | — |

TABLE 18

Corresponence between the subcarrier spacing parameter μ and the value of x for the extended CP

| | | Slot configuration | | | | | |
|---|---|---|---|---|---|---|---|
| | | 0 | | | 1 | | |
| μ | x | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 4 | 12 | 10 | 1 | 6 | 20 | 2 |
| 1 | 5 | 12 | 20 | 2 | 6 | 40 | 4 |
| 2 | 6 | 12 | 40 | 4 | 6 | 80 | 8 |
| 3 | 7 | 12 | 80 | 8 | — | — | — |
| 4 | 8 | 12 | 160 | 16 | — | — | — |
| 5 | 9 | 12 | 320 | 32 | — | — | — | radio frame, and scrambling identities when the slot format indicated by the slot configuration parameter is that a slot includes seven or six OFDM symbols.

TABLE 20

| | |
|---|---|
| PDSCH | $n_{RNTI} 2^t + q2^x + \lfloor n_{s,f}^\mu/2 \rfloor 2^y + N_{ID}^{cell}$ |
| PMCH | $\lfloor n_{s,f}/2 \rfloor 2^y + N_{ID}^{MBSFN}$ |
| PDCCH | $\lfloor n_{s,f}/2 \rfloor 2^y + N_{ID}^{cell}$ |
| PCFICH | $c_{init} = (\lfloor n_{s,f}^\mu/2 \rfloor + 1)(2N_{ID}^{cell} + 1)2^y + N_{ID}^{cell}$ |
| PHICH | $c_{init} = (\lfloor n_{s,f}^\mu/2 \rfloor + 1)(2N_{ID}^{cell} + 1)2^y + N_{ID}^{cell}$ |
| PUCCH format 2/2a/2b | $c_{init} = (\lfloor n_{s,f}^\mu/2 \rfloor + 1)(2N_{ID}^{cell} + 1)2^y + n_{RNTI}$ |
| PUSCH | $c_{init} = n_{RNTI} \cdot 2^t + q \cdot 2^x + \lfloor n_{s,f}^\mu/2 \rfloor \cdot 2^y + N_{ID}^{cell}$ |
| Cell specific RS | $c_{init} = 2^y \cdot (7 \cdot (\lfloor n_{s,f}^\mu/2 \rfloor + 1) + l + 1) \cdot (2 \cdot N_{ID}^{cell} + 1) + 2 \cdot N_{ID}^{cell} + N_{CP}$ |
| MBSFN RS | $c_{init} = 2^y \cdot (7 \cdot (\lfloor n_{s,f}^\mu/2 \rfloor + 1) + l + 1) \cdot (2 \cdot N_{ID}^{MBSFN} + 1) + N_{ID}^{MBSFN}$ |
| UE specific RS | $c_{init} = (\lfloor n_{s,f}^\mu/2 \rfloor + 1)(2N_{ID}^{cell} + 1)2^y + n_{RNTI}$ |
| CSI-RS | $c_{init} = 2^y \cdot (7 \cdot (\lfloor n_{s,f}^\mu/2 \rfloor + 1) + l + 1) \cdot (2 \cdot N_{ID}^{cell} + 1) + 2 \cdot N_{ID}^{cell} + N_{CP}$ or $c_{init} = 2^y \cdot (7 \cdot (\lfloor n_{s,f}^\mu/2 \rfloor + 1) + l + 1) \cdot (N_{ID}^{cell} + 1) + N_{ID}^{cell}$ |

When there is a cell identity, and the slot format indicated by the slot configuration parameter is that a slot includes 14 or 12 OFDM symbols, several possible correspondences between initial values of scrambling sequences for channels or signals, slot numbers in a radio frame, and scrambling identities are the same as the several possible correspondences between initial values of scrambling sequences for channels or signals, slot numbers in a radio frame, and scrambling identities as shown in Table 8. Details are not further described herein.

The following Table 21 lists several possible correspondences between initial values of scrambling sequences for channels or signals, slot numbers in a radio frame, and scrambling identities when there is a cell identity and the slot format indicated by the slot configuration parameter is that a slot includes 14 or 12 OFDM symbols.

TABLE 21

| | |
|---|---|
| PDSCH | $n_{RNTI} 2^t + q2^x + n_{s,f}^\mu 2^y + N_{ID}^{cell}$ |
| PMCH | $n_{s,f}^\mu 2^y + N_{ID}^{MBSFN}$ |
| PDCCH | $n_{s,f}^\mu 2^y + N_{ID}^{cell}$ |
| PCFICH | $c_{init} = (n_{s,f}^\mu + 1)(2N_{ID}^{cell} + 1)2^y + N_{ID}^{cell}$ |
| PHICH | $c_{init} = (n_{s,f}^\mu + 1)(2N_{ID}^{cell} + 1)2^y + N_{ID}^{cell}$ |
| PUCCH format 2/2a/2b | $c_{init} = (n_{s,f}^\mu + 1)(2N_{ID}^{cell} + 1)2^y + n_{RNTI}$ |
| PUSCH | $c_{init} = n_{RNTI} \cdot 2^t + q \cdot 2^x + n_{s,f}^\mu \cdot 2^y + N_{ID}^{cell}$ |
| Cell specific RS | $c_{init} = 2^y \cdot (7 \cdot (n_{s,f}^\mu + 1) + l + 1) \cdot (2 \cdot N_{ID}^{cell} + 1) + 2 \cdot N_{ID}^{cell} + N_{CP}$ |
| MBSFN RS | $c_{init} = 2^y \cdot (7 \cdot (n_{s,f}^\mu + 1) + l + 1) \cdot (2 \cdot N_{ID}^{MBSFN} + 1) + N_{ID}^{MBSFN}$ |
| UE specific RS | $c_{init} = (n_{s,f}^\mu + 1)(2N_{ID}^{cell} + 1)2^y + n_{RNTI}$ |
| CSI-RS | $c_{init} = 2^y \cdot (7 \cdot (n_{s,f}^\mu + 1) + l + 1) \cdot (2 \cdot N_{ID}^{cell} + 1) + 2 \cdot N_{ID}^{cell} + N_{CP}$ or $c_{init} = 2^y \cdot (7 \cdot (n_{s,f}^\mu + 1) + l + 1) \cdot (N_{ID}^{cell} + 1) + N_{ID}^{cell}$ |

When there is no cell identity, and the slot format indicated by the slot configuration parameter is that a slot includes 14 or 12 OFDM symbols, several possible correspondences between initial values of scrambling sequences for channels or signals, slot numbers in a radio frame, and scrambling identities are the same as the several possible correspondences between initial values of scrambling sequences for channels or signals, slot numbers in a radio frame, and scrambling identities as shown in Table 13. Details are not further described herein.

In the implementation of determining the initial value of the scrambling sequence based on the slot number ($n_{s,f}^\mu$) in the radio frame in the example 1 of this application, the signal may be scrambled according to different slot formats. This improves performance of interference randomization. In addition, a scrambling mode irrelevant to a cell identity is provided, and can be applicable to an application scenario in which there is no cell identity in the 5G NR.

Example 2

Determine the initial value of the scrambling sequence based on a subframe number ($n_{sf}$) in a radio frame and a slot number ($n_s^\mu$) in a subframe.

In the embodiment of this application, the initial value of the scrambling sequence for the signal or channel may be determined according to the subframe number ($n_{sf}$) in the radio frame and the slot number ($n_s^\mu$) in the subframe.

Further, optionally, the initial value of the scrambling sequence may also be determined with reference to another variable. This is not specifically limited herein.

In the example 2 of this application, a process of generating an initial value of a scrambling sequence used for scrambling a PUSCH data channel is still used for description.

In the embodiment of this application, the network device may scramble the PUSCH data channel according to a terminal identity, a codeword number, a slot number in a subframe, a subframe number in a radio frame, and a cell identity. The initial value of the scrambling sequence for scrambling the PUSCH data channel may satisfy the following formula:

$$c_{init} = n_{RNTI} 2^t + q \cdot 2^x + n_s^\mu \cdot 2^y + n_{sf} 2^z + N_{ID}^{cell},$$

where $n_{RNTI}$ may be used to identify a terminal, that is, may be understood as a terminal identity, q represents a codeword number, $n_s^\mu$ represents a slot number in a subframe and may be understood as a sequence number of a slot for transmitting a signal in the subframe in which the slot is located, $n_{sf}$ represents a subframe number in a radio frame, $n_{sf}$ may be determined by using a formula $$n_{sf} = \left\lfloor \frac{n_{s,f}^\mu}{N_{subframe}^{slots,\mu}} \right\rfloor,$$

$N_{ID}^{cell}$ represents a cell identity, $C_{init}$ represents the initial value of the scrambling sequence, t, x, y, and z are coefficient parameters in an initialization formula for determining the initial value of the scrambling sequence, and t, x, y, and z are positive integers.

Likewise, a coefficient parameter of a previous term in the initialization formula for determining the initial value of the scrambling sequence may be determined according to value ranges of variables and values of coefficient parameters of several subsequent terms. For example, a value of z may be determined according to a value of $N_{ID}^{cell}$. Because a quantity of cell identities in the 5G NR is 1008, 10 bits are required for interference randomization. Therefore, the value of z may be set to 10. A value of y may be determined according to $n_{sf}$, z, and $N_{ID}^{cell}$ jointly. For example, when a radio frame includes 10 subframes, and a subframe number $n_{sf}$ in the radio frame has 10 values, four binary bits are required for indicating the 10 values of $n_{sf}$; when $N_{ID}^{cell}$ has 1008 values, 10 binary bits are required for indicating the 1008 values of $N_{ID}^{cell}$, and z=10. Therefore, y=4+10=14, which represents that 14 binary bits are used to perform interference randomization. A value of x may be determined according to y, $n_{sf}$, z, and $N_{ID}^{cell}$ jointly. For example, when $n_s^{\mu}$ has two values, one binary bit is required for indicating the two values of $n_s^{\mu}$; when $n_{sf}$ has 10 values, four binary bits are required for indicating the 10 values of $n_{sf}$; when $N_{ID}^{cell}$ has 1008 values, 10 binary bits are required for indicating the 1008 values of $N_{ID}^{cell}$, and z=10. Therefore, x=1+4+10=15, which represents that 15 binary bits are used to perform interference randomization. A value of t may be determined according to q, y, $n_s^{\mu}$, z, and $N_{ID}^{cell}$ jointly. For example, when q has two values, one binary bit is required for indicating the two values of q; when $n_s^{\mu}$ has two values, one binary bit is required for indicating the two values of $n_s^{\mu}$; when $n_{sf}$ has 10 values, four binary bits are required for indicating the 10 values of $n_{sf}$; when $N_{ID}^{cell}$ has 1008 values, 10 binary bits are required for indicating the 1008 values of $N_{ID}^{cell}$. Therefore, t=1+1+4+10=16.

Likewise, a value of a coefficient parameter in the initialization formula for determining the initial value of the scrambling sequence may be applicable to the foregoing process of determining a coefficient parameter. The following three methods may be included: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter μ; and the value of the coefficient parameter in the formula for determining the initial value of the scrambling sequence may be determined according to a maximum quantity of time units.

For example, determining the value of the coefficient parameter x is used as an example for description:

A manner similar to the manner of determining the coefficient parameter x according to the subcarrier spacing parameter μ and the slot format in the foregoing embodiment is used in the embodiment of this application. For example, for a normal CP and an extended CP, a determined value range of the coefficient parameter x may be x∈{15,16,17,18,19}. For a normal CP and an extended CP, a correspondence between the subcarrier spacing parameter μ, the slot format, and the value of x may be shown in the following Table 22 and Table 23 respectively.

TABLE 22

Correspondence between the subcarrier spacing parameter μ, the slot format, and the value of x for the normal CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 0 | 14 | 10 | 1 | 15 | 7 | 20 | 2 | 15 |
| 1 | 14 | 20 | 2 | 15 | 7 | 40 | 4 | 16 |
| 2 | 14 | 40 | 4 | 16 | 7 | 80 | 8 | 17 |
| 3 | 14 | 80 | 8 | 17 | — | — | — | — |
| 4 | 14 | 160 | 16 | 18 | — | — | — | — |
| 5 | 14 | 320 | 32 | 19 | — | — | — | — |

TABLE 23

Correspondence between the subcarrier spacing parameter μ, the slot format, and the value of x for the extended CP

| | Slot configuration | | | | | | | |
|---|---|---|---|---|---|---|---|---|
| | 0 | | | | 1 | | | |
| μ | $N_{symb}^{\mu}$ | $N_{frame}^{slots,\mu}$ | $N_{subframe}^{slots,\mu}$ | x | $N_{symb}^{\mu}$ | $N_{frame}^{slots,\mu}$ | $N_{subframe}^{slots,\mu}$ | x |
| 0 | 12 | 10 | 1 | 15 | 6 | 20 | 2 | 15 |
| 1 | 12 | 20 | 2 | 15 | 6 | 40 | 4 | 16 |
| 2 | 12 | 40 | 4 | 16 | 6 | 80 | 8 | 17 |
| 3 | 12 | 80 | 8 | 17 | — | — | — | — |
| 4 | 12 | 160 | 16 | 18 | — | — | — | — |
| 5 | 12 | 320 | 32 | 19 | — | — | — | — |

In the embodiment of this application, the correspondence between the subcarrier spacing parameter μ, the slot format, and the value of x may be further shown in Table 24.

TABLE 24

Correspondence between the subcarrier spacing parameter μ, the slot format, and the value of x

| μ | Slot configuration | |
|---|---|---|
|   | 0 | 1 |
|   | x | x |
| 0 | 15 | 15 |
| 1 | 15 | 16 |
| 2 | 16 | 17 |
| 3 | 17 |    |
| 4 | 18 |    |
| 5 | 19 |    |

In the embodiment of this application, a correspondence between the subcarrier spacing parameter μ and the value of x may be obtained in a manner similar to the manner of determining the coefficient parameter x according to the subcarrier spacing parameter μ in the foregoing embodiment, as shown in Table 25.

TABLE 25

Correspondence between the subcarrier spacing parameter μ and the value of x

| μ | x |
|---|---|
| 0 | 15 |
| 1 | 16 |
| 2 | 17 |
| 3 | 17 |
| 4 | 18 |
| 5 | 19 |

In the embodiment of this application, the value of x may be obtained in a manner similar to the manner of determining the coefficient parameter x according to the maximum quantity of time units in the foregoing embodiment, and the value may be 19.

In the embodiment of this application, an implementation process of determining initial values of scrambling sequences for other channels or signals according to slot numbers in the subframe and subframe numbers in the radio frame may be determined in a similar manner, and a difference lies only in that used scrambling identities need to be determined according to types of the channels or types of the signals. The following Table 26 lists several possible correspondences between initial values of scrambling sequences for channels or signals, slot numbers in the subframe, subframe numbers in the radio frame, and scrambling identities.

TABLE 26

| PDSCH | $n_{RNTI} \cdot 2^t + q \cdot 2^x + n_s^\mu \cdot 2^y + n_{sf} \cdot 2^z + N_{ID}^{cell}$ |
|---|---|
| PMCH | $n_s^\mu \cdot 2^y + n_{sf} \cdot 2^z + N_{ID}^{MBSFN}$ |
| PDCCH | $n_s^\mu \cdot 2^y + n_{sf} \cdot 2^z + N_{ID}^{cell}$ |
| PCFICH | $c_{init} = (n_s^\mu \cdot 2^y + n_{sf} + 1)(2N_{ID}^{cell} + 1)2^x + N_{ID}^{cell}$ |
| PHICH | $c_{init} = (n_s^\mu \cdot 2^y + n_{sf} + 1)(2N_{ID}^{cell} + 1)2^x + N_{ID}^{cell}$ |
| PUCCH format 2/2a/2b | $c_{init} = (n_s^\mu \cdot 2^y + n_{sf} + 1)(2N_{ID}^{cell} + 1)2^x + n_{RNTI}$ |

TABLE 26-continued

| PUSCH | $c_{init} = n_{RNTI} \cdot 2^t + q \cdot 2^x + n_s^\mu \cdot 2^y + n_{sf} \cdot 2^z + N_{ID}^{cell}$ |
|---|---|
| Cell specific RS | $c_{init} = 2^x \cdot (7 \cdot (n_s^\mu \cdot 2^y + n_{sf} + 1) + l + 1) \cdot (2 \cdot N_{ID}^{cell} + 1) + 2 \cdot N_{ID}^{cell} + N_{CP}$ |
| MBSFN RS | $c_{init} = 2^x \cdot (7 \cdot (n_s^\mu \cdot 2^y + n_{sf} + 1) + l + 1) \cdot (2 \cdot N_{ID}^{MBSFN} + 1) + N_{ID}^{MBSFN}$ |
| UE specific RS | $c_{init} = (n_s^\mu \cdot 2^y + n_{sf} + 1)(2N_{ID}^{cell} + 1)2^x + n_{RNTI}$ |
| CSI-RS | $c_{init} = 2^x \cdot (7 \cdot (n_s^\mu \cdot 2^y + n_{sf} + 1) + l + 1) \cdot (2 \cdot N_{ID}^{cell} + 1) + 2 \cdot N_{ID}^{cell} + N_{CP}$ or $c_{init} = 2^x \cdot (7 \cdot (n_s^\mu \cdot 2^y + n_{sf} + 1) + l + 1) \cdot (N_{ID}^{cell} + 1) + N_{ID}^{cell}$ |

In the embodiment of this application, the initial value of the scrambling sequence is determined according to the slot number in the subframe and the subframe number in the radio frame, and the signal is scrambled by using the scrambling sequence generated by using the initial value of the scrambling sequence. This can reflect scrambling randomization of different subframes and different slots in a subframe, and improve performance of interference randomization.

Further, in the foregoing embodiment, the coefficient parameter in the initialization formula used in the process of determining the initial value of the scrambling sequence is determined according to a quantity of cell identities. Therefore, cell identities of different cells in the 5G NR can be distinguished. This avoids occurrence of same scrambling sequences to some extent, and can further avoid occurrence of an interference overlapping problem to some extent. Therefore, interference randomization is implemented to some extent.

In the embodiment of this application, for an application scenario in which there is no cell identity in the 5G NR, the network device may scramble the PUSCH data channel according to a terminal identity, a codeword number, a slot number in a subframe, and a subframe number in a radio frame. The initial value of the scrambling sequence for scrambling the PUSCH data channel may satisfy the following formula:

$$c_{init} = n_{RNTI} 2^t + q \cdot 2^x + n_s^\mu + n_{sf},$$

where $n_{RNTI}$ may be used to identify a terminal, that is, may be understood as a terminal identity, q represents a codeword number, $n_s^\mu$ represents a slot number in a subframe and may be understood as a sequence number of a slot for transmitting a signal in the subframe in which the slot is located, $n_{sf}$ represents a subframe number in a radio frame, $n_{sf}$ may be determined by using a formula $$n_{sf} = \left\lfloor \frac{n_{s,f}^\mu}{N_{subframe}^{slots,\mu}} \right\rfloor,$$

$C_{init}$ represents the initial value of the scrambling sequence, t, x, and y are coefficient parameters in an initialization formula for determining the initial value of the scrambling sequence, and t, x, and y are positive integers.

Likewise, a coefficient parameter of a previous term in the initialization formula may be determined according to value ranges of variables and values of coefficient parameters of several subsequent terms. A specific determining manner is similar to the foregoing process of determining a coefficient parameter when there is a cell identity, and may include the following three methods: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter g; and the value of the coefficient parameter in the formula for determining the initial value of the scrambling sequence may be determined according to a maximum quantity of time units. A difference lies only in that a quantity of cell identities in the 5G NR may not be considered when there is no cell identity. Similarities are not further described herein.

A manner same as the manner of determining a previous coefficient parameter according to value ranges of variables and values of coefficient parameters of several subsequent terms is used. For example, when $n_{sf}$ has 10 values, y=4; when μ=5, and the slot format is that a slot includes seven or six OFDM symbols, $N_{subframe}^{slots,\mu}$=32, a subframe includes 32 slots, $n_s^\mu \in \{0, \ldots, 31\}$, $n_s^\mu$ has 32 values in total, and five binary bits are required for indicating the 32 values of $n_s^\mu$. Therefore, x=4+5=9, which represents that nine binary bits are used to perform interference randomization. Similarly, t=1+4+5=10 is determined. The following may be obtained: When μ=5, y=4, x=4+5=9, and t=1+5+4=10.

In the foregoing manner of determining the coefficient parameter according to the subcarrier spacing parameter μ and the slot format, the value ranges of x may be obtained and is x∈{5, 6, 7, 8, 9}.

For a normal CP and an extended CP, a correspondence between the subcarrier spacing parameter μ, the slot format, and the value of x may be shown in the following Table 27 and Table 28 respectively.

TABLE 27

Correspondence between the subcarrier spacing parameter μ, the slot format, and the value of x for the normal CP

| | Slot configuration | | | | | | | |
|---|---|---|---|---|---|---|---|---|
| | 0 | | | | 1 | | | |
| μ | $N_{symb}^\mu$ | $N_{frame}^{slots,\mu}$ | $N_{subframe}^{slots,\mu}$ | x | $N_{symb}^\mu$ | $N_{frame}^{slots,\mu}$ | $N_{subframe}^{slots,\mu}$ | x |
| 0 | 14 | 10 | 1 | 5 | 7 | 20 | 2 | 5 |
| 1 | 14 | 20 | 2 | 5 | 7 | 40 | 4 | 6 |
| 2 | 14 | 40 | 4 | 6 | 7 | 80 | 8 | 7 |
| 3 | 14 | 80 | 8 | 7 | — | — | — | — |
| 4 | 14 | 160 | 16 | 8 | — | — | — | — |
| 5 | 14 | 320 | 32 | 9 | — | — | — | — |

TABLE 28

Correspondence between the subcarrier spacing parameter μ, the slot format, and the value of x for the extended CP

| | Slot configuration | | | | | | | |
|---|---|---|---|---|---|---|---|---|
| | 0 | | | | 1 | | | |
| μ | $N_{symb}^\mu$ | $N_{frame}^{slots,\mu}$ | $N_{subframe}^{slots,\mu}$ | x | $N_{symb}^\mu$ | $N_{frame}^{slots,\mu}$ | $N_{subframe}^{slots,\mu}$ | x |
| 0 | 12 | 10 | 1 | 5 | 6 | 20 | 2 | 5 |
| 1 | 12 | 20 | 2 | 5 | 6 | 40 | 4 | 6 |
| 2 | 12 | 40 | 4 | 6 | 6 | 80 | 8 | 7 |
| 3 | 12 | 80 | 8 | 7 | — | — | — | — |
| 4 | 12 | 160 | 16 | 8 | — | — | — | — |
| 5 | 12 | 320 | 32 | 9 | — | — | — | — |

In the embodiment of this application, the correspondence between the subcarrier spacing parameter μ, the slot format, and the value of x may be further shown in Table 29.

TABLE 29

Correspondence between the subcarrier spacing parameter μ, the slot format, and the value of x

| | Slot configuration | |
|---|---|---|
| | 0 | 1 |
| μ | x | x |
| 0 | 5 | 5 |
| 1 | 5 | 6 |
| 2 | 6 | 7 |
| 3 | 7 | |
| 4 | 8 | |
| 5 | 9 | |

In the embodiment of this application, when the value of the coefficient parameter in the formula for determining the initial value of the scrambling sequence may be determined according to the subcarrier spacing parameter μ, for example, may be determined according to a corresponding maximum quantity of slots in each subcarrier spacing parameter μ, a correspondence between the subcarrier spacing parameter and the value of x may be shown in Table 30.

TABLE 30

| μ | x |
|---|---|
| 0 | 5 |
| 1 | 6 |
| 2 | 7 |
| 3 | 7 |
| 4 | 8 |
| 5 | 9 |

In another possible example of the embodiment of this application, coefficient parameters corresponding to all frame structures may be the same. For example, the value of x may be determined according to a maximum quantity of slots included in a subframe. For example, the maximum quantity of slots included in the subframe is 32, that is, nine bits are required for quantization, and the value of x may be set to 9.

In the embodiment of this application, for an application scenario in which there is no cell identity, initial values of scrambling sequences for other channels or signals may be determined in a similar manner, and a difference lies only in that used scrambling identities need to be determined according to types of the channels or types of the signals. The following Table 31 lists several possible correspondences between initial values of scrambling sequences for channels or signals, slot numbers in the subframe, subframe numbers in the radio frame, and scrambling identities.

TABLE 31

| | |
|---|---|
| PDSCH | $n_{RNTI} \cdot 2^t + q2^x + n_s^u \cdot 2^y + n_{sf}$ |
| PMCH | $n_s^u \cdot 2^y + n_{sf}$ |
| PDCCH | $n_s^u \cdot 2^y + n_{sf}$ |
| PCFICH | $c_{init} = n_s^u \cdot 2^y + n_{sf} + 1$ |
| PHICH | $c_{init} = n_s^u \cdot 2^y + n_{sf} + 1$ |
| PUCCH format 2/2a/2b | $c_{init} = (n_s^u \cdot 2^y + n_{sf} + 1)2^x + n_{RNTI}$ |
| PUSCH | $c_{init} = n_{RNTI} \cdot 2t + q \cdot 2x + n_s^u \cdot 2^y + nsf$ |
| Cell specific RS | $c_{init} = 2^x \cdot (7 \cdot (n_s^u \cdot 2^y + n_{sf} + 1) + l + 1) + N_{CP}$ or $c_{init} = 7 \cdot (n_s^u \cdot 2^y + n_{sf} + 1) + l + 1$ |
| MBSFN RS | $c_{init} = 7 \cdot (n_s^u \cdot 2^y + n_{sf} + 1) + l + 1$ |
| UE specific RS | $c_{init} = (n_s^u \cdot 2^y + n_{sf} + 1)2^x + n_{RNTI}$ |
| CSI-RS | $c_{init} = 2^x \cdot (7 \cdot (n_s^u \cdot 2^y + n_{sf} + 1) + l + 1) + N_{CP}$ or $c_{init} = 7 \cdot (n_s^u \cdot 2^y + n_{sf} + 1) + l + 1$ |

In the embodiment of this application, the coefficient parameter in the initialization formula for determining the initial value of the scrambling sequence is used, and for different subcarrier spacing configuration parameters μ and different slot formats, there are different coefficient parameters; however, computational complexity is relatively high. In another possible example of the embodiment of this application, a corresponding coefficient parameter may be determined for each subcarrier spacing configuration parameter, so that a same subcarrier spacing configuration parameter μ and different slot formats correspond to a same coefficient parameter. In another possible example of the embodiment of this application, a corresponding coefficient parameter may be determined for all subcarrier spacing configuration parameters μ, and this ensures scrambling randomization to some extent and can also reduce computational complexity.

In a possible example of this application, in an implementation process of determining the initial value of the scrambling sequence based on the slot number in the subframe and the subframe number in the radio frame, the initial value of the scrambling sequence may be determined according to the slot format indicated by the slot configuration parameter. For example, formulas for scrambling initialization may be different. Specifically, for example, the initial value of the scrambling sequence is determined according to a numeric value corresponding to the slot number in the subframe, or according to a numeric value obtained by rounding down a half of a numeric value corresponding to the slot number in the subframe. Generally, when the slot format indicated by the slot configuration parameter is that a slot includes seven or six OFDM symbols, the initial value of the scrambling sequence may be determined according to the numeric value obtained by rounding down a half of the numeric value corresponding to the slot number in the subframe; or when the slot format indicated by the slot configuration parameter is that a slot includes 14 or 12 OFDM symbols, the initial value of the scrambling sequence may be determined according to the numeric value corresponding to the slot number in the subframe.

For example, when the slot format indicated by the slot configuration parameter is that a slot includes seven or six OFDM symbols, and the network device scrambles the PUSCH data channel according to a terminal identity, a codeword number, a slot number in a subframe, a subframe number in a radio frame, and a cell identity, the terminal identity, the codeword number, the slot number in the subframe, the subframe number in the radio frame, and the cell identity may satisfy the following formula:

$$C_{init} = n_{RNTI} \cdot 2^t + q \cdot 2^x + \lfloor n_s^u/2 \rfloor \cdot 2^y + n_{sf} 2^z + N_{ID}^{cell}.$$

When the slot format indicated by the slot configuration parameter is that a slot includes 14 or 12 OFDM symbols, and the network device scrambles the PUSCH data channel according to a terminal identity, a codeword number, a slot number in a subframe, a subframe number in a radio frame, and a cell identity, the terminal identity, the codeword number, the slot number in the subframe, the subframe number in the radio frame, and the cell identity may satisfy the following formula:

$$C_{init} = n_{RNTI} \cdot 2^t + q \cdot 2^x + n_s^u \cdot 2^y + n_{sf} 2^z + N_{ID}^{cell},$$

where $n_{RNTI}$ may be used to identify a terminal, that is, may be understood as a terminal identity, q represents a codeword number, $n_s^u$ represents a slot number in a subframe and may be understood as a sequence number of a slot for transmitting a signal in the subframe in which the slot is located, $$\lfloor n_s^u/2 \rfloor$$

represents rounding down a half of a numeric value corresponding to the slot number in the subframe, $n_{sf}$ represents a subframe number in a radio frame, $n_{sf}$ may be determined by using a formula $$n_{sf} = \left\lfloor \frac{n_{s,f}^\mu}{N_{subframe}^{slots,\mu}} \right\rfloor,$$

$N_{ID}^{cell}$ represents a cell identity, $C_{init}$ represents the initial value of the scrambling sequence, t, x, y, and z are coefficient parameters in an initialization formula for determining the initial value of the scrambling sequence, and t, x, y, and z are positive integers.

A specific manner of determining values of coefficient parameters t, x, y, and z in the embodiment of this application is similar to the process of determining a coefficient parameter in the foregoing embodiment, and may include the following three methods: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter μ; and the value of the coefficient parameter in the formula for determining the initial value of the scrambling sequence may be determined according to a maximum quantity of time units.

A difference lies only in that when the slot format indicated by the slot configuration parameter is that a slot includes seven or six OFDM symbols, when values of x and t are to be determined, the values need to be determined according to the value of $\lfloor n_s^\mu/2 \rfloor$. For example, when $n_s^\mu$ has two values, and $\lfloor n_s^\mu/2 \rfloor=1$, one binary bit is required for indicating one value of $\lfloor n_s^\mu/2 \rfloor$; when a radio frame includes 10 subframes, and $n_{sf}$ has 10 values, four binary bits are required for indicating the 10 values of $n_{s,f}$; when $N_{ID}^{cell}$ has 1008 values, 10 binary bits are required for indicating the 1008 values of $N_{ID}^{cell}$. Therefore, x=1+4+10=15.

Similarly, when the coefficient parameter in the initialization formula is determined according to the subcarrier spacing parameter and the slot format, considering the value of $\lfloor n_s^\mu/2 \rfloor$, a value range of the coefficient parameter x may be obtained and is: x∈{15,16,17,18,19}. In addition, a same subcarrier spacing configuration parameter μ and different slot formats correspond to a same value of x. For a normal CP and an extended CP, a correspondence between the subcarrier spacing parameter μ and the value of x may be shown in Table 32 and Table 33 respectively.

In the embodiment of this application, the correspondence between the subcarrier spacing parameter μ and the value of x may be further shown in the following Table 34.

TABLE 34

| μ | x |
|---|---|
| 0 | 15 |
| 1 | 15 |
| 2 | 16 |
| 3 | 17 |
| 4 | 18 |
| 5 | 19 |

In the embodiment of this application, when there is a cell identity, and the slot format indicated by the slot configuration parameter is that a slot includes seven or six OFDM symbols, initial values of scrambling sequences for other channels or signals may be determined in a similar manner, and a difference lies only in that used scrambling identities need to be determined according to types of the channels or types of the signals. The following Table 35 lists several possible correspondences between initial values of scrambling sequences for channels or signals, slot numbers in a subframe, subframe numbers in a radio frame, cell identities, and scrambling identities.

TABLE 32

Correspondence between the subcarrier spacing parameter μ and the value of x for the normal CP

| | | Slot configuration | | | | | |
|---|---|---|---|---|---|---|---|
| | | 0 | | | 1 | | |
| μ | x | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 15 | 14 | 10 | 1 | 7 | 20 | 2 |
| 1 | 15 | 14 | 20 | 2 | 7 | 40 | 4 |
| 2 | 16 | 14 | 40 | 4 | 7 | 80 | 8 |
| 3 | 17 | 14 | 80 | 8 | — | — | — |
| 4 | 18 | 14 | 160 | 16 | — | — | — |
| 5 | 19 | 14 | 320 | 32 | — | — | — |

TABLE 33

Correspondence between the subcarrier spacing parameter μ and the value of x for the extended CP

| | | Slot configuration | | | | | |
|---|---|---|---|---|---|---|---|
| | | 0 | | | 1 | | |
| μ | x | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 15 | 12 | 10 | 1 | 6 | 20 | 2 |
| 1 | 15 | 12 | 20 | 2 | 6 | 40 | 4 |
| 2 | 16 | 12 | 40 | 4 | 6 | 80 | 8 |
| 3 | 17 | 12 | 80 | 8 | — | — | — |
| 4 | 18 | 12 | 160 | 16 | — | — | — |
| 5 | 19 | 12 | 320 | 32 | — | — | — |

TABLE 35

| | |
|---|---|
| PDSCH | $C_{init} = n_{RNTI} \cdot 2^t + q \cdot 2^x + \lfloor n_s^\mu/2 \rfloor \cdot 2^y + n_{sf} 2^z + N_{ID}^{Cell}$ |
| PMCH | $\lfloor n_s^\mu/2 \rfloor \cdot 2^y + n_{sf} 2^z + N_{ID}^{MBSFN}$ |
| PDCCH | $\lfloor n_s^\mu/2 \rfloor \cdot 2^y + n_{sf} 2^z + N_{ID}^{cell}$ |
| PCFICH | $C_{init} = (\lfloor n_s^\mu/2 \rfloor \cdot 2^y + n_{sf}+1)(2N_{ID}^{cell} + 1)2^x + N_{ID}^{cell}$ |
| PHICH | $C_{init} = (\lfloor n_s^\mu/2 \rfloor \cdot 2^y + n_{sf}+1)(2N_{ID}^{cell} + 1)2^x + N_{ID}^{cell}$ |
| PUCCH format 2/2a/2b | $C_{init} = (\lfloor n_s^\mu/2 \rfloor \cdot 2^y + n_{sf}+1)(2N_{ID}^{cell} + 1)2^x + n_{RNTI}$ |
| PUSCH | $C_{init} = n_{RNTI} \cdot 2^t + q \cdot 2^x + \lfloor n_s^\mu/2 \rfloor \cdot 2^y + n_{sf} 2^z + N_{ID}^{Cell}$ |
| Cell specific RS | $C_{init} = 2^x \cdot (7 \cdot (\lfloor n_s^\mu/2 \rfloor \cdot 2^y + n_{sf}+1) + l + 1) \cdot (2 \cdot N_{ID}^{cell} + 1) + 2 \cdot N_{ID}^{cell} + N_{CP}$ |
| MBSFN RS | $C_{init} = 2^x \cdot (7 \cdot (\lfloor n_s^\mu/2 \rfloor \cdot 2^y + n_{sf}+1) + l + 1) \cdot (2 \cdot N_{ID}^{MBSFN} + 1) + N_{ID}^{MBSFN}$ |
| UE specific RS | $C_{init} = (\lfloor n_s^\mu/2 \rfloor \cdot 2^y + n_{sf}+ 1)(2N_{ID}^{cell} + 1)2^x + n_{RNTI}$ |
| CSI-RS | $C_{init} = 2^x \cdot (7 \cdot (\lfloor n_s^\mu/2 \rfloor \cdot 2^y + n_{sf}+ 1) + l + 1) \cdot (2 \cdot N_{ID}^{cell} + 1) + 2 \cdot N_{ID}^{cell} + N_{CP}$ or $C_{init} = 2^x \cdot (7 \cdot (\lfloor n_s^\mu/2 \rfloor \cdot 2^y + n_{sf}+ 1) + l + 1) \cdot (N_{ID}^{cell} + 1) + N_{ID}^{cell}$ |

When there is a cell identity, and the slot format indicated by the slot configuration parameter is that a slot includes 14 or 12 OFDM symbols, several possible correspondences between initial values of scrambling sequences for channels or signals, slot numbers in a radio frame, and scrambling identities are the same as the several possible correspondences between initial values of scrambling sequences for channels or signals, slot numbers in a subframe, subframe numbers in a radio frame, and scrambling identities as shown in Table 26. Details are not further described herein.

For an application scenario in which there is no cell identity in the 5G NR, when the slot format indicated by the slot configuration parameter is that a slot includes seven or six OFDM symbols, when the PUSCH data channel is scrambled, a terminal identity, a codeword number, a slot number in a subframe, and a subframe number in a radio frame may satisfy the following formula:

$$C_{init}=n_{RNTI} \cdot 2^t+q \cdot 2^x+\lfloor n_s^\mu/2 \rfloor \cdot 2^y+n_{sf}$$

For an application scenario in which there is no cell identity in the 5G NR, when the slot format indicated by the slot configuration parameter is that a slot includes 14 or 12 OFDM symbols, a terminal identity, a codeword number, and a slot number in a radio frame may satisfy the following formula:

$$C_{init}=n_{RNTI} \cdot 2^t+q \cdot 2^x+n_s^\mu 2^y+n_{sf},$$

where $n_{RNTI}$ may be used to identify a terminal, that is, may be understood as a terminal identity, q represents a codeword number, $n_s^\mu$ represents a slot number in a subframe and may be understood as a sequence number of a slot for transmitting a signal in the subframe in which the slot is located, $\lfloor n_s^\mu/2 \rfloor$ represents rounding down a half of a numeric value corresponding to the slot number in the subframe, $n_{sf}$ represents a subframe number in a radio frame, $n_{sf}$ may be determined by using a formula $$n_{sf} = \left\lfloor \frac{n_{s,f}^\mu}{N_{subframe}^{slots,\mu}} \right\rfloor,$$

$C_{init}$ represents the initial value of the scrambling sequence, t, x, and y are coefficient parameters in an initialization formula for determining the initial value of the scrambling sequence, and t, x, and y are positive integers.

A specific manner of determining values of coefficient parameters t, x, and y in the embodiment of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter g; and the value of the coefficient parameter in the formula for determining the initial value of the scrambling sequence may be determined according to a maximum quantity of time units.

Similarly, for an application scenario in which there is no cell identity in the 5G NR, a manner same as the foregoing manner of determining a coefficient parameter is used. For example, when $n_{sf}$ has 10 values, y=4; when μ=5, and the slot format is that a slot includes seven or six OFDM symbols, $N_{subframe}^{slots,\mu}$=32, a subframe includes 32 slots, $n_s^\mu \in \{0, \ldots, 31\}$, $n_s^\mu$ has 32 values in total, and five binary bits are required for indicating the 32 values of $n_s^\mu$. Therefore, x=4+5=9, which represents that nine binary bits are used to perform interference randomization. Similarly, t=1+4+5=10 is determined. The following may be obtained: When μ=5, y=4, x=4+5=9, and t=1+5+4=10. The value of y may be obtained and is 4, and the value range of x is x∈{5, 6, 7, 8, 9}. For a normal CP and an extended CP, a correspondence between the subcarrier spacing parameter μ and the value of x may be shown in the following Table 36 and Table 37 respectively.

TABLE 36

Correspondence between the subcarrier spacing parameter μ and the value of x for the normal CP

| | | Slot configuration | | | | | |
|---|---|---|---|---|---|---|---|
| | | 0 | | | 1 | | |
| μ | y | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 5 | 14 | 10 | 1 | 7 | 20 | 2 |
| 1 | 5 | 14 | 20 | 2 | 7 | 40 | 4 |
| 2 | 6 | 14 | 40 | 4 | 7 | 80 | 8 |
| 3 | 7 | 14 | 80 | 8 | — | — | — |
| 4 | 8 | 14 | 160 | 16 | — | — | — |
| 5 | 9 | 14 | 320 | 32 | — | — | — |

TABLE 37

Correspondence between the subcarrier spacing parameter µ and the value of x for the extended CP Slot configuration

| | | 0 | | | 1 | | |
|---|---|---|---|---|---|---|---|
| µ | y | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 5 | 12 | 10 | 1 | 6 | 20 | 2 |
| 1 | 5 | 12 | 20 | 2 | 6 | 40 | 4 |
| 2 | 6 | 12 | 40 | 4 | 6 | 80 | 8 |
| 3 | 7 | 12 | 80 | 8 | — | — | — |
| 4 | 8 | 12 | 160 | 16 | — | — | — |
| 5 | 9 | 12 | 320 | 32 | — | — | — |

In the embodiment of this application, the correspondence between the subcarrier spacing parameter µ and the value of x may be further shown in the following Table 38.

TABLE 38

| µ | x |
|---|---|
| 0 | 5 |
| 1 | 5 |
| 2 | 6 |
| 3 | 7 |
| 4 | 8 |
| 5 | 9 |

In another possible example of the embodiment of this application, coefficient parameters corresponding to all frame structures may be the same. For example, the value of x may be determined according to a maximum quantity of slots included in a subframe. For example, the maximum quantity of slots included in the subframe is 32, that is, nine bits are required for quantization, and the value of x may be set to 9.

In the embodiment of this application, for an application scenario in which there is no cell identity, when the slot format indicated by the slot configuration parameter is that a slot includes seven or six OFDM symbols, initial values of scrambling sequences for other channels or signals may be determined in a similar manner, and a difference lies only in that used scrambling identities need to be determined according to types of the channels or types of the signals. The following Table 39 lists several possible correspondences between initial values of scrambling sequences for channels or signals, slot numbers in a subframe, subframe numbers in a radio frame, and scrambling identities.

TABLE 39

| | |
|---|---|
| PDSCH | $n_{RNTI} \cdot 2^t + q 2^x + \lfloor n_s^{\mu}/2 \rfloor \cdot 2^y + n_{sf}$ |
| PMCH | $\lfloor n_s^{\mu}/2 \rfloor \cdot 2^y + n_{sf}$ |
| PDCCH | $\lfloor n_s^{\mu}/2 \rfloor \cdot 2^y + n_{sf}$ |
| PCFICH | $c_{init} = \lfloor n_s^{\mu}/2 \rfloor \cdot 2^y + n_{sf} \cdot 2^z + 1$ |
| PHICH | $c_{init} = \lfloor n_s^{\mu}/2 \rfloor \cdot 2^y + n_{sf} \cdot 2^z + 1$ |
| PUCCH format 2/2a/2b | $c_{init} = (\lfloor n_s^{\mu}/2 \rfloor \cdot 2^y + n_{sf} \cdot 2^z + 1)2^x + n_{RNTI}$ |
| PUSCH | $c_{init} = n_{RNTI} \cdot 2^t + q \cdot 2^x + \lfloor n_s^{\mu}/2 \rfloor \cdot 2^y + n_{sf}$ |
| Cell specific RS | $c_{init} = 2^x \cdot (7 \cdot (\lfloor n_s^{\mu}/2 \rfloor \cdot 2^y + n_{sf} + 1) + 1 + 1) + N_{CP}$ or $c_{init} = 7 \cdot (\lfloor n_s^{\mu}/2 \rfloor \cdot 2^y + n_{sf} + 1) + 1 + 1$ |
| MBSFN RS | $c_{init} = 7 \cdot (\lfloor n_s^{\mu}/2 \rfloor \cdot 2^y + n_{sf} + 1) + 1 + 1$ |
| UE specific RS | $c_{init} = (\lfloor n_s^{\mu}/2 \rfloor \cdot 2^y + n_{sf} + 1)2^x + n_{RNTI}$ |
| CSI-RS | $c_{init} = 2^x \cdot (7 \cdot (\lfloor n_s^{\mu}/2 \rfloor \cdot 2^y + n_{sf} + 1) + 1 + 1) + N_{CP}$ or $c_{init} = 7 \cdot (\lfloor n_s^{\mu}/2 \rfloor \cdot 2^y + n_{sf} + 1) + 1 + 1$ |

In the embodiment of this application, for an application scenario in which there is no cell identity, when the slot format indicated by the slot configuration parameter is that a slot includes 14 or 12 OFDM symbols, initial values of scrambling sequences for other channels or signals may be determined in a similar manner, and a difference lies only in that used scrambling identities need to be determined according to types of the channels or types of the signals. Several possible correspondences between initial values of scrambling sequences for channels or signals, slot numbers in a subframe, subframe numbers in a radio frame, and scrambling identities are the same as the several possible correspondences between initial values of scrambling sequences for channels or signals, slot numbers in a subframe, subframe numbers in a radio frame, and scrambling identities as shown in Table 26. Details are not further described herein.

In the foregoing embodiment of this application, a corresponding coefficient parameter is determined for each frame structure parameter. This ensures scrambling randomization to some extent and can also reduce computational complexity.

In another possible example of the embodiment of this application, coefficient parameters corresponding to all frame structure parameters may be the same. For example, the value of x may be determined according to a maximum quantity of slots included in a subframe. For example, the maximum quantity of slots included in the subframe is 32, and the value of x may be set to 9.

In the example 2 of this application, the initial value of the scrambling sequence is determined according to the slot number in the subframe and the subframe number in the radio frame. This can reflect scrambling randomization of different subframes and different slots in the subframe, and improve performance of interference randomization, and can be applicable to scrambling of signals in different slot configurations, and resolve a problem that signal scrambling in the 5G NR may be irrelevant to a cell identity.

Example 3

Determine the initial value of the scrambling sequence based on a subframe number ($n_{sf}$) in a radio frame.

In the embodiment of this application, the initial value of the scrambling sequence for the signal or channel may be determined according to a subframe number in a radio frame.

Further, optionally, the initial value of the scrambling sequence may also be determined with reference to another variable. This is not specifically limited herein.

In the example 3 of this application, a process of generating an initial value of a scrambling sequence used for scrambling a PUSCH data channel is still used for description.

In the embodiment of this application, for an application scenario in which there is a cell identity, the network device may scramble the PUSCH data channel according to a terminal identity, a codeword number, a subframe number in a radio frame, and a cell identity. The initial value of the scrambling sequence for scrambling the PUSCH data channel may satisfy the following formula:

$$c_{init} = n_{RNTI} \cdot 2^t + q \cdot 2^x + n_{sf} \cdot 2^y + N_{ID}^{cell}.$$

For an application scenario in which there is no cell identity in the 5G NR, the network device may scramble the PUSCH data channel according to a terminal identity, a codeword number, and a subframe number in a radio frame. The initial value of the scrambling sequence for scrambling the PUSCH data channel may satisfy the following formula:

$$c_{init} = n_{RNTI} \cdot 2^t + q \cdot 2^x + n_{sf},$$

where $n_{RNTI}$ may be used to identify a terminal, that is, may be understood as a terminal identity, q represents a codeword number, $n_{sf}$ represents a subframe number in a radio frame, $n_{sf}$ may be determined by using a formula $$n_{sf} = \left\lfloor \frac{n_{s,f}^{\mu}}{N_{subframe}^{slots,\mu}} \right\rfloor,$$

$N_{ID}^{cell}$ represents a cell identity, $C_{init}$ represents the initial value of the scrambling sequence, t, x, and y are coefficient parameters in an initialization formula for determining the initial value of the scrambling sequence, and t, x, and y are positive integers.

Likewise, a coefficient parameter of a previous term in the initialization formula for determining the initial value of the scrambling sequence may be determined according to value ranges of variables and values of coefficient parameters of several subsequent terms.

Similarly, a specific manner of determining values of coefficient parameters t, x, and y in the embodiment of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter; and the value of the coefficient parameter in the formula for determining the initial value of the scrambling sequence may be determined according to a maximum quantity of time units.

In the example 3 of this application, the process of determining the coefficient parameter and the correspondence between the coefficient parameter, the subcarrier spacing configuration parameter μ, and the slot format are similar to the determining processes and the correspondences in the foregoing examples 1 and 2. Details are not further described herein. For details, refer to the determining processes and corresponding tables in the foregoing examples 1 and 2.

In the example 3 of this application, for an application scenario in which there is a cell identity, initialization formulas for determining initial values of scrambling sequences for other channels or signals may be shown in Table 40.

TABLE 40

| | |
|---|---|
| PDSCH | $n_{RNTI} \cdot 2^t + q2^x + n_{sf} \cdot 2^y + N_{ID}^{cell}$ |
| PMCH | $n_{sf} \cdot 2^y + N_{ID}^{MBSFN}$ |
| PDCCH | $n_{sf} \cdot 2^y + N_{ID}^{cell}$ |
| PCFICH | $c_{init} = (n_{sf} + 1)(2N_{ID}^{cell} + 1)2^y + N_{ID}^{cell}$ |
| PHICH | $c_{init} = (n_{sf} + 1)(2N_{ID}^{cell} + 1)2^y + N_{ID}^{cell}$ |
| PUCCH format 2/2a/2b | $c_{init} = (n_{sf} + 1)(2N_{ID}^{cell} + 1)2^y + n_{RNTI}$ |
| PUSCH | $C_{init} = n_{RNTI} \cdot 2^t + q \cdot 2^x + n_{sf} \cdot 2^y + N_{ID}^{Cell}$ |
| Cell specific RS | $c_{init} = 2^y \cdot (7 \cdot (n_{sf} + 1) + l + 1) \cdot (2 \cdot N_{ID}^{cell} + 1) + 2 \cdot N_{ID}^{cell} + N_{CP}$ |
| MBSFN RS | $c_{init} = 2^y \cdot (7 \cdot (n_{sf} + 1) + l + 1) \cdot (2 \cdot N_{ID}^{MBSFN} + 1) + N_{ID}^{MBSFN}$ |
| UE specific RS | $c_{init} = (n_{sf} + 1)(2N_{ID}^{cell} + 1)2^y + n_{RNTI}$ |
| CSI-RS | $c_{init} = 2^x \cdot (7 \cdot (n_{sf} + 1) + l + 1) \cdot (2 \cdot N_{ID}^{cell} + 1) + 2 \cdot N_{ID}^{cell} + N_{CP}$ or $c_{init} = 2^x \cdot (7 \cdot (n_{sf} + 1) + l + 1) \cdot (2 \cdot N_{ID}^{cell} + 1) + N_{ID}^{cell}$ |

In the example 3 of this application, for an application scenario in which there is no cell identity, in initialization formulas for determining initial values of scrambling sequences for other channels or signals, a cell identity $N_{ID}^{cell}$ may be removed. Specific initialization formulas may be obtained from the formulas shown in Table 35 after $N_{ID}^{cell}$ is removed, and are not further listed exhaustively herein.

Example 4

Determine the initial value of the scrambling sequence based on an OFDM symbol number ($n_{symbol}$) in a slot.

In the embodiment of this application, the initial value of the scrambling sequence for the signal or channel may be determined based on the symbol number ($n_{symbol}$) in the slot.

Further, optionally, the initial value of the scrambling sequence may be determined with reference to another variable. This is not specifically limited herein.

In the example 4 of this application, in an application scenario in which there is a cell identity, the network device may scramble the channel or the signal based on a terminal identity, a codeword number, an OFDM symbol number in a slot, and a cell identity. For initialization formulas for determining initial values of scrambling sequences for scrambling various channels or signals, refer to formulas shown in Table 41.

TABLE 41

| | |
|---|---|
| PDSCH | $c_{init} = n_{RNTI} \cdot 2^t + q2^x + n_{symbol} + N_{ID}^{cell}$ |
| PMCH | $c_{init} = n_{symbol} + N_{ID}^{MBSFN}$ |
| PDCCH | $c_{init} = n_{symbol} + N_{ID}^{cell}$ |
| PCFICH | $c_{init} = (n_{symbol} + 1)(2N_{ID}^{cell} + 1)2^y + N_{ID}^{cell}$ |
| PHICH | $c_{init} = (n_{symbol} + 1)(2N_{ID}^{cell} + 1)2^y + N_{ID}^{cell}$ |
| PUCCH format 2/2a/2b | $c_{init} = (n_{symbol} + 1)(2N_{ID}^{cell} + 1)2^y + n_{RNTI}$ |

TABLE 41-continued

| | |
|---|---|
| PUSCH | $c_{init} = n_{RNTI} \cdot 2^t + q \cdot 2^x + n_{symbol} + N_{ID}^{Cell}$ |
| Cell specific RS | $c_{init} = 2^y \cdot (7 \cdot (n_{symbol} + 1) + l + 1) \cdot (2 \cdot N_{ID}^{cell} + 1) + 2 \cdot N_{ID}^{cell} + N_{CP}$ |
| MBSFN RS | $c_{init} = 2^y \cdot (7 \cdot (n_{symbol} + 1) + l + 1) \cdot (2 \cdot N_{ID}^{MBSFN} + 1) + N_{ID}^{MBSFN}$ |
| UE specific RS | $c_{init} = (n_{symbol} + 1)(2N_{ID}^{cell} + 1)2^y + n_{RNTI}$ |
| CSI-RS | $c_{init} = 2^y \cdot (7 \cdot (n_{symbol} + 1) + l + 1) \cdot (2 \cdot N_{ID}^{cell} + 1) + 2 \cdot N_{ID}^{cell} + N_{CP}$ |

In the example 4 of this application, in an application scenario in which there is no cell identity in the 5G NR, the network device may scramble the channel or the signal based on a terminal identity, a codeword number, and an OFDM symbol number in a slot. Initialization formulas for determining initial values of scrambling sequences for scrambling various channels or signals may be obtained from the formulas shown in Table 41 after a cell identity $N_{ID}^{cell}$ is removed. For example, in a scenario in which there is no cell identity, an initialization formula for determining the initial value of the scrambling sequence used for scrambling the PUSCH data channel may satisfy the following formula:

$$c_{init} = n_{RNTI} \cdot 2^t + q \cdot 2^x + n_{symbol}.$$

A specific manner of determining values of coefficient parameters t and x in the example 4 of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter and the slot format; the value of the coefficient parameter in the formula for determining the initial value of the scrambling sequence may be determined according to the subcarrier spacing parameter μ; and the value of the coefficient parameter in the formula for determining the initial value of the scrambling sequence may be determined according to a maximum quantity of time units.

In the example 4 of this application, the process of determining the coefficient parameter and the correspondence between the coefficient parameter, the subcarrier spacing configuration parameter μ, and the slot format are similar to the determining processes and the correspondences in the foregoing examples 1 and 2. Details are not further described herein. For details, refer to the determining processes and corresponding tables in the foregoing examples 1 and 2.

In the embodiment of this application, the network device may determine the initial value of the scrambling sequence based on at least one of the slot number in the radio frame, the subframe number in the radio frame, the slot number in the subframe, and the OFDM symbol number in the slot. For example, in addition to the foregoing several examples, the network device may further determine the initial value of the scrambling sequence based on the slot number $(n_s^\mu)$ in the subframe, or may further determine the initial value of the scrambling sequence based on at least one of the slot number in the radio frame, the subframe number in the radio frame, and the slot number in the subframe, and with reference to the OFDM symbol in the slot.

Embodiment 2

Determine an initial value of a scrambling sequence based on a CBG configuration parameter.

Optionally, the initial value of the scrambling sequence may be determined based on a time unit number for transmitting a signal, and a CBG configuration parameter.

In 5G NR, a CBG is a transmission unit, and transmission/retransmission and HARQ are both CBG-based transmission. For a TB, there may be a plurality of CBGs. Considering flexibility of CBG-based transmission/retransmission and HARQ, the initial value of the scrambling sequence may be determined according to the time unit number for transmitting the signal, and the CBG configuration parameter, so that interference randomization is implemented for different CBGs.

In the embodiment of this application, the initial value of the scrambling sequence for the signal or channel may be determined according to the CBG configuration parameter.

Further, optionally, the initial value of the scrambling sequence may also be determined with reference to another variable. This is not specifically limited herein.

In the embodiment of this application, a process of generating an initial value of a scrambling sequence used for scrambling a PUSCH data channel is still used as an example for description.

Example 1

The time unit number includes a slot number $(n_s^\mu)$ in a subframe and a subframe number $(n_{sf})$ in a radio frame, and the CBG configuration parameter may be at least one of a supported maximum quantity of CBGs and a CBG number.

In the embodiment of this application, the initial value of the scrambling sequence for the signal or channel may be determined according to the slot number $(n_s^\mu)$ in the subframe, the subframe number $(n_{sf})$ in the radio frame, and the CBG configuration parameter.

Further, optionally, the initial value of the scrambling sequence may also be determined with reference to another variable. This is not specifically limited herein.

In the embodiment of this application, for an application scenario in which there is a cell identity, a network device may scramble the PUSCH data channel according to a terminal identity, a supported maximum quantity of CBGs, a CBG number, a slot number $(n_s^\mu)$ in a subframe, a subframe number $(n_{sf})$ in a radio frame, and a cell identity. The initial value of the scrambling sequence, the terminal identity, the supported maximum quantity of CBGs, the CBG number (cq), the slot number $(n_s^\mu)$ in the subframe, the subframe number $(n_{sf})$ in the radio frame, and the cell identity may satisfy the following formula:

$$c_{init} = n_{RNTI} \cdot 2^t + cq \cdot 2^x + n_s^\mu \cdot 2^y + n_{sf} \cdot 2^z + N_{ID}^{cell}.$$

Likewise, a coefficient parameter of a previous term in an initialization formula for determining the initial value of the scrambling sequence may be determined according to value ranges of variables and values of coefficient parameters of subsequent terms. For a specific determining process, refer to the process of determining a value of a coefficient parameter in the foregoing Embodiment 1. Similarities are not further described herein in the embodiment of this application. It should be noted that, the CBG number may have two values.

For an application scenario in which there is no cell identity in the 5G NR, the network device may scramble the PUSCH data channel according to a terminal identity, a supported maximum quantity of CBGs, a CBG number, a slot number $(n_s^\mu)$ in a subframe, and a subframe number $(n_{sf})$ in a radio frame. The initial value of the scrambling sequence, the terminal identity, the supported maximum quantity of CBGs, the CBG number (cq), the slot number ($n_s^\mu$) in the subframe, and the subframe number ($n_{sf}$) in the radio frame may satisfy the following formula:

$$c_{init}=n_{RNTI}\cdot 2^t+cq\cdot 2^x+n_s^\mu 2^y+n_{sf}$$

In each formula in the example 1 of the Embodiment 2 of this application, $n_{RNTI}$ may be used to identify a terminal, that is, may be understood as a terminal identity, a value of t is related to the supported maximum quantity of CBGs, cq is a CBG number, $n_s^\mu$ represents a slot number in a subframe and may be understood as a sequence number of a slot for transmitting a signal in the subframe in which the slot is located, $n_{sf}$ represents a subframe number in a radio frame, $n_{sf}$ may be determined by using a formula:

$$n_{sf} = \left\lfloor \frac{n_{s,f}^\mu}{N_{subframe}^{slots,\mu}} \right\rfloor,$$

$N_{ID}^{cell}$ represents a cell identity, $C_{init}$ represents the initial value of the scrambling sequence, t, x, and y are coefficient parameters in an initialization formula for determining the initial value of the scrambling sequence, and t, x, and y are positive integers.

Likewise, a coefficient parameter of a previous term in the initialization formula for determining the initial value of the scrambling sequence may be determined according to value ranges of variables and values of coefficient parameters of several subsequent terms.

Specifically, for example, when there is no cell ID, for example, when a radio frame includes 10 subframes, and a subframe number $n_{sf}$ in the radio frame has 10 values, four binary bits are required for indicating the 10 values of $n_{sf}$. Therefore, y=4, which represents that four binary bits are used to perform interference randomization. A value of x may be determined according to y, $n_{sf}$, and $n_s^\mu$ jointly. For example, when $n_s^\mu$ has two values, one binary bit is required for indicating the two values of $n_s^\mu$; when $n_{sf}$ has 10 values, four binary bits are required for indicating the 10 values of $n_{sf}$. Therefore, x=1+4=5, which represents that five binary bits are used to perform interference randomization. A value of t may be determined according to cq, x, y, $n_{sf}$, and $n_s^\mu$ jointly. For example, when cq has two values, one binary bit is required for indicating the two values of cq; when $n_s^\mu$ has two values, one binary bit is required for indicating the two values of $n_s^\mu$; when $n_{sf}$ has 10 values, four binary bits are required for indicating the 10 values of $n_{sf}$. Therefore, t=1+1+4=6. For example, when cq has four values, two binary bits are required for indicating the four values of cq; when $n_s^\mu$ has two values, one binary bit is required for indicating the two values of $n_s^\mu$; when $n_{sf}$ has 10 values, four binary bits are required for indicating the 10 values of $n_{sf}$. Therefore, t=2+1+4=7.

Similarly, when a coefficient parameter in the initialization formula for determining the initial value of the scrambling sequence is determined, different coefficient parameters may be determined for different subcarrier spacing configuration parameters μ and different slot formats according to the subcarrier spacing configuration parameters μ and the slot formats, or a same coefficient parameter may be determined for a same subcarrier spacing configuration parameter μ and different slot formats, that is, a corresponding coefficient parameter is determined for each frame structure parameter, or coefficient parameters corresponding to all frame structure parameters may be the same. For example, the value of x is determined according to a maximum quantity of time units.

In the example 1 of Embodiment 2 of this application, the process of determining the coefficient parameter and a correspondence between the coefficient parameter, the subcarrier spacing configuration parameter μ, and the slot format are similar to the determining process and the correspondence in the foregoing Embodiment 1. Details are not further described herein. For details, refer to the process of determining the coefficient parameter and the corresponding table in the foregoing Embodiment 1.

In the example 1 of Embodiment 2 of this application, in an application scenario in which there is a cell identity, for initialization formulas for determining initial values of scrambling sequences for scrambling various channels or signals, refer to formulas shown in Table 42.

TABLE 42

| | |
|---|---|
| PDSCH | $c_{init} = n_{RNTI}\,2^t + cq2^x + n_s^u \cdot 2^y + n_{sf}\cdot 2^z + N_{ID}^{cell}$ |
| PUSCH | $c_{init} = n_{RNTI}\,2^t + cq2^x + n_s^u \cdot 2^y + n_{sf}\cdot 2^z + N_{ID}^{cell}$ |

In the example 1 of Embodiment 2 of this application, in an application scenario in which there is no cell identity, for initialization formulas for determining initial values of scrambling sequences for scrambling various channels or signals, refer to formulas shown in Table 43.

TABLE 43

| | |
|---|---|
| PDSCH | $c_{init} = n_{RNTI}\cdot 2^t + cq\cdot 2^x + n_s^u\cdot 2^t + n_{sf}$ |
| PUSCH | $c_{init} = n_{RNTI}\cdot 2^t + cq\cdot 2^x + n_s^u\cdot 2^t + n_{sf}$ |

Example 2

The time unit number includes a slot number ($n_{s,f}^\mu$) in a radio frame, and the CBG configuration parameter includes at least one of a supported maximum quantity of CBGs and a CBG number.

In the embodiment of this application, the initial value of the scrambling sequence for the signal or channel may be determined according to the slot number ($n_{s,f}^\mu$) in the radio frame and the CBG configuration parameter.

Further, optionally, the initial value of the scrambling sequence may also be determined with reference to another variable. This is not specifically limited herein.

In the embodiment of this application, in an application scenario in which there is a cell identity, a network device may scramble the PUSCH data channel according to a terminal identity, a supported maximum quantity of CBGs, a CBG number, a slot number ($n_{s,f}^\mu$) in a radio frame, and a cell identity. The initial value of the scrambling sequence, the terminal identity, the supported maximum quantity of CBGs, the CBG number, the slot number ($n_{s,f}^\mu$) in the radio frame, and the cell identity may satisfy the following formula:

$$c_{init}=n_{RNTI}\cdot 2^t+cq\cdot 2^x+n_{s,f}^\mu\cdot 2^y+N_{ID}^{cell}.$$

For an application scenario in which there is no cell identity in the 5G NR, the network device may scramble the PUSCH data channel according to a terminal identity, a supported maximum quantity of CBGs, a CBG number, and a slot number ($n_{s,f}^\mu$) in a radio frame. The initial value of the scrambling sequence, the terminal identity, the supported maximum quantity of CBGs, the CBG number, and the slot number ($n_{s,f}^\mu$) in the radio frame may satisfy the following formula:

$$c_{init} = n_{RNTI} \cdot 2^t + cq \cdot 2^x + n_{s,f}^\mu.$$

In each formula in the example 2 of Embodiment 2 of this application, $n_{RNTI}$ may be used to identify a terminal, that is, may be understood as a terminal identity, a value of t is related to the supported maximum quantity of CBGs, cq is a CBG number, $n_{s,f}^\mu$ represents a slot number in a radio frame, $N_{ID}^{cell}$ represents a cell identity, $C_{init}$ represents the initial value of the scrambling sequence, t, x, y, and z are coefficient parameters in an initialization formula for determining the initial value of the scrambling sequence, and t, x, y, and z are positive integers.

Likewise, a coefficient parameter of a previous term in the initialization formula for determining the initial value of the scrambling sequence may be determined according to value ranges of variables and values of coefficient parameters of several subsequent terms.

Similarly, a specific manner of determining values of coefficient parameters t and x in the example 2 of this application may include the following three methods: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter; and the value of the coefficient parameter in the formula for determining the initial value of the scrambling sequence may be determined according to a maximum quantity of time units.

Specifically, the value of t may be the value of x plus a binary bit required for quantizing the CBG number (cq).

Specifically, for example, when the subcarrier spacing configuration parameter μ=1, and the slot format is that a slot includes seven or six OFDM symbols, $N_{frame}^{slots,\mu}=40$, a radio frame includes 40 slots, $n_{s,f}^\mu \in \{0, \ldots, 39\}$, $n_{s,f}^\mu$ has 40 values in total, and six binary bits are required for indicating the values. Therefore, the value of x is 6. When the maximum quantity of CBG numbers is 2, one binary bit is required for quantization. Therefore, the value of t is the value of x plus 1, that is t=1+6=7. When the maximum quantity of CBG numbers is 4, two binary bits are required for quantization. Therefore, the value of t is the value of x plus 2, that is t=2+6=8. When μ=1, and the slot format is that a slot includes 14 or 12 OFDM symbols, $N_{frame}^{slots,\mu}=20$, a radio frame includes 20 slots, $n_{s,f}^\mu \in \{0, \ldots, 19\}$, $n_{s,f}^\mu$ has 20 values in total, and five binary bits are required for indicating the values. Therefore, the value of x is 5. When the maximum quantity of CBG numbers is 2, one binary bit is required for quantization. Therefore, the value of t is the value of x plus 1, that is t=1+5=6. When the maximum quantity of CBG numbers is 4, two binary bits are required for quantization. Therefore, the value of t is the value of x plus 2, that is t=2+5=7. Specifically, for example, coefficient parameters corresponding to all frame structures may be the same. For example, the value of x may be determined according to a maximum quantity of slots included in a radio frame. For example, the maximum quantity of slots included in the radio frame is 320, that is, nine bits are required for quantization, and the value of x may be set to 9. When the maximum quantity of CBG numbers is 2, one binary bit is required for quantization. Therefore, the value of t is the value of x plus 1, that is t=1+9=10. When the maximum quantity of CBG numbers is 4, two binary bits are required for quantization. Therefore, the value of t is the value of x plus 2, that is t=2+9=11.

In the example 2 of Embodiment 2 of this application, the process of determining the coefficient parameter and a correspondence between the coefficient parameter, the subcarrier spacing configuration parameter μ, and the slot format are similar to the determining process and the correspondence in the foregoing Embodiment 1. Details are not further described herein. For details, refer to the process of determining the coefficient parameter and the corresponding table in the foregoing Embodiment 1.

In the example 2 of Embodiment 2 of this application, in an application scenario in which there is a cell identity, for initialization formulas for determining initial values of scrambling sequences for scrambling various channels or signals, refer to formulas shown in Table 44.

TABLE 44

| PDSCH | $c_{init} = n_{RNTI} \cdot 2^t + cq \cdot 2^x + n_{s,f}^\mu \cdot 2^y + N_{ID}^{cell}$ |
|---|---|
| PUSCH | $c_{init} = n_{RNTI} \cdot 2^t + cq \cdot 2^x + n_{s,f}^\mu \cdot 2^y + N_{ID}^{cell}$ |

In the example 2 of Embodiment 2 of this application, in an application scenario in which there is no cell identity, for initialization formulas for determining initial values of scrambling sequences for scrambling various channels or signals, refer to formulas shown in Table 45.

TABLE 45

| PDSCH | $c_{init} = n_{RNTI} \cdot 2^t + cq \cdot 2^x + n_{s,f}^\mu$ |
|---|---|
| PUSCH | $c_{init} = n_{RNTI} \cdot 2^t + cq \cdot 2^x + n_{s,f}^\mu$ |

In the example 1 and the example 2 of Embodiment 2 of this application, in an application scenario in which there is no cell identity in the 5G NR, the cell identity $N_{ID}^{cell}$ may be removed from the initialization formulas for determining initial values of scrambling sequences for scrambling various channels or signals. Specific initialization formulas are not further listed exhaustively herein.

Embodiment 2 of this application is described merely by using an example in which the time unit number includes a subframe number in a radio frame and a slot number in a subframe and an example in which the time unit number includes a slot number in a radio frame; however, the embodiment is not limited thereto. The time unit number may also be other time unit numbers in any combination of a slot number in a radio frame, a subframe number in a radio frame, a slot number in a subframe, and an OFDM symbol number in a slot. Implementation processes of other time unit numbers are similar, and are not further described herein.

In Embodiment 2 of this application, the initial value of the scrambling sequence is determined based on different CBG configuration parameters and different time unit numbers, and the signal is scrambled by using the scrambling sequence generated based on the initial value of the scrambling sequence. The embodiment can implement interference randomization for different CBGs, and may be applicable to scrambling of signals transmitted by using time units of different frame structures. In addition, signal scrambling can be implemented in an application scenario in which there is no cell identity in the 5G NR.

Embodiment 3

Determine an initial value of a scrambling sequence based on a QCL configuration parameter.

In the embodiment of this application, an initial value of a scrambling sequence for a signal or channel may be determined according to a QCL configuration parameter.

Optionally, the initial value of the scrambling sequence may be determined based on a time unit number and a QCL configuration parameter.

Further, optionally, the initial value of the scrambling sequence may also be determined with reference to another variable. This is not specifically limited herein.

In 5G NR, for non-coherent joint transmission in the 5G NR, different beams/precoding/antenna ports of a same TRP or different TRPs may use different QCL configuration parameters. If an initial value of a scrambling sequence is determined based on a time unit number and a QCL configuration parameter, and a signal is scrambled by using the scrambling sequence obtained according to the initial value, scrambling sequences used for scrambling signals transmitted by different beams/precoding/antenna ports of a same TRP or different TRPs to a same terminal may be different.

The QCL configuration parameter includes at least one of a demodulation reference signal (DMRS) antenna port group, a DMRS antenna port, and a QCL indication.

A semi-static configuration may be performed on the QCL configuration parameter such as the demodulation reference signal (DMRS) antenna port group and the QCL indication by using higher layer signaling such as radio resource control (RRC) signaling or Medium Access Control (MAC) signaling. In addition, a QCL parameter configuration of each TRP is designed in advance, and data scrambling may be performed in advance to reduce a transmission delay.

The QCL configuration parameter such as the DMRS antenna port and the QCL indication may be further indicated by using physical layer signaling such as downlink control information (DCI). The TRP or the terminal may determine a DMRS antenna port according to the QCL configuration parameter indicated by the physical layer signaling, and may group DMRS antenna ports, where each DMRS antenna port group may be used for transmission by one TRP. According to the QCL indication in the physical layer signaling (such as DCI), it may be determined that different TRPs use different parameter configurations. Using the QCL configuration parameter for signal scrambling can implement interference randomization.

Optionally, the QCL indication may be a QCL configuration identity or a QCL configuration parameter set.

For example, four groups of QCL configuration parameters are configured by RRC, and are a "parameter set 1", a "parameter set 2", a "parameter set 3", and a "parameter set 4" respectively. The TRP or the terminal determines that a QCL configuration parameter used by a transmit antenna currently used by the TRP is the "parameter set 1". In this case, the TRP or the terminal may scramble the signal based on the current QCL configuration parameter "parameter set 1".

Optionally, the QCL configuration parameter may be notified by using higher layer signaling (for example, RRC signaling or MAC signaling) or physical layer signal (for example, DCI), or may be determined implicitly. This is not specifically limited herein.

Specifically, for example, the QCL configuration parameter may be determined according to a CORESET configuration or candidates or CCEs occupied by the DCI.

For example, by default, a QCL configuration parameter of a base station 1 may be 0, and a QCL configuration parameter of a base station 2 may be 1. The base station 1 may transmit the DCI by using a time-frequency resource of a CORESET identity 1, and the base station 2 may transmit the DCI by using a time-frequency resource of a CORESET identity 2. When the UE detects the DCI in the time-frequency resource of the CORESET identity 1, data scheduled by the DCI may be scrambled by using the QCL configuration parameter 0; if the UE detects the DCI in the time-frequency resource of the CORESET identity 2, data scheduled by the DCI may be scrambled by using the QCL configuration parameter 1.

For example, if the base station 1 transmits the DCI by using candidates 1 to 4, and the base station 2 transmits the DCI by using candidates 5 to 8, when the UE detects the DCI in time-frequency resource of the candidates 1 to 4, data scheduled by the DCI may be scrambled by using the QCL configuration parameter 0; if the UE detects the DCI in time-frequency resources of the candidates 5 to 8, data scheduled by the DCI may be scrambled by using the QCL configuration parameter 1.

For example, if the base station 1 transmits the DCI by using CCEs 1 to 10, and the base station 2 transmits the DCI by using CCEs 11 to 20, when the UE detects the DCI in time-frequency resource of the CCEs 1 to 10, data scheduled by the DCI may be scrambled by using the QCL configuration parameter 0; if the UE detects the DCI in time-frequency resources of the CCEs 11 to 20, data scheduled by the DCI may be scrambled by using the QCL configuration parameter 1.

In the embodiment of this application, a process of generating an initial value of a scrambling sequence used for scrambling a PUSCH data channel is still used as an example for description.

A network device may determine, based on a current radio network temporary identifier (RNTI) number of a terminal or another terminal identity, a codeword number, a slot number ($n_{s,f}^{\mu}$) in a radio frame, and a QCL configuration parameter, the initial value of the scrambling sequence used for scrambling the PUSCH data channel. For example, an initialization formula for determining the initial value of the scrambling sequence may be the following formula:

$$c_{init} = n_{RNTI} \cdot 2^{t} + q \cdot 2^{y} + n_{s,f}^{\mu} \cdot 2^{x} + N_{ID}^{QCL}$$

or $$c_{init} = n_{RNTI} \cdot 2^{t} + cq \cdot 2^{y} + n_{s,f}^{\mu} \cdot 2^{x} + N_{ID}^{QCL},$$

where $n_{RNTI}$ indicates an RNTI number, and may be used to identify a terminal, that is, may be understood as a terminal identity, q represents a codeword number, $n_{s,f}^{\mu}$ represents a slot number in a radio frame, $N_{ID}^{cell}$ indicates a QCL configuration parameter, and parameters t, y, and x are positive integers; specifically, a value of x is related to a maximum quantity of QCL configuration parameters that can be configured.

The implementation of determining the initial value of the scrambling sequence based on the time unit number and the QCL configuration parameter in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 46.

TABLE 46

| | |
|---|---|
| PDSCH | $c_{init} = n_{RNTI} \cdot 2^t + q \cdot 2^y + n_{s,f}^\mu \cdot 2^x + N_{ID}^{QCL}$ or |
| | $c_{init} = n_{RNTI} \cdot 2^t + cq \cdot 2^y + n_{s,f}^\mu \cdot 2^x + N_{ID}^{QCL}$ |
| PMCH | $c_{init} = n_{s,f}^\mu \cdot 2^x + N_{ID}^{QCL}$ |
| PDCCH | $c_{init} = n_{s,f}^\mu \cdot 2^x + N_{ID}^{QCL}$ |
| PCFICH | $c_{init} = (n_{s,f}^\mu + 1) \cdot 2^x + N_{ID}^{QCL}$ |
| PHICH | $c_{init} = (n_{s,f}^\mu + 1) \cdot 2^x + N_{ID}^{QCL}$ |
| PUCCH cyclic shift $n_{cs}^{cell}(n_s, l)$ | $c_{init} = N_{ID}^{QCL}$ |
| PUCCH format 2/2a/2b | $c_{init} = (n_{s,f}^\mu + 1)(N_{ID}^{QCL} + 1) \cdot 2^y + n_{RNTI}$ |
| PUSCH | $c_{init} = n_{RNTI} \cdot 2^t + q \cdot 2^y + n_{s,f}^\mu \cdot 2^x + N_{ID}^{QCL}$ |
| Cell specific RS | $c_{init} = 2^x \cdot (7(n_{s,f}^\mu + 1) + l + 1) + N_{ID}^{QCL} + N_{CP}$ or |
| | $c_{init} = 2^x \cdot (7(n_{s,f}^\mu + 1) + l + 1) + N_{ID}^{QCL}$ |
| MBSFN RS | $c_{init} = 2^x \cdot (7(n_{s,f}^\mu + 1) + l + 1) + N_{ID}^{QCL}$ |
| UE specific RS | $c_{init} = (n_{s,f}^\mu + 1) \cdot 2^x + N_{ID}^{QCL} + n_{RNTI}$ |
| Mirroring function | $c_{init} = N_{ID}^{QCL}$ |
| Group hopping | $c_{init} = \left\lfloor \dfrac{N_{ID}^{QCL}}{30} \right\rfloor$ |
| Sequence number | $c_{init} = \left\lfloor \dfrac{N_{ID}^{QCL}}{30} \right\rfloor \cdot 2^5 + f_{ss}^{PUSCH}$ |
| CSI-RS | $c_{init} = 2^x \cdot (7(n_{s,f}^\mu + 1) + l + 1)(N_{ID}^{QCL} + 1) \cdot 2^y + N_{ID}^{QCL}$ or |
| | $c_{init} = 2^x \cdot (7(n_{s,f}^\mu + 1) + l + 1)(2N_{ID}^{QCL} + 1) \cdot 2^y + 2N_{ID}^{QCL}$ or |
| | $c_{init} = 2^x \cdot (7(n_{s,f}^\mu + 1) + l + 1)(2N_{ID}^{QCL} + 1) \cdot 2^y + 2N_{ID}^{QCL} + N_{CP}$ or |
| | $c_{init} = 2^x \cdot (7(n_{s,f}^\mu + 1) + l + 1) + N_{ID}^{QCL}$ |

In Embodiment 3 of this application, in an application scenario in which there is no cell identity in the 5G NR, a cell identity $N_{ID}^{cell}$ may be removed from the initialization formulas for determining initial values of scrambling sequences for scrambling various channels or signals. Specific initialization formulas are not further listed exhaustively herein.

Embodiment 3 of this application is described merely by using an example in which the time unit number includes a slot number in a radio frame; however, the embodiment is not limited thereto. The time unit number may also be other time unit numbers in any combination of a slot number in a radio frame, a subframe number in a radio frame, a slot number in a subframe, and an OFDM symbol number in a slot. Implementation processes of other time unit numbers are similar, and are not further described herein.

In the implementation of signal scrambling provided by Embodiment 3 of this application, based on different QCL configuration parameters and different time unit numbers, the initial value of the scrambling sequence is determined, and the signal is scrambled by using the scrambling sequence generated based on the initial value of the scrambling sequence. If the QCL configuration parameter is semi-statically configured by using higher layer signaling, the parameter used by each TRP is specified, and the TRP performs scrambling by using the QCL configuration parameter. Therefore, processing of signal scrambling in advance can be implemented, and a transmission delay is reduced. Scrambling sequences used for scrambling signals transmitted by different beams/precoding/antenna ports of the same TRP or different TRPs to the same terminal are different. Therefore, interference randomization is implemented, and performance is improved.

Embodiment 4

Determine an initial value of a scrambling sequence based on a BWP configuration parameter.

In the embodiment of this application, an initial value of a scrambling sequence for a signal or channel may be determined according to a BWP configuration parameter.

Optionally, the initial value of the scrambling sequence may be determined based on a time unit number and a BWP configuration parameter.

For frequency domain resource allocation, a BWP configuration may be terminal-specific. A plurality of BWPs are configured for a terminal, and different BWPs may use different frame structure parameters. Considering that different BWPs may be configured by using different BWP configuration parameters, a time unit number for transmitting a signal and a BWP configuration parameter may be used to determine an initial value of a scrambling sequence, so that interference randomization is implemented for different BWPs.

Further, optionally, the initial value of the scrambling sequence may also be determined with reference to another variable. This is not specifically limited herein.

The BWP configuration parameter may include at least one of a BWP configuration parameter of a configured BWP, a BWP configuration parameter of an activated BWP, a BWP configuration parameter of a BWP of a signal, a BWP configuration parameter of a BWP of a data channel, and a BWP configuration parameter of a BWP of a control channel.

The BWP configuration parameter may be at least one of a BWP configuration identity, a BWP configuration set, and a BWP configuration parameter, for scrambling.

The BWP configuration identity may be an identity or index of a BWP.

The BWP configuration set may be a BWP configuration parameter set number.

The BWP configuration parameter may be a specific parameter in a BWP configuration, for example, a time-frequency resource or frame structure information in the BWP configuration, for example, may include a frequency domain resource indication, for example, a frequency domain resource block number, or a time domain resource indication, for example, a symbol number.

For example, a plurality of BWPs are configured by using higher layer signaling or physical layer signaling, and then one or more of the BWPs are activated by using higher layer signaling or physical layer signaling. A BWP configuration parameter for scrambling may be a BWP configuration parameter of the activated BWP.

For example, a location of scheduled data is indicated by using a control channel, a BWP of the control channel is set to a BWP 1, and a BWP of the data indicated/scheduled by the control channel is set to a BWP 2. A BWP configuration parameter for scrambling may be a BWP configuration parameter of the configured BWP 2.

For example, a plurality of BWPs are configured by using higher layer signaling or physical layer signaling, and then one or more of the BWPs are activated by using higher layer signaling or physical layer signaling. A BWP configuration parameter for scrambling may be a BWP configuration parameter of a BWP of a data channel.

For example, a location of scheduled data is indicated by using a control channel, a BWP of the control channel is set to a BWP 1, and a BWP of the data indicated/scheduled by the control channel is set to a BWP 2. A BWP configuration parameter for scrambling may be a BWP configuration parameter of a BWP of the control channel.

In the embodiment of this application, the initial value of the scrambling sequence for the signal or channel may be determined according to the BWP configuration parameter.

Further, optionally, the initial value of the scrambling sequence may also be determined with reference to another variable. This is not specifically limited herein.

In the embodiment of this application, a process of generating an initial value of a scrambling sequence used for scrambling a PUSCH data channel is still used as an example for description.

Example 1

Determine the initial value of the scrambling sequence based on a time unit number and a BWP configuration parameter of a data channel.

In the embodiment of this application, the initial value of the scrambling sequence for the signal or channel may be determined according to the BWP configuration parameter of the data channel.

Further, optionally, the initial value of the scrambling sequence may also be determined with reference to another variable. This is not specifically limited herein.

In the embodiment of this application, a network device may determine, based on a current RNTI number of a terminal, a codeword number, a slot number $(n_{s,f}^\mu)$ in a radio frame, and a BWP configuration parameter, the initial value of the scrambling sequence used for scrambling the PUSCH data channel. For example, an initialization formula for determining the initial value of the scrambling sequence may be the following formula:

$$c_{init} = n_{RNTI} \cdot 2^t + q \cdot 2^y + n_{s,f}^\mu \cdot 2^x + N_{ID}^{BWP}$$

or $$c_{init} = n_{RNTI} \cdot 2^t + cq \cdot 2^y + n_{s,f}^\mu \cdot 2^x + N_{ID}^{BWP},$$

where $n_{RNTI}$ indicates an RNTI number, and may be used to identify a terminal, that is, may be understood as a terminal identity, q represents a codeword number, $n_{s,f}^\mu$ represents a slot number in a radio frame, $N_{ID}^{BWP}$ represents a BWP configuration parameter of a data channel, and coefficient parameters t, y, and x are positive integers.

A value of x may be determined according to a maximum quantity of BWP configuration parameters. For example, if the maximum quantity of BWP configuration parameters is 2, one binary bit is required for quantization. In this case, the value of x may be set to 1. For example, if the maximum quantity of BWP configuration parameters is 4, two binary bits are required for quantization. In this case, the value of x may be set to 2.

In the embodiment of this application, the BWP configuration parameter of the data channel may be least one of a BWP configuration identity, a BWP configuration set, and a BWP configuration parameter of the data channel, for scrambling.

The BWP configuration identity may be an identity or index of a BWP.

The BWP configuration set may be a BWP configuration parameter set number.

The BWP configuration parameter may be a specific parameter in a BWP configuration, for example, a time-frequency resource or frame structure information in the BWP configuration.

For example, a plurality of BWPs are configured by using higher layer signaling or physical layer signaling, and then one or more of the BWPs are activated by using higher layer signaling or physical layer signaling. A BWP configuration parameter for scrambling may be a BWP configuration parameter of the activated BWP.

For example, a location of scheduled data is indicated by using a control channel, a BWP of the control channel is set to a BWP 1, and a BWP of the data indicated/scheduled by the control channel is set to a BWP 2. A BWP configuration parameter for scrambling may be a BWP configuration parameter of the configured BWP 2.

For example, a plurality of BWPs are configured by using higher layer signaling or physical layer signaling, and then one or more of the BWPs are activated by using higher layer signaling or physical layer signaling. A BWP configuration parameter for scrambling may be a BWP configuration parameter of a BWP of a data channel.

For example, a location of scheduled data is indicated by using a control channel, a BWP of the control channel is set to a BWP 1, and a BWP of the data indicated/scheduled by the control channel is set to a BWP 2. A BWP configuration parameter for scrambling may be a BWP configuration parameter of a BWP of the control channel.

The implementation of determining the initial value of the scrambling sequence based on the time unit number and the BWP configuration parameter of the data channel in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 47.

TABLE 47

| | |
|---|---|
| PDSCH | $c_{init} = n_{RNTI} \cdot 2^t + q \cdot 2^y + n_{s,f}^\mu \cdot 2^x + N_{ID}^{BWP}$ or $c_{init} = n_{RNTI} \cdot 2^t + cq \cdot 2^y + n_{s,f}^\mu \cdot 2^x + N_{ID}^{BWP}$ |
| PMCH | $c_{init} = n_{s,f}^\mu \cdot 2^x + N_{ID}^{BWP}$ |
| PDCCH | $c_{init} = n_{s,f}^\mu \cdot 2^x + N_{ID}^{BWP}$ |
| PCFICH | $c_{init} = (n_{s,f}^\mu + 1) \cdot 2^x + N_{ID}^{BWP}$ |
| PHICH | $c_{init} = (n_{s,f}^\mu + 1) \cdot 2^x + N_{ID}^{BWP}$ |
| PUCCH cyclic shift $n_{cs}^{cell}(n_s, l)$ | $c_{init} = N_{ID}^{BWP}$ |
| PUCCH format 2/2a/2b | $c_{init} = (n_{s,f}^\mu + 1) \cdot 2^x + N_{ID}^{BWP} + n_{RNTI}$ |
| PUSCH | $c_{init} = n_{RNTI} \cdot 2^t + q \cdot 2^y + n_{s,f}^\mu \cdot 2^x + N_{ID}^{BWP}$ |
| Cell specific RS | $c_{init} = 2^x \cdot (7(n_{s,f}^\mu + 1) + l + 1) + N_{ID}^{BWP} + N_{CP}$ or $c_{init} = 2^x \cdot (7(n_{s,f}^\mu + 1) + l + 1) + N_{ID}^{BWP}$ |
| MBSFN RS | $c_{init} = 2^x \cdot (7(n_{s,f}^\mu + 1) + l + 1) + N_{ID}^{BWP}$ |
| UE specific RS | $c_{init} = (n_{s,f}^\mu + 1) \cdot 2^x + N_{ID}^{BWP} + n_{RNTI}$ |
| Mirroring function | $c_{init} = N_{ID}^{BWP}$ |
| Group hopping | $c_{init} = \left\lfloor \dfrac{N_{ID}^{BWP}}{30} \right\rfloor$ |
| Sequence number | $c_{init} = \left\lfloor \dfrac{N_{ID}^{BWP}}{30} \right\rfloor \cdot 2^5 + f_{ss}^{PUSCH}$ |

Example 2

Determine the initial value of the scrambling sequence based on a time unit number and a BWP configuration parameter of a control channel.

In the embodiment of this application, the initial value of the scrambling sequence for the signal or channel may be determined according to the BWP configuration parameter of the control channel.

Further, optionally, the initial value of the scrambling sequence may also be determined with reference to another variable. This is not specifically limited herein.

In the embodiment of this application, a network device may determine the initial value of the scrambling sequence based on the time unit number and a BWP configuration parameter of a BWP of DCI detected by a terminal.

Specifically, an implementation process in which the network device determines the initial value of the scrambling sequence based on the time unit number and the BWP configuration parameter of the BWP of the control channel detected by the terminal may include at least one of the following implementations:

First implementation: The network device determines the initial value of the scrambling sequence based on the time unit number and a BWP configuration identity or a BWP configuration set of the BWP of the DCI detected by the terminal.

For example, an initialization formula for determining the initial value of the scrambling sequence may be the following formula:

$$c_{init} = n_{RNTI} \cdot 2^t + q \cdot 2^y + n_{s,f}^\mu \cdot 2^x + N_{ID}^{BWP},$$

or $$c_{init} = n_{RNTI} \cdot 2^t + cq \cdot 2^y + n_{s,f}^\mu \cdot 2^x + N_{ID}^{BWP},$$

where $n_{RNTI}$ indicates an RNTI number, and may be used to identify a terminal, that is, may be understood as a terminal identity, q represents a codeword number, $n_{s,f}^\mu$ represents a slot number in a radio frame, $N_{ID}^{BWP}$ represents a BWP configuration identity or a BWP configuration set of a BWP of DCI detected by the terminal, and parameters t, y, and x are positive integers.

For example, the terminal detects DCI in a time-frequency resource corresponding to a BWP configuration identity 1. In this case, $N_{ID}^{BWP}$ may be understood as the BWP configuration identity 1, that is, $N_{ID}^{BWP}=1$.

Optionally, a value of x may be determined according to a maximum quantity of BWP configuration parameters. For example, if the maximum quantity of BWP configuration parameters is 2, one binary bit is required for quantization. In this case, the value of x may be set to 1. For example, if the maximum quantity of BWP configuration parameters is 4, two binary bits are required for quantization. In this case, the value of x may be set to 2.

An initialization formula for determining, by the network device, an initial value of a scrambling sequence for each channel or signal based on a time unit number and a BWP configuration identity/a BWP configuration set of a BWP of DCI detected by the terminal may be the same as that shown in Table 47, and a difference lies only in that meanings of $N_{ID}^{BWP}$ are different. Therefore, similarities are not further described herein.

Second implementation: The network device determines the initial value of the scrambling sequence based on the time unit number and an RB number in the BWP configuration parameter.

In the embodiment of this application, the initial value of the scrambling sequence for the signal or channel may be determined according to the RB number in the BWP configuration parameter.

Further, optionally, the initial value of the scrambling sequence may also be determined with reference to another variable. This is not specifically limited herein.

For example, an initialization formula for determining the initial value of the scrambling sequence may be the following formula:

$$c_{init} = n_{RNTI} \cdot 2^t + q \cdot 2^y + n_{s,f}^\mu \cdot 2^x + N_{ID}^{RB}$$

or $$c_{init} = n_{RNTI} \cdot 2^t + cq \cdot 2^y + n_{s,f}^\mu \cdot 2^x + N_{ID}^{RB},$$

where $n_{RNTI}$ indicates an RNTI number, and may be used to identify a terminal, that is, may be understood as a terminal identity, q represents a codeword number, $n_{s,f}^\mu$ represents a slot number in a radio frame, $N_{ID}^{BWP}$ represents an RB number in a BWP configuration parameter, and parameters t, Y, and x are positive integers.

The RB number may be a minimum RB index value or a maximum RB index value or the like corresponding to the BWP.

Optionally, a value of x may be determined according to a maximum RB number in the BWP configuration parameter. For example, if the maximum RB number in the BWP configuration parameter is 100, seven binary bits are required for quantization. In this case, the value of x may be set to 7. For example, if the maximum RB number in the BWP configuration parameter is 275, nine binary bits are required for quantization. In this case, the value of x may be set to 9.

For example, if the terminal detects DCI in a time-frequency resource corresponding to a BWP configuration identity 1, $N_{ID}^{RB}$ is an RB number in the BWP configuration identity 1.

In the embodiment of this application, for a corresponding initialization formula for determining, by the network device, an initial value of a scrambling sequence for each channel or signal based on a time unit number and an RB number in a BWP configuration parameter, refer to Table 48.

TABLE 48

| | |
|---|---|
| PDSCH | $c_{init} = n_{RNTI} \cdot 2^t + q \cdot 2^y + n_{s,f}^\mu \cdot 2^x + N_{ID}^{RB}$ or $c_{init} = n_{RNTI} \cdot 2^t + cq \cdot 2^y + n_{s,f}^\mu \cdot 2^x + N_{ID}^{RB}$ |
| PMCH | $c_{init} = n_{s,f}^\mu \cdot 2^x + N_{ID}^{RB}$ |
| PDCCH | $c_{init} = n_{s,f}^\mu \cdot 2^x + N_{ID}^{RB}$ |
| PCFICH | $c_{init} = (n_{s,f}^\mu + 1) \cdot 2^x + N_{ID}^{RB}$ |
| PHICH | $c_{init} = (n_{s,f}^\mu + 1) \cdot 2^x + N_{ID}^{RB}$ |
| PUCCH cyclic shift $n_{cs}^{cell}(n_s, l)$ | $c_{init} = N_{ID}^{RB}$ |
| PUCCH format 2/2a/2b | $c_{init} = (n_{s,f}^\mu + 1) \cdot 2^x + N_{ID}^{RB} + n_{RNTI}$ |
| PUSCH | $c_{init} = n_{RNTI} \cdot 2^t + q \cdot 2^y + n_{s,f}^\mu \cdot 2^x + N_{ID}^{RB}$ |
| Cell specific RS | $c_{init} = 2^x \cdot (7(n_{s,f}^\mu + 1) + l + 1) + N_{ID}^{RB} + N_{CP}$ or $c_{init} = 2^x \cdot (7(n_{s,f}^\mu + 1) + l + 1) + N_{ID}^{RB}$ |
| MBSFN RS | $c_{init} = 2^x \cdot (7(n_{s,f}^\mu + 1) + l + 1) + N_{ID}^{RB}$ |
| UE specific RS | $c_{init} = (n_{s,f}^\mu + 1) \cdot 2^x + N_{ID}^{RB} + n_{RNTI}$ |
| Mirroring function | $c_{init} = N_{ID}^{RB}$ |
| Group hopping | $c_{init} = \left\lfloor \dfrac{N_{ID}^{RB}}{30} \right\rfloor$ |
| Sequence number | $c_{init} = \left\lfloor \dfrac{N_{ID}^{RB}}{30} \right\rfloor \cdot 2^5 + f_{ss}^{PUSCH}$ |

Third implementation: The network device determines the initial value of the scrambling sequence based on the time unit number and a symbol number in the BWP configuration parameter.

In the embodiment of this application, the initial value of the scrambling sequence for the signal or channel may be determined based on the symbol number in the BWP configuration parameter.

Further, optionally, the initial value of the scrambling sequence may also be determined with reference to another variable. This is not specifically limited herein.

For example, an initialization formula for determining the initial value of the scrambling sequence may be the following formula:

$$c_{init} = n_{RNTI} \cdot 2^t + q \cdot 2^y + n_{s,f}^\mu \cdot 2^x + l$$

or $$c_{init} = n_{RNTI} \cdot 2^t + cq \cdot 2^y + n_{s,f}^\mu \cdot 2^x + l,$$

where $n_{RNTI}$ indicates an RNTI number, and may be used to identify a terminal, that is, may be understood as a terminal identity, q represents a codeword number, $n_{s,f}^\mu$ represents a slot number in a radio frame, l represents a symbol number corresponding to a BWP of DCI detected by the terminal, and parameters t, y, and x are positive integers.

The symbol number may be a minimum symbol index value or a maximum symbol index value or the like corresponding to the BWP.

Optionally, a value of x may be determined according to a maximum symbol number in the BWP configuration parameter. For example, if the maximum symbol number in the BWP configuration parameter is 14, four binary bits are required for quantization. In this case, the value of x may be set to 4. For example, if the maximum symbol number in the BWP configuration parameter is 7, three binary bits are required for quantization. In this case, the value of x may be set to 3.

For example, if the terminal detects DCI in a time-frequency resource corresponding to a BWP configuration identity/BWP configuration set 1, l may be a symbol number in the BWP configuration identity/BWP configuration set.

In the embodiment of this application, for a corresponding initialization formula for determining, by the network device, an initial value of a scrambling sequence for each channel or signal based on a time unit number and a symbol number in a BWP configuration parameter, refer to Table 49.

TABLE 49

| | |
|---|---|
| PDSCH | $c_{init} = n_{RNTI} \cdot 2^t + q \cdot 2^y + n_{s,f}^\mu \cdot 2^x + l$ or |
| | $c_{init} = n_{RNTI} \cdot 2^t + cq \cdot 2^y + n_{s,f}^\mu \cdot 2^x + l$ |
| PMCH | $c_{init} = n_{s,f}^\mu \cdot 2^x + l$ |
| PDCCH | $c_{init} = n_{s,f}^\mu \cdot 2^x + l$ |
| PCFICH | $c_{init} = (n_{s,f}^\mu + 1) \cdot 2^x + l$ |
| PHICH | $c_{init} = (n_{s,f}^\mu + 1) \cdot 2^x + l$ |
| PUCCH cyclic shift $n_{cs}^{cell}(n_s, l)$ | $c_{init} = 1$ |
| PUCCH format 2/2a/2b | $c_{init} = (n_{s,f}^\mu + 1) \cdot 2^x + l + n_{RNTI}$ |
| PUSCH | $c_{init} = n_{RNTI} \cdot 2^t + q \cdot 2^y + n_{s,f}^\mu \cdot 2^x + l$ |
| Cell specific RS | $c_{init} = 2^x \cdot (7(n_{s,f}^\mu + 1) + l + 1) + N_{CP}$ or |
| | $c_{init} = 2^x \cdot (7(n_{s,f}^\mu + 1) + l + 1)$ |
| MBSFN RS | $c_{init} = 2^x \cdot (7(n_{s,f}^\mu + 1) + l + 1)$ |
| UE specific RS | $c_{init} = (n_{s,f}^\mu + 1) \cdot 2^x + l + n_{RNTI}$ |
| Mirroring function | $c_{init} = 1$ |
| Group hopping | $c_{init} = \left\lfloor \dfrac{1}{30} \right\rfloor$ |
| Sequence number | $c_{init} = \left\lfloor \dfrac{1}{30} \right\rfloor \cdot 2^5 + f_{ss}^{PUSCH}$ |

In Embodiment 4 of this application, in an application scenario in which there is no cell identity in 5G NR, a cell identity $N_{ID}^{cell}$ may be removed from the initialization formula for determining the initial value of the scrambling sequence for scrambling each channel or signal. Specific initialization formulas are not further listed exhaustively herein.

Embodiment 4 of this application is described merely by using an example in which the time unit number includes a slot number in a radio frame; however, the embodiment is not limited thereto. The time unit number may also be other time unit numbers in any combination of a slot number in a radio frame, a subframe number in a radio frame, a slot number in a subframe, and an OFDM symbol number in a slot. Implementation processes of other time unit numbers are similar, and are not further described herein.

In the implementation of signal scrambling provided by Embodiment 4 of this application, based on different BWP configuration parameters and different time unit numbers, the initial value of the scrambling sequence is determined, and the signal is scrambled by using the scrambling sequence generated based on the initial value of the scrambling sequence. If the BWP configuration parameter is semi-statically configured by using higher layer signaling, a BWP parameter used by each network device or terminal is specified, and the network device performs scrambling by using the BWP configuration parameter that is semi-statically configured. Therefore, processing of signal scrambling in advance can be implemented, and a transmission delay is reduced. In addition, scrambling sequences used for scrambling signals transmitted by different beams/precoding/antenna ports of a same network device or by different network devices to a same terminal are different. Therefore, interference randomization is implemented, and performance is improved.

Embodiment 5

Determine an initial value of a scrambling sequence based on a control channel resource configuration parameter.

In the embodiment of this application, an initial value of a scrambling sequence for a signal or channel may be determined according to a control channel resource configuration parameter.

Optionally, the initial value of the scrambling sequence may be determined based on a time unit number and a control channel resource configuration parameter.

Different beams/precoding/antenna ports of a same network device or different network devices may use different control channel resource configuration parameters. Therefore, in the embodiment of this application, the initial value of the scrambling sequence may be determined according to the time unit number for transmitting the signal and the control channel resource configuration parameter, so that interference randomization is implemented for different control channel resources.

The control channel resource configuration parameter may include at least one of a frequency domain location, a time domain location, a QCL indication, and a CORESET identity. The control channel resource configuration parameter may be indicated by using higher layer signaling (RRC or MAC) or physical layer signaling (such as DCI).

Further, optionally, the initial value of the scrambling sequence may also be determined with reference to another variable. This is not specifically limited herein.

In the embodiment of this application, a process of generating an initial value of a scrambling sequence used for scrambling a PUSCH data channel is still used as an example for description.

Example 1

Determine the initial value of the scrambling sequence based on a time unit number and a CORESET configuration parameter/identity corresponding to a control channel resource in which DCI detected by a terminal is located.

In the embodiment of this application, a network device may determine, based on a current RNTI number of UE, a codeword number, a slot number ($n_{s,f}^{\mu}$) in a radio frame, and a CORESET configuration parameter/identity, the initial value of the scrambling sequence used for scrambling the PUSCH data channel. For example, an initialization formula for determining the initial value of the scrambling sequence may be the following formula:

$$c_{init}=n_{RNTI}\cdot 2^t+q\cdot 2^y+n_{s,f}^{\mu}\cdot 2^x+N_{ID}^{CORESET}$$

or $$c_{init}=n_{RNTI}\cdot 2^t+cq\cdot 2^y+n_{s,f}^{\mu}\cdot 2^x+N_{ID}^{CORESET},$$

where $n_{RNTI}$ indicates an RNTI number, and may be used to identify a terminal, that is, may be understood as a terminal identity, q represents a codeword number, $n_{s,f}^{\mu}$ represents a slot number in a radio frame, $N_{ID}^{CORESET}$ represents a CORESET configuration parameter/identity, and coefficient parameters t, y, and x are positive integers; specifically, a value of x is related to a maximum quantity of control channel resource configuration parameters that can be configured.

For example, four groups of control channel resource configuration parameters are configured by RRC. If the terminal detects DCI in a time-frequency resource corresponding to a CORESET identity 1, $N_{ID}^{CORESET}$ is the CORESET identity 1.

The implementation of determining the initial value of the scrambling sequence based on the time unit number and the CORESET configuration parameter/identity in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 50.

TABLE 50

| PDSCH | $c_{init}=n_{RNTI}\cdot 2^t+q\cdot 2^y+n_{s,f}^{\mu}\cdot 2^x+N_{ID}^{CORESET}$ or $c_{init}=n_{RNTI}\cdot 2^t+cq\cdot 2^y+n_{s,f}^{\mu}\cdot 2^x+N_{ID}^{CORESET}$ |
| --- | --- |
| PMCH | $c_{init}=n_{s,f}^{\mu}\cdot 2^x+N_{ID}^{CORESET}$ |
| PDCCH | $c_{init}=n_{s,f}^{\mu}\cdot 2^x+N_{ID}^{CORESET}$ |
| PCFICH | $c_{init}=(n_{s,f}^{\mu}+1)\cdot 2^x+N_{ID}^{CORESET}$ |
| PHICH | $c_{init}=(n_{s,f}^{\mu}+1)\cdot 2^x+N_{ID}^{CORESET}$ |
| PUCCH cyclic shift $n_{cs}^{cell}(n_s,l)$ | $c_{init}=N_{ID}^{CORESET}$ |
| PUCCH format 2/2a/2b | $c_{init}=(n_{s,f}^{\mu}+1)\cdot 2^x+N_{ID}^{CORESET}+n_{RNTI}$ |
| PUSCH | $c_{init}=n_{RNTI}\cdot 2^t+q\cdot 2^y+n_{s,f}^{\mu}\cdot 2^x+N_{ID}^{CORESET}$ |
| Cell specific RS | $c_{init}=2^x\cdot(7(n_{s,f}^{\mu}+1)+l+1)+N_{ID}^{CORESET}+N_{CP}$ or $c_{init}=2^x\cdot(7(n_{s,f}^{\mu}+1)+l+1)+N_{ID}^{CORESET}$ |
| MBSFN RS | $c_{init}=2^x\cdot(7(n_{s,f}^{\mu}+1)+l+1)+N_{ID}^{CORESET}$ |
| UE specific RS | $c_{init}=(n_{s,f}^{\mu}+1)\cdot 2^x+N_{ID}^{CORESET}+n_{RNTI}$ |
| Mirroring function | $c_{init}=N_{ID}^{CORESET}$ |
| Group hopping | $c_{init}=\left\lfloor\dfrac{N_{ID}^{CORESET}}{30}\right\rfloor$ |

TABLE 50-continued

| Sequence number | $c_{init}=\left\lfloor\dfrac{N_{ID}^{CORESET}}{30}\right\rfloor\cdot 2^5+f_{ss}^{PUSCH}$ |
| --- | --- |

Example 2

Determine the initial value of the scrambling sequence based on a time unit number and an RB number corresponding to a control channel resource.

In the embodiment of this application, the initial value of the scrambling sequence for the signal or channel may be determined according to the RB number corresponding to the control channel resource.

Further, optionally, the initial value of the scrambling sequence may also be determined with reference to another variable. This is not specifically limited herein.

For example, scrambling may be performed according to an RB number corresponding to a CORESET during scrambling.

For example, an initialization formula for determining the initial value of the scrambling sequence may be the following formula:

$$c_{init}=n_{RNTI}\cdot 2^t+q\cdot 2^y+n_{s,f}^{\mu}\cdot 2^x+N_{ID}^{RB}$$

or $$c_{init}=n_{RNTI}\cdot 2^t+cq\cdot 2^y+n_{s,f}^{\mu}\cdot 2^x+N_{ID}^{RB},$$

where $n_{RNTI}$ indicates an RNTI number, and may be used to identify a terminal, that is, may be understood as a terminal identity, q represents a codeword number, $n_{s,f}^{\mu}$ represents a slot number in a radio frame, $N_{ID}^{RB}$ represents an RB number corresponding to a control channel resource, and coefficient parameters t, y, and x are positive integers.

The RB number corresponding to the control channel resource may be a minimum RB index value or a maximum RB index value or the like corresponding to the control channel resource.

Optionally, a value of x may be determined according to a maximum RB number corresponding to the control channel resource. For example, if the maximum RB number corresponding to the control channel resource is 100, seven binary bits are required for quantization. In this case, the value of x may be set to 7. For example, if the maximum RB number corresponding to the control channel resource is 275, nine binary bits are required for quantization. In this case, the value of x may be set to 9.

For example, if the terminal detects DCI in a time-frequency resource corresponding to a CORESET parameter set 1, $N_{ID}^{RB}$ is an RB number in the CORESET parameter set 1.

The implementation of determining the initial value of the scrambling sequence based on the time unit number and the RB number corresponding to the control channel resource in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 51.

TABLE 51

| | |
|---|---|
| PDSCH | $c_{init} = n_{RNTI} \cdot 2^t + q \cdot 2^y + n_{s,f}^\mu \cdot 2^x + N_{ID}^{RB}$ or |
| | $c_{init} = n_{RNTI} \cdot 2^t + cq \cdot 2^y + n_{s,f}^\mu \cdot 2^x + N_{ID}^{RB}$ |
| PMCH | $c_{init} = n_{s,f}^\mu \cdot 2^x + N_{ID}^{RB}$ |
| PDCCH | $c_{init} = n_{s,f}^\mu \cdot 2^x + N_{ID}^{RB}$ |
| PCFICH | $c_{init} = (n_{s,f}^\mu + 1) \cdot 2^x + N_{ID}^{RB}$ |
| PHICH | $c_{init} = (n_{s,f}^\mu + 1) \cdot 2^x + N_{ID}^{RB}$ |
| PUCCH cyclic shift $n_{cs}^{cell}(n_s, l)$ | $c_{init} = N_{ID}^{RB}$ |
| PUCCH format 2/2a/2b | $c_{init} = (n_{s,f}^\mu + 1) \cdot 2^x + N_{ID}^{RB} + n_{RNTI}$ |
| PUSCH | $c_{init} = n_{RNTI} \cdot 2^t + q \cdot 2^y + n_{s,f}^\mu \cdot 2^x + N_{ID}^{RB}$ |
| Cell specific RS | $c_{init} = 2^x \cdot (7(n_{s,f}^\mu + 1) + l + 1) + N_{ID}^{RB} + N_{CP}$ or |
| | $c_{init} = 2^x \cdot (7(n_{s,f}^\mu + 1) + l + 1) + N_{ID}^{RB}$ |
| MBSFN RS | $c_{init} = 2^x \cdot (7(n_{s,f}^\mu + 1) + l + 1) + N_{ID}^{RB}$ |
| UE specific RS | $c_{init} = (n_{s,f}^\mu + 1) \cdot 2^x + N_{ID}^{RB} + n_{RNTI}$ |
| Mirroring function | $c_{init} = N_{ID}^{RB}$ |
| Group hopping | $c_{init} = \left\lfloor \dfrac{N_{ID}^{RB}}{30} \right\rfloor$ |
| Sequence number | $c_{init} = \left\lfloor \dfrac{N_{ID}^{RB}}{30} \right\rfloor \cdot 2^5 + f_{ss}^{PUSCH}$ |

Example 3

Determine the initial value of the scrambling sequence based on a time unit number and a symbol number corresponding to a control channel resource.

In the embodiment of this application, the initial value of the scrambling sequence for the signal or channel may be determined based on the symbol number corresponding to the control channel resource.

Further, optionally, the initial value of the scrambling sequence may also be determined with reference to another variable. This is not specifically limited herein.

For example, an initialization formula for determining the initial value of the scrambling sequence may be the following formula:

$$c_{init} = n_{RNTI} \cdot 2^t + q \cdot 2^y + n_{s,f}^\mu \cdot 2^x + l$$

or $$c_{init} = n_{RNTI} \cdot 2^t + cq \cdot 2^y + n_{s,f}^\mu \cdot 2^x + l,$$

where $n_{RNTI}$ indicates an RNTI number, and may be used to identify a terminal, that is, may be understood as a terminal identity, q represents a codeword number, cq represents a CBG number, $n_{s,f}^\mu$ represents a slot number in a radio frame, l represents a symbol number corresponding to a control channel resource, and parameters t, y, and x are positive integers.

The symbol number corresponding to the control channel resource may be a minimum symbol index value or a maximum symbol index value corresponding to the control channel resource.

Optionally, a value of x may be determined according to a maximum symbol number corresponding to the control channel resource. For example, if the maximum symbol number corresponding to the control channel resource is 14, four binary bits are required for quantization. In this case, the value of x may be set to 4. For example, if the maximum symbol number corresponding to the control channel resource is 7, three binary bits are required for quantization. In this case, the value of x may be set to 3.

The implementation of determining the initial value of the scrambling sequence based on the time unit number and the symbol number corresponding to the control channel resource in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 52.

TABLE 52

| | |
|---|---|
| PDSCH | $c_{init} = n_{RNTI} \cdot 2^t + q \cdot 2^y + n_{s,f}^\mu \cdot 2^x + 1$ or |
| | $c_{init} = n_{RNTI} \cdot 2^t + cq \cdot 2^y + n_{s,f}^\mu \cdot 2^x + 1$ |
| PMCH | $c_{init} = n_{s,f}^\mu \cdot 2^x + 1$ |
| PDCCH | $c_{init} = n_{s,f}^\mu \cdot 2^x + 1$ |
| PCFICH | $c_{init} = (n_{s,f}^\mu + 1) \cdot 2^x + 1$ |
| PHICH | $c_{init} = (n_{s,f}^\mu + 1) \cdot 2^x + 1$ |
| PUCCH cyclic shift $n_{cs}^{cell}(n_s, l)$ | $c_{init} = 1$ |
| PUCCH format 2/2a/2b | $c_{init} = (n_{s,f}^\mu + 1) \cdot 2^x + 1 + n_{RNTI}$ |
| PUSCH | $c_{init} = n_{RNTI} \cdot 2^t + q \cdot 2^y + n_{s,f}^\mu \cdot 2^x + 1$ |
| Cell specific RS | $c_{init} = 2^x \cdot (7(n_{s,f}^\mu + 1) + l + 1) + N_{CP}$ or |
| | $c_{init} = 2^x \cdot (7(n_{s,f}^\mu + 1) + l + 1)$ |
| MBSFN RS | $c_{init} = 2^x \cdot (7(n_{s,f}^\mu + 1) + l + 1)$ |
| UE specific RS | $c_{init} = (n_{s,f}^\mu + 1) \cdot 2^x + 1 + n_{RNTI}$ |
| Mirroring function | $c_{init} = 1$ |
| Group hopping | $c_{init} = \left\lfloor \dfrac{1}{30} \right\rfloor$ |
| Sequence number | $c_{init} = \left\lfloor \dfrac{1}{30} \right\rfloor \cdot 2^5 + f_{ss}^{PUSCH}$ |

Embodiment 5 of this application is described merely by using an example in which the time unit number includes a slot number in a radio frame; however, the embodiment is not limited thereto. The time unit number may be other time unit numbers in any combination of a slot number in a radio frame, a subframe number in a radio frame, a slot number in a subframe, and an OFDM symbol number in a slot. Implementation processes of other time unit numbers are similar, and are not further described herein.

In the implementation of signal scrambling provided by Embodiment 5 of this application, the network device determines the initial value of the scrambling sequence by using the control channel resource parameter/the symbol number corresponding to the control channel resource/the RB number corresponding to the control channel resource. Because the control channel resource parameter/the symbol number corresponding to the control channel resource/the RB number corresponding to the control channel resource may be semi-statically configured by using higher layer signaling, processing of signal scrambling in advance can be implemented, and a transmission delay is reduced. In addition, scrambling sequences used for scrambling signals transmitted by different beams/precoding/antenna ports of a same network device or by different network devices to a same terminal may be different. Therefore, interference randomization is implemented, and performance is improved.

Embodiment 6

Determine an initial value of a scrambling sequence based on a terminal identity.

In the embodiment of this application, an initial value of a scrambling sequence for a signal or channel may be determined according to an RNTI corresponding to an indicated RNTI configuration identity used for signal scrambling.

Optionally, the initial value of the scrambling sequence may be determined based on a time unit number and a terminal identity.

After a terminal accesses a cell, different beams/precoding/antenna ports of a same network device allocate a plurality of terminal identities (for example, RNTIs) to the terminal, or different network devices allocate a plurality of terminal identities (for example, RNTIs) to the terminal through a network device, or different network devices may allocate terminal identities to the terminal separately. The terminal identities are used to scramble data from different beams/precoding/antenna ports of the same network device or data from different network devices, so that interference randomization can be implemented.

A network device configures at least two terminal identities for the terminal by using higher layer signaling (RRC or MAC), and indicates, by using physical layer signaling (such as DCI), a terminal identity currently used by the terminal. For example, two groups of RNTI parameters are configured by RRC, and one bit in the DCI is used to indicate an RNTI parameter that is currently used. In the embodiment of this application, the network device or the terminal may scramble a signal based on a current RNTI configuration identity.

Further, optionally, the initial value of the scrambling sequence may also be determined with reference to another variable. This is not specifically limited herein.

In the embodiment of this application, assuming that the terminal identity is an RNTI corresponding to the RNTI configuration identity, a process of generating an initial value of a scrambling sequence used for scrambling a PUSCH is used as an example for description.

The network device may determine the initial value of the scrambling sequence based on the RNTI corresponding to the RNTI configuration identity currently used by the terminal, a codeword number, and a slot number $(n_{s,f}^\mu)$ in a radio frame. For example, an initialization formula for determining the initial value of the scrambling sequence may be the following formula:

$$c_{init}=n_{RNTI}^i \cdot 2^t + q \cdot 2^y + n_{s,f}^\mu \cdot 2^x$$

or $$c_{init}=n_{RNTI}^i \cdot 2^t + cq \cdot 2^y + n_{s,f}^\mu \cdot 2^x,$$

where $n_{RNTI}^i$ indicates an RNTI corresponding to an RNTI configuration identity i currently used by a terminal, q represents a codeword number, $n_{s,f}^\mu$ represents a slot number in a radio frame, parameters t, y, x, and i are positive integers, and a value range of i may be i∈{0,1}. Specifically, a specific value of i may be determined through negotiation between network devices. Optionally, for example, a configuration identity of $n_{RNTI}$ of a serving base station is 0, that is, i=0; and a configuration identity of $n_{RNTI}$ of a coordinated base station is 1, that is, i=1.

Optionally, specifically, the value range of i is related to a maximum quantity of RNTI configuration identities that can be configured.

Optionally, the RNTI configuration identity may be notified by using higher layer signaling (for example, RRC signaling or MAC signaling) or physical layer signal (for example, DCI), or may be determined implicitly. This is not specifically limited herein.

Specifically, for example, the RNTI configuration identity may be determined according to a CORESET configuration or candidates or CCEs occupied by the DCI or a QCL indication in the DCI.

For example, by default, an RNTI configuration identity of UE corresponding to a base station 1 may be 0, and an RNTI configuration identity of UE corresponding to a base station 2 may be 1. The base station 1 may transmit the DCI by using a time-frequency resource of a CORESET identity 1, and the base station 2 may transmit the DCI by using a time-frequency resource of a CORESET identity 2. When the UE detects the DCI in the time-frequency resource of the CORESET identity 1, data scheduled by the DCI may be scrambled by using the RNTI configuration identity 0; if the UE detects the DCI in the time-frequency resource of the CORESET identity 2, data scheduled by the DCI may be scrambled by using the RNTI configuration identity 1.

For example, if the base station 1 transmits the DCI by using candidates 1 to 4, and the base station 2 transmits the DCI by using candidates 5 to 8, when the UE detects the DCI in time-frequency resources of the candidates 1 to 4, data scheduled by the DCI may be scrambled by using the RNTI configuration identity 0; if the UE detects the DCI in time-frequency resources of the candidates 5 to 8, data scheduled by the DCI may be scrambled by using the RNTI configuration identity 1.

For example, if the base station 1 transmits the DCI by using CCEs 1 to 10, and the base station 2 transmits the DCI by using CCEs 11 to 20, when the UE detects the DCI in time-frequency resources of the CCEs 1 to 10, data scheduled by the DCI may be scrambled by using the RNTI configuration identity 0; if the UE detects the DCI in time-frequency resources of the CCEs 11 to 20, data scheduled by the DCI may be scrambled by using the RNTI configuration identity 1.

For example, if the base station 1 transmits the DCI by using a QCL configuration 1, and the base station 2 transmits the DCI by using a QCL configuration 2, when the QCL configuration in the DCI received by the UE is the QCL configuration 1, data scheduled by the DCI may be scrambled by using the RNTI configuration identity 0; if the QCL configuration in the DCI received by the UE is the QCL configuration 2, data scheduled by the DCI may be scrambled by using the RNTI configuration identity 1.

The implementation of determining the initial value of the scrambling sequence based on the time unit number and the RNTI corresponding to the RNTI configuration identity in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for other channels or signals may be shown in Table 53.

TABLE 53

| PDSCH | $c_{init} = n_{RNTI}^i \cdot 2^t + q \cdot 2^y + n_{s,f}^u \cdot 2^x$ or |
| --- | --- |
| | $c_{init} = n_{RNTI}^i \cdot 2^t + cq \cdot 2^y + n_{s,f}^u \cdot 2^x$ |
| PUCCH format 2/2a/2b | $c_{init} = (n_{s,f}^u + 1) \cdot 2^x + n_{RNTI}^i$ |
| PUSCH | $c_{init} = n_{RNTI}^i \cdot 2^t + q \cdot 2^y + n_{s,f}^u \cdot 2^x$ |
| UE Specific RS | $c_{init} = (n_{s,f}^u + 1) \cdot 2^x + n_{RNTI}^i$ |

Embodiment 6 of this application is described merely by using an example in which the terminal identity is the RNTI configuration identity currently used by the terminal; however, the embodiment is not limited thereto. The terminal identity may also be other identities that can be used to distinguish terminals, for example, a temporary subscriber identity, or a mobile phone card identity of a user.

Embodiment 6 of this application is described merely by using an example in which the time unit number includes a slot number in a radio frame; however, the embodiment is not limited thereto. The time unit number may also be other time unit numbers in any combination of a slot number in a radio frame, a subframe number in a radio frame, a slot number in a subframe, and an OFDM symbol number in a slot. Implementation processes of other time unit numbers are similar, and are not further described herein.

In the implementation of signal scrambling provided by Embodiment 6 of this application, the network device determines the initial value of the scrambling sequence by using the time unit number and the terminal identity. Because the terminal identity may be semi-statically configured by using higher layer signaling, processing of signal scrambling in advance can be implemented, and a transmission delay is reduced. In addition, because different beams/precoding/antenna ports of a same network device or different network devices use different terminal identities, scrambling sequences used for scrambling signals transmitted by different beams/precoding/antenna ports of the same network device or different network devices to a same terminal may be different. Therefore, interference randomization is implemented, and performance is improved.

Further, the initial value of the scrambling sequence is determined based on the terminal identity in Embodiment 6 of this application, so that scrambling initialization may be irrelevant to a network identity (for example, a network identity such as a cell identity and a virtual cell identity), and that a mobile terminal has a shorter delay in a larger area.

Embodiment 7

Determine an initial value of a scrambling sequence based on a codeword configuration parameter.

In the embodiment of this application, an initial value of a scrambling sequence for a signal or channel may be determined according to a codeword configuration parameter.

Optionally, the initial value of the scrambling sequence may be determined based on a time unit number and a codeword configuration parameter.

Different beams/precoding/antenna ports of a same network device may allocate a plurality of codeword configuration parameters to a terminal, or different network devices may allocate a plurality of codeword configuration parameters to a terminal through a network device. The codeword configuration parameters are used to scramble data from different beams/precoding/antenna ports of the same network device or data from different network devices, so that interference randomization can be implemented.

Further, optionally, the initial value of the scrambling sequence may also be determined with reference to another variable. This is not specifically limited herein.

The codeword configuration parameter may be other configured identities used for scrambling, and is not specifically limited herein.

Optionally, the codeword configuration parameter may be notified by using higher layer signaling (for example, RRC signaling or MAC signaling) or physical layer signal (for example, DCI), or may be determined implicitly. This is not specifically limited herein.

The codeword configuration parameter may include at least one of a codeword identity and a codeword group identity. In the embodiment of this application, an implementation process of determining the initial value of the scrambling sequence based on the codeword identity and an implementation process of determining the initial value of the scrambling sequence based on the codeword group identity are described separately.

In the embodiment of this application, a process of generating an initial value of a scrambling sequence used for scrambling a PUSCH data channel is still used as an example for description.

Example 1

Determine the initial value of the scrambling sequence based on a time unit number and a codeword identity.

In the embodiment of this application, the initial value of the scrambling sequence for the signal or channel may be determined according to the codeword identity.

Further, optionally, the initial value of the scrambling sequence may also be determined with reference to another variable. This is not specifically limited herein.

In the embodiment of this application, a network device may determine the initial value of the scrambling sequence based on an RNTI configuration identity currently used by the terminal, a codeword identity, and a slot number (n f) in a radio frame.

For example, during coordination, a currently used codeword identity may be indicated in DCI when scheduling is performed by using a plurality of PDCCHs. For example, if a maximum quantity of codeword identities is 2, one bit may be used for indicating; or if a maximum quantity of codeword identities is 4, two bits may be used for indicating.

For example, during coordination, a codeword identity may be determined according to a time-frequency resource dedicated for DCI, and a scrambling sequence for data scheduled by the DCI is determined.

Specifically, for example, the codeword identity may be determined according to a CORESET configuration or candidates or CCEs occupied by the DCI or a QCL indication in the DCI.

For example, by default, a codeword identity of a base station 1 may be 0, and a codeword identity of a base station 2 may be 1. The base station 1 may transmit the DCI by using a time-frequency resource of a CORESET identity 1, and the base station 2 may transmit the DCI by using a time-frequency resource of a CORESET identity 2. When the UE detects the DCI in the time-frequency resource of the CORESET identity 1, data scheduled by the DCI may be scrambled by using the codeword identity 0; if the UE detects the DCI in the time-frequency resource of the CORESET identity 2, data scheduled by the DCI may be scrambled by using the codeword identity 1.

For example, if the base station 1 transmits the DCI by using candidates 1 to 4, and the base station 2 transmits the DCI by using candidates 5 to 8, when the UE detects the DCI in time-frequency resources of the candidates 1 to 4, data scheduled by the DCI may be scrambled by using the codeword identity 0; if the UE detects the DCI in time-frequency resources of the candidates 5 to 8, data scheduled by the DCI may be scrambled by using the codeword identity 1.

For example, if the base station 1 transmits the DCI by using CCEs 1 to 10, and the base station 2 transmits the DCI by using CCEs 11 to 20, when the UE detects the DCI in time-frequency resources of the CCEs 1 to 10, data scheduled by the DCI may be scrambled by using the codeword identity 0; if the UE detects the DCI in time-frequency resources of the CCEs 11 to 20, data scheduled by the DCI may be scrambled by using the codeword identity 1.

For example, if the base station 1 transmits the DCI by using a QCL configuration 1, and the base station 2 transmits the DCI by using a QCL configuration 2, when the QCL configuration in the DCI received by the UE is the QCL configuration 1, data scheduled by the DCI may be scrambled by using the codeword identity 0; if the QCL configuration in the DCI received by the UE is the QCL configuration 2, data scheduled by the DCI may be scrambled by using the codeword identity 1.

In this case, the terminal may determine the initial value of the scrambling sequence based on the current codeword identity. For example, an initialization formula for determining the initial value of the scrambling sequence may be the following formula:

$$c_{init} = n_{RNTI} \cdot 2^t + N_{cw}^{ID} \cdot 2^x + n_{s,f}^{\mu},$$

where $n_{RNTI}$ indicates an RNTI number, and may be used to identify a terminal, that is, may be understood as a terminal identity, $N_{cw}^{ID}$ represents a codeword identity, $n_{s,f}^{\mu}$ represents a slot number in a radio frame, and parameters t, y, and x are positive integers.

A specific manner of determining values of coefficient parameters μ and x in the embodiment of this application is similar to the process of determining a coefficient parameter in the foregoing embodiment, and may be applicable to the foregoing process of determining a coefficient parameter.

The following three methods may be included: The value of the coefficient parameter in the formula for determining the initial value of the scrambling sequence may be determined according to the subcarrier spacing parameter μ and the slot format; the value of the coefficient parameter in the formula for determining the initial value of the scrambling sequence may be determined according to the subcarrier spacing parameter μ; and the value of the coefficient parameter in the formula for determining the initial value of the scrambling sequence may be determined according to a maximum quantity of time units.

Optionally, the value of t may be determined according to the maximum quantity of codeword identities.

For example, when $n_{s,f}^{\mu}$ has 20 values, five binary bits may be used to indicate the 20 values of $n_{s,f}^{\mu}$. In this case, the value of x may be set to 5, which represents that interference randomization is performed by using five binary bits. For example, when the maximum quantity of codeword identities is 2, interference randomization may be performed by using one binary bit. In this case, t=x+1=5+1=6. For example, when the maximum quantity of codeword identities is 4, interference randomization may be performed by using two binary bits. In this case, t=x+2=5+2=7.

Specifically, a value range of $N_{cw}^{ID}$ may be determined according to a maximum quantity of codewords that can be transmitted by one or more network devices or a maximum quantity of codewords that can be received by the terminal.

Optionally, if a network device can transmit a maximum of one codeword, considering coordination of two base stations, the value range of $N_{cw}^{ID}$ is $N_{cw}^{ID} \in \{0,1\}$; or if a network device can transmit a maximum of two codewords, considering coordination of two base stations, the value range of $N_{cw}^{ID}$ is $N_{cw}^{ID} \in \{0,1,2,3\}$. Specifically, a specific value of $N_{cw}^{ID}$ may be determined through negotiation between network devices. For example, if each network device can transmit a maximum of one codeword, $N_{cw}^{ID}$ of a serving base station may be set to 0, and $N_{cw}^{ID}$ of a coordinated base station may be set to 1.

The implementation of determining the initial value of the scrambling sequence based on the time unit number and the codeword identity in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for various channels or signals may be shown in Table 54.

TABLE 54

| PDSCH | $c_{init} = n_{RNTI} \cdot 2^t + N_{cw}^{ID} \cdot 2^x + n_{s,f}^{\mu}$ |
| PUSCH | $c_{init} = n_{RNTI} \cdot 2^t + N_{cw}^{ID} \cdot 2^x + n_{s,f}^{\mu}$ |

Example 2

Determine the initial value of the scrambling sequence based on a time unit number and a codeword group identity.

In the embodiment of this application, the initial value of the scrambling sequence for the signal or channel may be determined according to the codeword group identity.

Further, optionally, the initial value of the scrambling sequence may also be determined with reference to another variable. This is not specifically limited herein.

Different beams/precoding/antenna ports of a same network device may allocate different codeword groups and codeword group identity parameters to a terminal by different or different network devices may allocate different codeword groups and codeword group identity parameters to a terminal through a network device. Different codeword group identity parameters are used to scramble data from different beams/precoding/antenna ports of the same network device or data from different network devices, so that interference randomization can be implemented.

For example, during coordination, a currently used codeword group identity may be indicated in DCI when scheduling is performed by using a plurality of PDCCHs. For example, if a maximum quantity of codeword group identities is 2, one bit may be used for indicating; or if a maximum quantity of codeword group identities is 4, two bits may be used for indicating.

For example, during coordination, a codeword group identity may be determined according to a time-frequency resource dedicated for DCI, and a scrambling sequence for data scheduled by the DCI is determined.

Specifically, for example, the codeword group identity may be determined according to a CORESET configuration or candidates or CCEs occupied by the DCI or a QCL indication in the DCI.

For example, by default, a codeword group identity of a base station 1 may be 0, and a codeword group identity of a base station 2 may be 1. The base station 1 may transmit the DCI by using a time-frequency resource of a CORESET identity 1, and the base station 2 may transmit the DCI by using a time-frequency resource of a CORESET identity 2. When the UE detects the DCI in the time-frequency resource of the CORESET identity 1, data scheduled by the DCI may be scrambled by using the codeword group identity 0; if the UE detects the DCI in the time-frequency resource of the CORESET identity 2, data scheduled by the DCI may be scrambled by using the codeword group identity 1.

For example, if the base station 1 transmits the DCI by using candidates 1 to 4, and the base station 2 transmits the DCI by using candidates 5 to 8, when the UE detects the DCI in time-frequency resources of the candidates 1 to 4, data scheduled by the DCI may be scrambled by using the codeword group identity 0; if the UE detects the DCI in time-frequency resources of the candidates 5 to 8, data scheduled by the DCI may be scrambled by using the codeword group identity 1.

For example, if the base station 1 transmits the DCI by using CCEs 1 to 10, and the base station 2 transmits the DCI by using CCEs 11 to 20, when the UE detects the DCI in time-frequency resources of the CCEs 1 to 10, data scheduled by the DCI may be scrambled by using the codeword group identity 0; if the UE detects the DCI in time-frequency resources of the CCEs 11 to 20, data scheduled by the DCI may be scrambled by using the codeword group identity 1.

For example, if the base station 1 transmits the DCI by using a QCL configuration 1, and the base station 2 transmits the DCI by using a QCL configuration 2, when the QCL configuration in the DCI received by the UE is the QCL configuration 1, data scheduled by the DCI may be scrambled by using the codeword group identity 0; if the QCL configuration in the DCI received by the UE is the QCL configuration 2, data scheduled by the DCI may be scrambled by using the codeword group identity 1.

In the embodiment of this application, a network device may determine the initial value of the scrambling sequence based on an RNTI configuration identity currently used by the terminal, a codeword group identity, and a slot number ($n_s$) in a radio frame. For example, an initialization formula for determining the initial value of the scrambling sequence may be the following formula:

$$c_{init} = n_{RNTI} \cdot 2^t + N_{cw\text{-}group}^{ID} \cdot 2^x + n_{s,f}^\mu,$$

where $n_{RNTI}$ indicates an RNTI number, and may be used to identify a terminal, that is, may be understood as a terminal identity, $N_{cw\text{-}group}^{ID}$ represents a codeword group identity, $n_{s,f}^\mu$ represents a slot number in a radio frame, and parameters t and x are positive integers.

A specific manner of determining values of coefficient parameters t and x in the embodiment of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter µ and the slot format; the value of the coefficient parameter in the formula for determining the initial value of the scrambling sequence may be determined according to the subcarrier spacing parameter g; and the value of the coefficient parameter in the formula for determining the initial value of the scrambling sequence may be determined according to a maximum quantity of time units.

Optionally, the value of t may be determined according to the maximum quantity of codeword group identities.

For example, when $n_{s,f}^\mu$ has 20 values, five binary bits may be used to indicate the 20 values of $n_{s,f}^\mu$. In this case, the value of x may be set to x=5, which represents that interference randomization is performed by using five binary bits. For example, when the maximum quantity of codeword group identities is 2, interference randomization may be performed by using one binary bit. In this case, t=x+1=5+1=6. For example, when the maximum quantity of codeword group identities is 4, interference randomization may be performed by using two binary bits. In this case, t=x+2=5+2=7.

Specifically, a value range of $N_{cw\text{-}group}^{ID}$ may be determined according to a maximum quantity of identities of codeword groups that can be transmitted by one or more network devices or a maximum quantity of identities of codeword groups that can be received by the terminal. Optionally, if a network device can transmit a codeword or codewords corresponding to a maximum of one codeword group identity, considering coordination of two base stations, the value range of $N_{cw\text{-}group}^{ID}$ is $N_{cw\text{-}group}^{ID} \in \{0, 1\}$; or if a network device can transmit codewords corresponding to a maximum of two codeword group identities, considering coordination of two base stations, the value range of $N_{cw\text{-}group}^{ID}$ is $N_{cw\text{-}group}^{ID} \in \{0, 1, 3, 4\}$. Specifically, a specific value of $N_{cw\text{-}group}^{ID}$ may be determined through negotiation between network devices. For example, if each network device can transmit a codeword or codewords corresponding to a maximum of one codeword group identity, $N_{cw\text{-}group}^{ID}$ of a serving base station may be set to 0, and $N_{cw\text{-}group}^{ID}$ of a coordinated base station may be set to 1.

Different network devices may allocate different codeword group identities to the terminal, and for data from different network devices, different codeword group identities may be used to determine initial values of scrambling sequences. Different network devices may use different codeword identity parameters to distinguish different codeword groups. A codeword group may be determined according to a codeword identity parameter indicated in DCI, and a codeword identity parameter is used to indicate a codeword identity. For example, if there are four codewords, codewords may be grouped. Optionally, a group 1 includes a codeword 0 and a codeword 1, and a group 2 includes a codeword 2 and a codeword 3. In this case, a signal is scrambled with reference to codeword group information and a codeword identity parameter, so that interference randomization can be implemented.

For another example, codeword group identity information may be indicated in DCI. For example, a bit in the DCI may be used to identify codeword group information currently used by the terminal. In this case, a signal is scrambled by using codeword group information, so that interference randomization can be implemented.

The implementation of determining the initial value of the scrambling sequence based on the time unit number and the codeword identity in the embodiment of this application is not only applied to scrambling of the data channel, but also applied to scrambling of other channels or signals, for example, may be further applied to scrambling of other signals such as a reference signal, a control channel, a broadcast signal, and a terminal specific signal.

Based on a manner similar to the initialization formula for determining the initial value of the scrambling sequence used for scrambling the PUSCH data channel, initialization formulas for determining initial values of scrambling sequences for various channels or signals may be shown in Table 55.

TABLE 55

| | |
|---|---|
| PDSCH | $c_{init} = n_{RNTI} \cdot 2^t + N_{cw\text{-}group}^{ID} \cdot 2^x + n_{s,f}^{\mu}$ |
| PUSCH | $c_{init} = n_{RNTI} \cdot 2^t + N_{cw\text{-}group}^{ID} \cdot 2^x + n_{s,f}^{\mu}$ |

In Embodiment 7 of this application, the initial value of the scrambling sequence is determined according to at least one of the codeword identity and the codeword group identity. Because different beams/precoding/antenna ports of a same network device may allocate a plurality of codeword identities to a terminal or different network devices may allocate a plurality of codeword identities to a terminal through a network device, and the codeword identities are used to perform scramble data from different beams/precoding/antenna ports of the same network device or data from different network devices, interference randomization can be implemented.

Embodiment 8

Determine an initial value of a scrambling sequence based on a frame structure parameter or a subcarrier spacing configuration.

In the embodiment of this application, an initial value of a scrambling sequence for a signal or channel may be determined according to a frame structure parameter or a subcarrier spacing configuration.

Further, optionally, the initial value of the scrambling sequence may also be determined with reference to another variable. This is not specifically limited herein.

The frame structure parameter or the subcarrier spacing configuration may be other configured identities used for scrambling, and is not specifically limited herein.

Optionally, the frame structure parameter or the subcarrier spacing configuration may be notified by using higher layer signaling (for example, RRC signaling or MAC signaling) or physical layer signal (for example, DCI), or may be determined implicitly. This is not specifically limited herein.

In the embodiment of this application, a process of generating an initial value of a scrambling sequence used for scrambling a PUSCH data channel is still used as an example for description.

For example, an initialization formula for determining the initial value of the scrambling sequence may be the following formula:

$$c_{init} = n_{RNTI} \cdot 2^t + q \cdot 2^x + n_{s,f}^{\mu} \cdot 2^y + \mu$$

or $$c_{init} = n_{RNTI} \cdot 2^t + cq \cdot 2^x + n_{s,f}^{\mu} \cdot 2^y + \mu,$$

where $n_{RNTI}$ indicates an RNTI number, and may be used to identify a terminal, that is, may be understood as a terminal identity, q represents a codeword number, $n_{s,f}^{\mu}$ represents a slot number in a radio frame, $\mu$ indicates a subcarrier spacing configuration, and parameters t, x, and y are positive integers.

A specific manner of determining values of coefficient parameters t, x, and y in the embodiment of this application is similar to the process of determining a coefficient parameter in the foregoing embodiment, and may be applicable to the foregoing process of determining a coefficient parameter. The following three methods may be included: The value of the coefficient parameter in the formula for determining the initial value of the scrambling sequence may be determined according to the subcarrier spacing parameter $\mu$ and the slot format; the value of the coefficient parameter in the formula for determining the initial value of the scrambling sequence may be determined according to the subcarrier spacing parameter g; and the value of the coefficient parameter in the formula for determining the initial value of the scrambling sequence may be determined according to a maximum quantity of time units.

Optionally, a coefficient parameter of a previous term in the initialization formula may be determined according to value ranges of variables and values of coefficient parameters of several subsequent terms.

Specifically, for example, the value of y is determined according to a maximum quantity of values of the subcarrier spacing parameter $\mu$. For example, if $\mu \in \{0, 1, 2, 3, 4, 5\}$, the maximum quantity of values of $\mu$ is 6, and three binary bits are required for indicating, that is, y=3. When $n_{s,f}^{\mu}$ has 20 values, five binary bits are required for indicating the 20 values of $n_{s,f}^{\mu}$, and therefore x=5+3=8.

For RMSI, first, interference randomization may be performed according to an SI-RNTI. In addition, according to a protocol agreed upon in NR, different frame structure parameters may be used for the RMSI. Considering interference randomization for different frame structure parameters, scrambling may be performed according to the frame structure parameter or the subcarrier spacing configuration. Interference randomization in different frame structure parameter configurations or subcarrier spacing configurations can be improved. In addition to the RMSI, the embodiment is also applicable to various signals or channels mentioned in this solution, and is also applicable to other signals or channels that are not mentioned. This is not limited herein.

In the embodiment of this application, initial values of scrambling sequences for other channels or signals may be determined in a similar manner, and a difference lies only in that used scrambling identities need to be determined according to types of the channels or types of the signals. The following Table 56 lists several possible correspondences between initial values of scrambling sequences for channels or signals, slot numbers in a radio frame, and scrambling identities.

TABLE 56

| | |
|---|---|
| PDSCH | $c_{init} = n_{RNTI} \cdot 2^t + q \cdot 2^x + n_{s,f}^{\mu} \cdot 2^y + \mu$ or |
| | $c_{init} = n_{RNTI} \cdot 2^t + cq \cdot 2^y + n_{s,f}^{\mu} \cdot 2^x + \mu$ |
| PMCH | $c_{init} = n_{s,f}^{\mu} \cdot 2^y + \mu$ |
| PDCCH | $c_{init} = n_{s,f}^{\mu} \cdot 2^y + \mu$ |
| PCFICH | $c_{init} = n_{s,f}^{\mu} \cdot 2^y + \mu + 1$ |
| PHICH | $c_{init} = n_{s,f}^{\mu} \cdot 2^y + \mu + 1$ |
| PUCCH format 2/2a/2b | $c_{init} = (n_{s,f}^{\mu} + 1) \cdot 2^y + \mu \cdot 2^k + n_{RNTI}$ |
| PUSCH | $c_{init} = n_{RNTI} \cdot 2^t + q \cdot 2^x + n_{s,f}^{\mu} \cdot 2^y + \mu$ |
| Cell specific RS | $c_{init} = 2^y \cdot (7 \cdot (n_{s,f}^{\mu} + 1) + l + 1) + \mu \cdot 2^k + N_{CP}$ |
| | or $c_{init} = 7 \cdot (n_{s,f}^{\mu} + 1) + l + \mu + 1$ |
| MBSFN RS | $c_{init} = 7 \cdot (n_{s,f}^{\mu} + 1) + l + \mu + 1$ |
| UE specific RS | $c_{init} = (n_{s,f}^{\mu} + 1)2^y + \mu \cdot 2^k + n_{RNTI}$ |
| CSI-RS | $c_{init} = 2^y \cdot (7 \cdot (n_{s,f}^{\mu} + 1) + l + 1) + \mu \cdot 2^k + N_{CP}$ |
| | or $c_{init} = 7 \cdot (n_{s,f}^{\mu} + 1) + l + \mu + 1$ |

It should be noted that, for data items or coefficient parameters whose meanings are not explained or described in the formulas in each of the foregoing embodiments, refer to explanations about meanings of data items or coefficient parameters that have the same meanings in the formulas. For example, for a coefficient parameter cq whose meaning is not explained in a formula in the foregoing embodiment, refer to an explanation about its meaning in another formula, and determine that cq indicates a CBG number.

Further, it should be noted that, the coefficient parameter q representing a codeword number in the formula in the foregoing embodiment of this application may be replaced with the coefficient parameter cq representing a CBG number.

It may be understood that, in each of the foregoing embodiments of this application, various implementations of determining an initial value of a scrambling sequence are described separately. It may be understood that, in an actual implementation, an initial value of a scrambling sequence may be determined in one or a combination of manners in each embodiment, and then a signal is scrambled by using the scrambling sequence generated according to the initial value, so that the embodiments are applicable to various service scenarios in the 5G NR, and implement randomization for signal scrambling and improve performance.

Further, it may be understood that, the initial value of the scrambling sequence in each of the foregoing embodiments of this application may be used to generate a scrambling sequence used by a signal scrambling apparatus to scramble a signal, or may be used to generate a scrambling sequence used by a signal descrambling apparatus to descramble a signal. It may also be understood that, the method for generating an initial value of a scrambling sequence may be performed by the signal scrambling apparatus or the signal descrambling apparatus. The signal scrambling apparatus may be a terminal or a network device. The signal descrambling apparatus may be a network device or a terminal.

The solutions provided by the embodiments of this application are mainly described above from a perspective of interaction between the signal scrambling apparatus and the signal descrambling apparatus. It may be understood that, to implement the foregoing functions, the signal scrambling apparatus and the signal descrambling apparatus include corresponding hardware structures and/or software modules for performing the functions. The units and algorithm steps in the examples described with reference to the embodiments disclosed in this application can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In the embodiments of this application, functional units in the signal scrambling apparatus and the signal descrambling apparatus may be defined according to the foregoing method examples. For example, each functional unit corresponding to each function may be defined, or two or more functions may be integrated in one processing unit. The integrated unit may be implemented in a form of hardware, or may be implemented in a form of a software functional unit.

Figure 6:
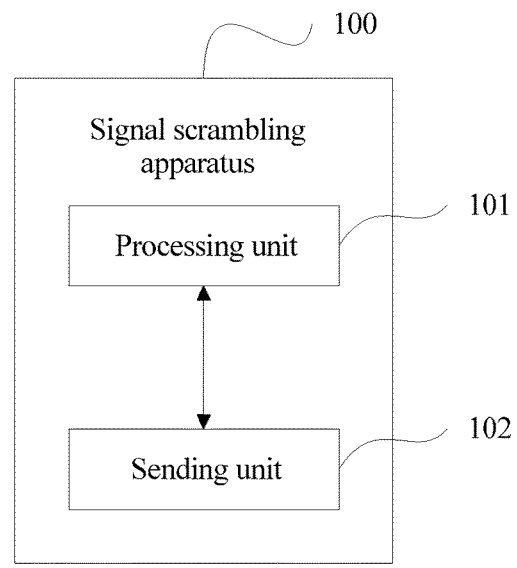
FIG. 6 is a schematic structural diagram of a signal scrambling apparatus according to an embodiment of this application.

When an integrated unit is used, FIG. 6 shows a schematic structural diagram of a signal scrambling apparatus according to an embodiment of this application. The signal scrambling apparatus 100 shown in FIG. 6 may be applied to a communications apparatus, where the communications apparatus may be a terminal or a network device. Referring to FIG. 6, the signal scrambling apparatus 100 may include a processing unit 101 and a sending unit 102, where the processing unit 101 is configured to scramble a signal by using a scrambling sequence, and the sending unit 102 is configured to send the scrambled signal.

Figure 7:
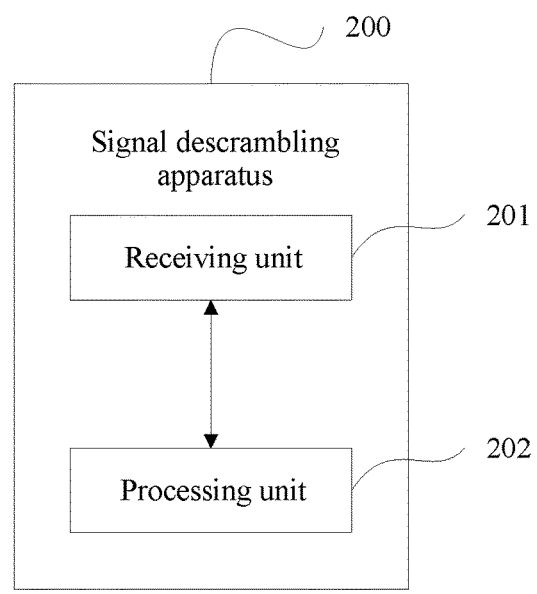
FIG. 7 is a schematic structural diagram of a signal descrambling apparatus according to an embodiment of this application.

When an integrated unit is used, FIG. 7 shows a schematic structural diagram of a signal descrambling apparatus according to an embodiment of this application. The signal descrambling apparatus 200 shown in FIG. 7 may be applied to a communications apparatus, where the communications apparatus may be a terminal or a network device. Referring to FIG. 7, the signal descrambling apparatus 200 may include a receiving unit 201 and a processing unit 202, where the receiving unit 201 is configured to receive a signal, and the processing unit 202 is configured to descramble the signal by using a scrambling sequence.

The scrambling sequence used by the processing unit 101 to scramble the signal and the scrambling sequence used by the processing unit 202 to descramble the signal may be understood as the same scrambling sequence.

In a possible implementation, the initial value of the scrambling sequence used by the processing unit 101 and the processing unit 202 to generate the scrambling sequence may be generated according to a time unit number corresponding to a frame structure parameter used for transmitting the signal.

The frame structure parameter includes at least one of a subcarrier spacing configuration parameter, a slot configuration parameter, and a CP structure parameter. The time unit number includes at least one of a slot number in a radio frame, a subframe number in a radio frame, a slot number in a subframe, and an OFDM symbol number in a slot.

In a possible example, the processing unit 101 and the processing unit 202 may determine the initial value of the scrambling sequence based on the slot number in the radio frame. Because slot numbers in the radio frame do not overlap each other, occurrence of same scrambling sequences is avoided to some extent by determining the initial value of the scrambling sequence based on the slot number in the radio frame, and can further avoid occurrence of an interference overlapping problem to some extent. Interference between different transmission frame structure parameters can be randomized, interference between different slots in a subframe can also be randomized, and therefore, interference randomization is implemented.

In another possible example, the processing unit 101 and the processing unit 202 may also determine the initial value of the scrambling sequence based on the slot number in the subframe and the subframe number in the radio frame, to reflect scrambling randomization of different subframes and different slots in the subframe, and improve performance of interference randomization.

In still another possible example, the processing unit 101 and the processing unit 202 may further determine the initial value of the scrambling sequence based on the subframe number in the radio frame.

In another possible implementation, the processing unit 101 and the processing unit 202 may determine the initial value of the scrambling sequence based on a scrambling identity.

Optionally, the processing unit 101 and the processing unit 202 may determine the initial value of the scrambling sequence based on the scrambling identity and the time unit number corresponding to the frame structure parameter used for transmitting the signal.

The scrambling identity may include at least one of a terminal identity, a cell identity, a code block group configuration parameter, a frame structure parameter, a bandwidth part configuration parameter, a QCL configuration parameter, a control channel resource configuration parameter, and a codeword configuration parameter.

Specifically, the processing unit 101 and the processing unit 202 may determine, according to a type of a channel on which the signal is transmitted or a type of the signal, the scrambling identity used for generating the initial value of the scrambling sequence.

In a possible example, the processing unit 101 and the processing unit 202 may determine the initial value of the scrambling sequence based on the terminal identity and the time unit number corresponding to the frame structure parameter used for transmitting the signal.

In another possible example, the processing unit 101 and the processing unit 202 may determine the initial value of the scrambling sequence based on the code block group configuration parameter and the time unit number corresponding to the frame structure parameter used for transmitting the signal.

In still another possible example, the processing unit 101 and the processing unit 202 may determine the initial value of the scrambling sequence based on the QCL configuration parameter and the time unit number corresponding to the frame structure parameter used for transmitting the signal.

In still another possible example, the processing unit 101 and the processing unit 202 may determine the initial value of the scrambling sequence based on the bandwidth part configuration parameter and the time unit number corresponding to the frame structure parameter used for transmitting the signal.

In still another possible example, the processing unit 101 and the processing unit 202 may determine the initial value of the scrambling sequence based on the control channel resource configuration parameter and the time unit number corresponding to the frame structure parameter used for transmitting the signal.

In still another possible example, the processing unit 101 and the processing unit 202 may determine the initial value of the scrambling sequence based on the codeword configuration parameter and the time unit number corresponding to the frame structure parameter used for transmitting the signal.

In still another possible example, the processing unit 101 and the processing unit 202 may determine the initial value of the scrambling sequence based on the frame structure parameter or a subcarrier spacing.

In still another possible implementation, a coefficient parameter of a previous term in an initialization formula used by the processing unit 101 and the processing unit 202 for determining the initial value of the scrambling sequence may be determined according to value ranges of variables and values of coefficient parameters of several subsequent terms.

The processing unit 101 and the processing unit 202 may determine, in one or a combination of the following manners, a value of a coefficient parameter in the initialization formula used for determining the initial value of the scrambling sequence: determining according to a subcarrier spacing parameter $\mu$ and a slot format; determining according to a subcarrier spacing parameter; and determining according to a maximum quantity of slots.

It may be understood that, in the embodiments of this application, in the process of determining the initial value of the scrambling sequence by the signal scrambling apparatus 100 and the signal descrambling apparatus 200, any one of the determining manners in the foregoing method embodiments may be used for determining. For details, refer to the implementation process of determining the initial value of the scrambling sequence in the foregoing method embodiments. In addition, for concepts related to the technical solutions provided by the embodiments of this application, explanations, detailed descriptions, and other steps, refer to the descriptions about these contents in the foregoing method or other embodiments. Details are not described herein.

It may be understood that, the division of each unit in the foregoing signal scrambling apparatus 100 and signal descrambling apparatus 200 is merely logical function division. In an actual implementation, the units may be all or partially integrated in a physical entity, or may be separated physically. In addition, all the units may be implemented in a form of software invoked by a processing element, or may be implemented in a form of hardware; or some units are implemented in a form of software invoked by a processing element, and some units are implemented in a form of hardware. For example, the processing unit may be a processing element disposed separately, or may be implemented in a chip of the communications apparatus. In addition, the processing unit may be stored in a memory of the communications apparatus in a form of a program, and invoked by a processing element of the communications apparatus to perform the function of the unit. Implementations of other units are similar to this. In addition, the units are all or partially integrated, or may be implemented separately. Herein the processing element may be an integrated circuit, and have a signal processing capability. In an implementation process, steps of the foregoing methods and the foregoing units can be implemented by using a hardware integrated logical circuit in the processor element, or by using instructions in a form of software. In addition, the receiving unit is a unit controlling reception, and may receive information sent by another communications apparatus through a receiving apparatus of the communications apparatus, for example, an antenna and radio frequency apparatus. The sending unit is a unit controlling sending, and may send information to another communications apparatus through a sending apparatus of the communications apparatus, for example, an antenna and radio frequency apparatus.

For example, the units may be one or more integrated circuits configured to implement the foregoing method, for example, one or more application-specific integrated circuits (ASIC), or one or more microprocessors (DSP), or one or more field programmable gate arrays (FPGA). For another example, when one of the units is implemented in a form of a program invoked by the processing element, the processing element may be a general-purpose processor, for example, a central processing unit (CPU) or another processor that can invoke a program. For another example, the units may be integrated and implemented in a form of a system-on-a-chip (SOC).

Figure 8:
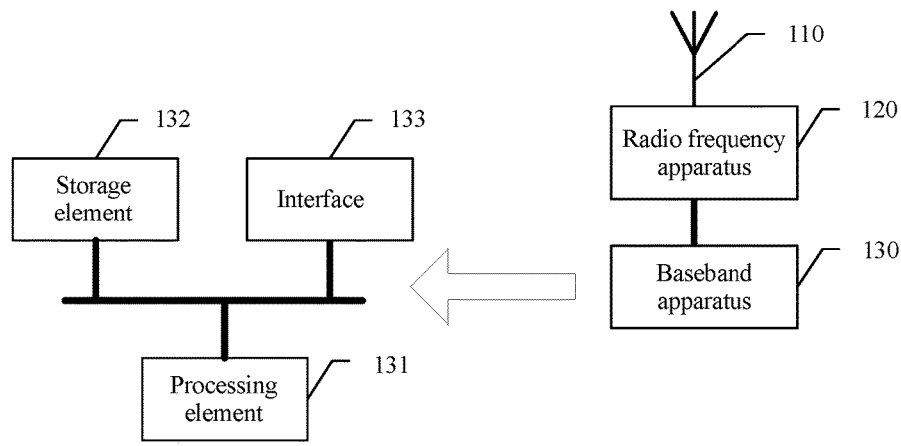
FIG. 8 is a schematic structural diagram of another signal scrambling apparatus according to an embodiment of this application.

Referring to FIG. 8, FIG. 8 is a schematic structural diagram of a communications apparatus according to an embodiment of this application. The communications apparatus may be the network device in the foregoing embodiment, and configured to implement an operation of the signal scrambling apparatus 100 or the signal descrambling apparatus 200 in the foregoing embodiment. As shown in FIG. 8, the communications apparatus includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal, and sends the information sent by the terminal, to the baseband apparatus 130 for processing. In a downlink direction, the baseband apparatus 130 processes information of the terminal and sends the information to the radio frequency apparatus 120, and the radio frequency apparatus 120 processes the information of the terminal and then sends the information to the terminal through the antenna 110.

The baseband apparatus 130 may be a physical apparatus, or may include at least two apparatuses that are separated physically, for example, including a CU and at least one DU. The DU and the radio frequency apparatus 120 may be integrated in an apparatus, or may be separated physically. Division of protocol layers for the at least two apparatuses that are separated physically in the baseband apparatus 130 is not limited. For example, the baseband apparatus 130 is configured to perform processing of protocol layers such as an RRC layer, a Packet Data Convergence Protocol (PDCP) layer, a radio link control (RLC) layer, a Media Access Control (MAC) layer, and a physical layer. Division may be performed between any two protocol layers, so that the baseband apparatus includes two apparatuses that are separated physically and configured to perform processing of the respective responsible protocol layers. For example, division is performed between RRC and PDCP. For another example, division is performed between PDCP and RLC. In addition, division may be performed in a protocol layer. For example, a part of a protocol layer and protocol layers above the protocol layer are assigned to an apparatus, and remaining parts of the protocol layer and protocol layers below the protocol layer are assigned to another apparatus. The signal scrambling apparatus 100 or the signal descrambling apparatus 200 may be located in one of the at least two apparatuses that are separated physically in the baseband apparatus 130.

The communications apparatus provided by the embodiment of this application may include a plurality of baseband boards. A plurality of processing elements may be integrated on the baseband board to implement required functions. The baseband apparatus 130 may include at least one baseband board, and the signal scrambling apparatus 100 or the signal descrambling apparatus 200 may be located in the baseband apparatus 130. In an implementation, each unit shown in FIG. 6 or FIG. 7 is implemented in a form of a program invoked by a processing element. For example, the baseband apparatus 130 includes a processing element 131 and a storage element 132. The processing element 131 invokes a program stored in the storage element 132 to perform the method performed by the network device in the foregoing method embodiment. In addition, the baseband apparatus 130 may further include an interface 133, configured to exchange information with the radio frequency apparatus 120. The interface is, for example, a common public radio interface (CPRI). When the baseband apparatus 130 and the radio frequency apparatus 120 are deployed together physically, the interface may be an intra-board interface or an inter-board interface, and herein the board is a circuit board.

In another implementation, units shown in FIG. 6 or FIG. 7 may be one or more processing elements configured to implement the method performed by the network device. The one or more processing elements are disposed in the baseband apparatus 130. The one or more processing elements may be an integrated circuit/integrated circuits, for example, one or more ASICs, or one or more DSPs, or one or more FPGAs. The integrated circuits may be integrated to form a chip.

For example, units shown in FIG. 6 or FIG. 7 may be integrated, and implemented in a form of a system-on-a-chip (SOC). For example, the baseband apparatus 130 includes a SOC chip configured to implement the foregoing method. The processing element 131 and the storage element 132 may be integrated in the chip, and the processing element 131 invokes the program stored in the storage element 132 to implement the foregoing method performed by the network device. Alternatively, at least one integrated circuit may be integrated in the chip and configured to implement the foregoing method performed by the network device. Alternatively, with reference to the foregoing implementation, functions of some units are implemented in a form of a program invoked by the processing element, and functions of some units are implemented in a form of an integrated circuit.

Whichever manner is used, in conclusion, the signal scrambling apparatus 100 or the signal descrambling apparatus 200 used for the communications apparatus such as a network device includes at least one processing element and a storage element, where the at least one processing element is configured to perform the signal scrambling or descrambling method provided by the foregoing method embodiment. The processing element may perform, in a first manner, that is, in a manner of executing a program stored in a storage element, some or all steps performed by the signal scrambling apparatus 100 or the signal descrambling apparatus 200 in the foregoing method embodiment; or may perform, in a second manner, that is, in a manner of combining a hardware integrated logical circuit in the processor element with instructions, some or all steps performed by the signal scrambling apparatus 100 or the signal descrambling apparatus 200 in the foregoing method embodiment; and the first manner and the second manner may be combined to perform some or all steps performed by the network device in the foregoing method embodiment.

As described above, herein the processing element may be a general-purpose processor, for example, a central processing unit (CPU), or may be one or more integrated circuits configured to implement the foregoing method, for example, one or more application-specific integrated circuits (ASIC), or one or more microprocessors (DSP), or one or more field programmable gate arrays (FPGA).

The storage element may be a memory, or may be a collective term for a plurality of storage elements.

Figure 9:
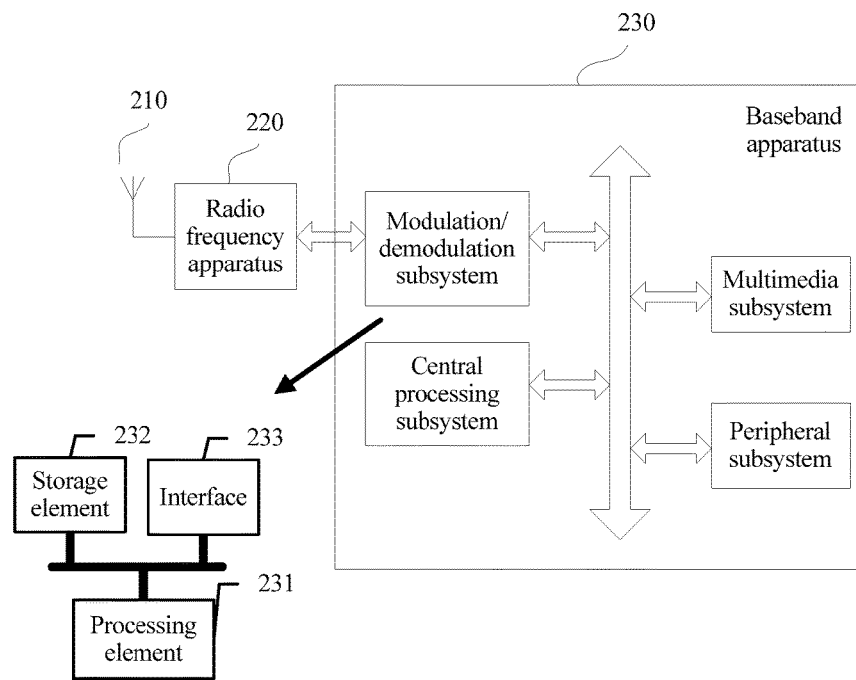
FIG. 9 is a schematic structural diagram of another signal descrambling apparatus according to an embodiment of this application.

Referring to FIG. 9, FIG. 9 is a schematic structural diagram of a communications apparatus according to an embodiment of this application. The communications apparatus may be the terminal in the foregoing embodiment, and configured to implement an operation of the signal scrambling apparatus 100 or the signal descrambling apparatus 200 in the foregoing embodiment. As shown in FIG. 9, the communications apparatus includes an antenna 210, a radio frequency apparatus 220, and a baseband apparatus 230. The antenna 210 is connected to the radio frequency apparatus 220. In a downlink direction, the radio frequency apparatus 220 receives, through the antenna 210, information sent by a network device, and sends the information sent by the network device, to the baseband apparatus 230 for processing. In an uplink direction, the baseband apparatus 230 processes information of the terminal and sends the information to the radio frequency apparatus 220, and the radio frequency apparatus 220 processes the information of the terminal and then sends the information to the network device through the antenna 210.

The baseband apparatus 230 may include a modulation/demodulation subsystem, configured to implement data processing in each communications protocol layer. The baseband apparatus 230 may further include a central processing subsystem, configured to implement processing of an operating system and an application layer of the terminal. In addition, the baseband apparatus 230 may further include other subsystems, for example, a multimedia subsystem and a peripheral subsystem, where the multimedia subsystem is configured to implement control on a terminal camera, screen display, or the like, and the peripheral subsystem is configured to implement connections to other devices. The modulation/demodulation subsystem may be a chip disposed separately. Optionally, the signal scrambling apparatus 100 or the signal descrambling apparatus 200 may be implemented in the modulation/demodulation subsystem.

In an implementation, each unit shown in FIG. 6 or FIG. 7 is implemented in a form of a program invoked by a processing element. For example, a subsystem of the baseband apparatus 230 such as the modulation/demodulation subsystem includes a processing element 231 and a storage element 232, and the processing element 231 invokes a program stored in the storage element 232 to perform the method performed by the terminal in the foregoing method embodiment. In addition, the baseband apparatus 230 may further include an interface 233, configured to exchange information with the radio frequency apparatus 220.

In another implementation, units shown in FIG. 6 or FIG. 7 may be one or more processing elements configured to implement the method performed by the terminal. The one or more processing elements are disposed in a subsystem of the baseband apparatus 230 such as the modulation/demodulation subsystem. Herein the one or more processing elements may be an integrated circuit/integrated circuits, for example, one or more ASICs, or one or more DSPs, or one or more FPGAs. The integrated circuits may be integrated to form a chip.

For example, units shown in FIG. 6 or FIG. 7 may be integrated, and implemented in a form of a system-on-a-chip (SOC). For example, the baseband apparatus 230 includes a SOC chip configured to implement the foregoing method. The processing element 231 and the storage element 232 may be integrated in the chip, and the processing element 231 invokes the program stored in the storage element 232 to implement the foregoing method performed by the terminal. Alternatively, at least one integrated circuit may be integrated in the chip and configured to implement the foregoing method performed by the terminal. Alternatively, with reference to the foregoing implementation, functions of some units are implemented in a form of a program invoked by the processing element, and functions of some units are implemented in a form of an integrated circuit.

Whichever manner is used, in conclusion, the signal scrambling apparatus 100 or the signal descrambling apparatus 200 used for the communications apparatus such as a terminal includes at least one processing element and a storage element, where the at least one processing element is configured to perform the method performed by the terminal in the foregoing method embodiment. The processing element may perform, in a first manner, that is, in a manner of executing a program stored in a storage element, some or all steps performed by the terminal in the foregoing method embodiment; or may perform, in a second manner, that is, in a manner of combining a hardware integrated logical circuit in the processor element with instructions, some or all steps performed by the terminal in the foregoing method embodiment; and the first manner and the second manner may be combined to perform some or all steps performed by the terminal in the foregoing method embodiment.

As described above, herein the processing element may be a general-purpose processor, for example, a central processing unit (CPU), or may be one or more integrated circuits configured to implement the foregoing method, for example, one or more application-specific integrated circuits (ASIC), or one or more microprocessors (DSP), or one or more field programmable gate arrays (FPGA).

The storage element may be a memory, or may be a collective term for a plurality of storage elements.

According to the method provided by the embodiment of this application, an embodiment of this application further provides a communications system, where the communications system includes the foregoing signaling scrambling apparatus and signaling descrambling apparatus.

An embodiment of this application further provides a signaling scrambling apparatus, applied to a communications apparatus, where the communications apparatus is a network device or a terminal, and includes at least one processing element (or at least one chip) configured to perform the method in the foregoing embodiment.

An embodiment of this application further provides a signaling descrambling apparatus, applied to a communications apparatus, where the communications apparatus is a network device or a terminal, and includes at least one processing element (or at least one chip) configured to perform the method in the foregoing embodiment.

This application provides a signal scrambling program, where the program, when being executed by a processor, is configured to perform the method in the foregoing embodiment.

This application provides a signal descrambling program, where the program, when being executed by a processor, is configured to perform the method in the foregoing embodiment.

This application further provides a program product, for example, a computer readable storage medium, including the foregoing signal scrambling program or signal descrambling program.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

What is claimed is:

1. A signal scrambling method, comprising:
scrambling, by a communications apparatus, a signal by using a scrambling sequence to generate a scrambled signal, wherein an initial value used for generating the scrambling sequence is determined based on a time unit number corresponding to a subcarrier spacing configuration parameter used for transmitting the scrambled signal and the time unit number comprises a slot number in a radio frame; and
sending, by the communications apparatus, the scrambled signal.

2. The method according to claim 1, wherein the initial value used for generating the scrambling sequence is further determined based on an orthogonal frequency division multiplexing (OFDM) symbol number in a slot.

3. The method according to claim 1, wherein the initial value used for generating the scrambling sequence is further determined based on a scrambling identity.

4. The method according to claim 3, wherein the scrambling identity comprises a cell identity.

5. The method according to claim 3, wherein the scrambling identity comprises a terminal identity.

6. The method according to claim 5, wherein the method further comprises:
configuring at least two terminal identities for a terminal; and
indicating, to the terminal, the terminal identity used as the scrambling identity in the at least two terminal identities.

7. The method according to claim 6, wherein the at least two terminal identities are configured by using higher layer signaling, and the terminal identity used as the scrambling identity is indicated by using physical layer signaling.

8. The method according to claim 5, wherein when the communications apparatus is applied to a terminal, the method further comprises:
receiving at least two terminal identities configured by a network device; and
receiving an indication from the network device to determine the terminal identity used as the scrambling identity, wherein the indication is used to indicate the terminal identity used as the scrambling identity in the at least two terminal identities.

9. The method according to claim 8, wherein the at least two terminal identities are configured by using higher layer signaling, and the terminal identity used as the scrambling identity is indicated by using physical layer signaling.

10. An apparatus, comprising a processor and a non-transitory computer readable storage medium, the non-transitory computer readable storage medium stores a program, and when the program is executed by the processor, the following steps are performed:
scrambling a signal by using a scrambling sequence, wherein an initial value used for generating the scrambling sequence is determined based on a time unit number corresponding to a subcarrier spacing configuration parameter used for transmitting the signal, wherein the time unit number comprises a slot number in a radio frame; and
sending the scrambled signal.

11. The apparatus according to claim 10, wherein the initial value used for generating the scrambling sequence is further determined based on an OFDM symbol number in a slot.

12. The apparatus according to claim 10, wherein the initial value used for generating the scrambling sequence is further determined based on a scrambling identity.

13. The apparatus according to claim 12, wherein the scrambling identity comprises a cell identity.

14. The apparatus according to claim 12, wherein the scrambling identity comprises a terminal identity.

15. The apparatus according to claim 14, wherein the apparatus comprises a processor that configures at least two terminal identities for a terminal and indicates, to the terminal, the terminal identity used as the scrambling identity in the at least two terminal identities.

16. The apparatus according to claim 15, wherein the at least two terminal identities are configured by using higher layer signaling, and the terminal identity used as the scrambling identity is indicated by using physical layer signaling.

17. The apparatus according to claim 14, wherein communications apparatus is applied to a terminal, and when the program is executed by the processor, the processor receives at least two terminal identities configured by a network device and receives an indication from the network device to determine the terminal identity used as the scrambling identity, wherein the indication is used to indicate the terminal identity used as the scrambling identity in the at least two terminal identities.

18. The apparatus according to claim 17, wherein the at least two terminal identities are configured by using higher layer signaling, and the terminal identity used as the scrambling identity is indicated by using physical layer signaling.

19. A non-transitory computer readable storage medium, wherein the non-transitory computer readable storage medium stores a program, and when executed by a processor, the program is configured to perform:
scramble a signal by using a scrambling sequence, wherein an initial value used for generating the scrambling sequence is determined based on a time unit number corresponding to a subcarrier spacing configuration parameter used for transmitting the signal, wherein the time unit number comprises a slot number in a radio frame; and
send, by the communications apparatus, the scrambled signal.

20. The non-transitory computer readable storage medium according to claim 19, wherein the initial value used for generating the scrambling sequence is further determined based on an OFDM symbol number in a slot and or a scrambling identity.

* * * * *